(12) United States Patent
Chan et al.

(10) Patent No.: US 12,670,405 B2
(45) Date of Patent: Jun. 30, 2026

(54) GENERATING A MODEL APPLICATION COMPRISING DISCRETE MODEL FUNCTIONS

(71) Applicant: Dropbox, Inc., San Francisco, CA (US)

(72) Inventors: Richard Chan, Flushing, NY (US); Jennifer Gradone, San Francisco, CA (US); Theo Richardson, Toronto (CA); Hiten Shah, Redwood City, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/976,068

(22) Filed: Dec. 10, 2024

(65) Prior Publication Data

US 2026/0119882 A1 Apr. 30, 2026

Related U.S. Application Data

(60) Provisional application No. 63/714,094, filed on Oct. 30, 2024.

(51) Int. Cl.
G06N 3/0895 (2023.01)

(52) U.S. Cl.
CPC .................................. G06N 3/0895 (2023.01)

(58) Field of Classification Search
CPC .................................................. G06N 3/0895
See application file for complete search history.

(56) References Cited

U.S. PATENT DOCUMENTS 5,012,982 A 5/1991 Souma et al.
8,073,659 B2 * 12/2011 Gugaliya ............... G05B 17/02
703/2

8,518,512 B2 8/2013 Aoki et al.
8,905,390 B2 12/2014 Yeum
9,230,356 B2 1/2016 Chan et al.
10,387,555 B2 8/2019 Baumgartner et al.
(Continued)

FOREIGN PATENT DOCUMENTS

EP 3751478 A1 12/2020

OTHER PUBLICATIONS

Wu et al. "A comprehensive modeling method of continuous and discrete variables for personal credit forecasting", 2022, pp. 271-276 (Year: 2022).*

(Continued)

*Primary Examiner* — Imad Kassim
(74) *Attorney, Agent, or Firm* — Keller Preece PLLC

(57) ABSTRACT

The present disclosure is directed toward systems, methods, and non-transitory computer readable media for generating a model application comprising one or more discrete model functions classified into a function category comprising a sense category, a reason category, or an act category. In some embodiments, the disclosed systems can combine a discrete model function with one or more additional model functions to generate a model application that defines data processing for a customized instance of a large language model. The disclosed systems can surface a model interaction interface comprising selectable application elements to instantiate respective applications of a large language model and modify the model interaction interface to surface a recommended source content item within a source selection window to utilize with the large language model.

20 Claims, 27 Drawing Sheets

(56) References Cited

U.S. PATENT DOCUMENTS

| | | | | |
|---|---|---|---|---|
| 12,326,869 | B1* | 6/2025 | Alperin | G06N 3/04 |
| 2007/0186167 | A1 | 8/2007 | Anderson | |
| 2014/0075351 | A1* | 3/2014 | Hansen | G06F 9/4451 |
| | | | | 715/765 |
| 2018/0077100 | A1 | 3/2018 | Sama et al. | |
| 2018/0268338 | A1 | 9/2018 | Bussiek | |
| 2018/0268372 | A1 | 9/2018 | Bussiek | |
| 2019/0102379 | A1* | 4/2019 | First | G06F 40/30 |
| 2019/0147760 | A1* | 5/2019 | Bruckner | G09B 7/04 |
| | | | | 706/11 |
| 2019/0279618 | A1* | 9/2019 | Yadav | G06F 40/30 |
| 2020/0067931 | A1* | 2/2020 | Espinosa | G06Q 20/223 |
| 2020/0134466 | A1* | 4/2020 | Weintraub | G06N 3/045 |
| 2021/0201144 | A1* | 7/2021 | Jonnalagadda | G06N 3/08 |
| 2021/0359969 | A1* | 11/2021 | Wang | G06Q 10/06 |
| 2024/0135116 | A1* | 4/2024 | Vu | G06F 40/58 |
| 2024/0185209 | A1* | 6/2024 | Skipper | G06Q 30/0207 |
| 2025/0061612 | A1* | 2/2025 | Kreis | G06T 11/00 |

OTHER PUBLICATIONS

Schick et al. ("Toolformer: Language Models Can Teach Themselves to Use Tools", NeurIPS 2023) (Year: 2023).*

Final Office Action from U.S. Appl. No. 18/976,151 mailed on Jul. 8, 2025, 93 pages.

Belzner L., et al., "Large Language Model Assisted Software Engineering: Prospects, Challenges, and a Case Study," Lecture Notes in Computer Science, Dec. 14, 2023, vol. 14380, 454 pages.

Gero K. I., et al., "Supporting Sensemaking of Large Language Model Outputs at Scale," Proceedings of the 2024 CHI Conference on Human Factors in Computing Systems, May 11, 2024, pp. 1-21.

Non-Final Office Action from U.S. Appl. No. 18/976,151, mailed Mar. 20, 2025, 89 pages.

* cited by examiner

100

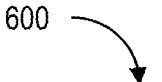
600
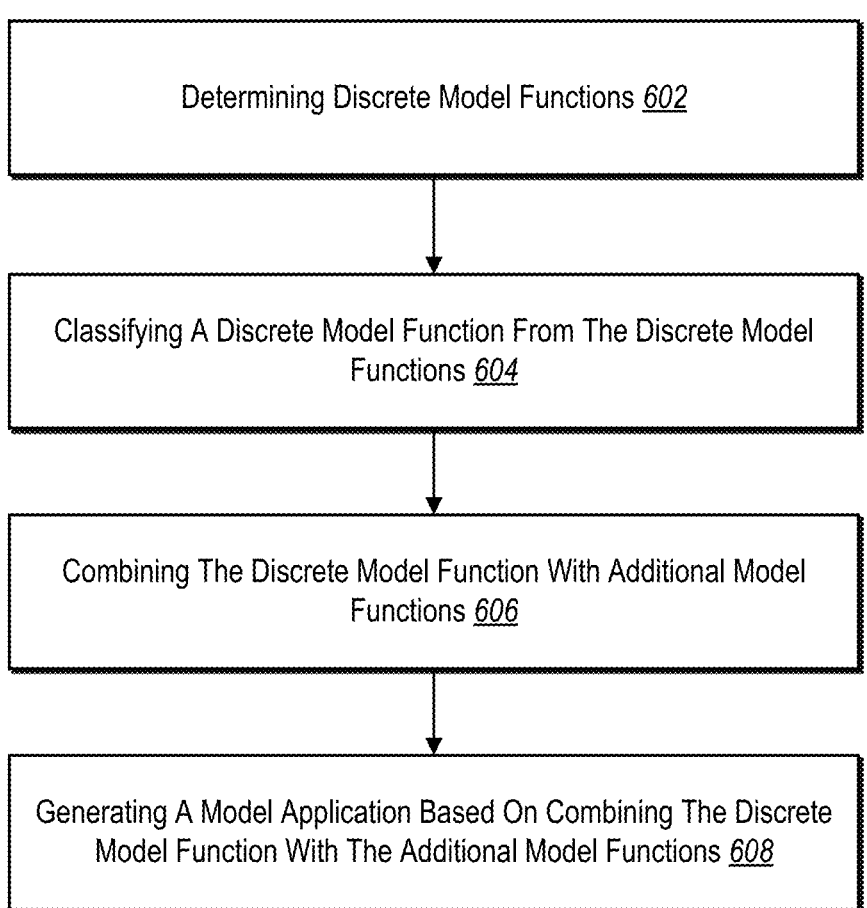
Determining Discrete Model Functions *602*
Classifying A Discrete Model Function From The Discrete Model Functions *604*
Combining The Discrete Model Function With Additional Model Functions *606*
Generating A Model Application Based On Combining The Discrete Model Function With The Additional Model Functions *608*
*Fig. 6*

1400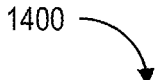

Providing For Display A Model Interaction Interface With One Or More Application Elements *1402*

Modifying The Model Interaction Interface To Include One Or More Model Function Elements Corresponding To One Or More Model Functions Based On Receiving An Indication Of A Selection Of An Application Element *1404*

Determining A Recommended Source Content Item Corresponding To The Model Function Element Based On An Indication Of A Selection Of A Model Function Element *1406*

Modifying The Model Interaction Interface To Include A Source Selection Window Comprising The Source Content Element Corresponding To The Recommended Source Content Item *1408*

*Fig. 14*

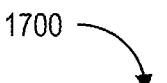
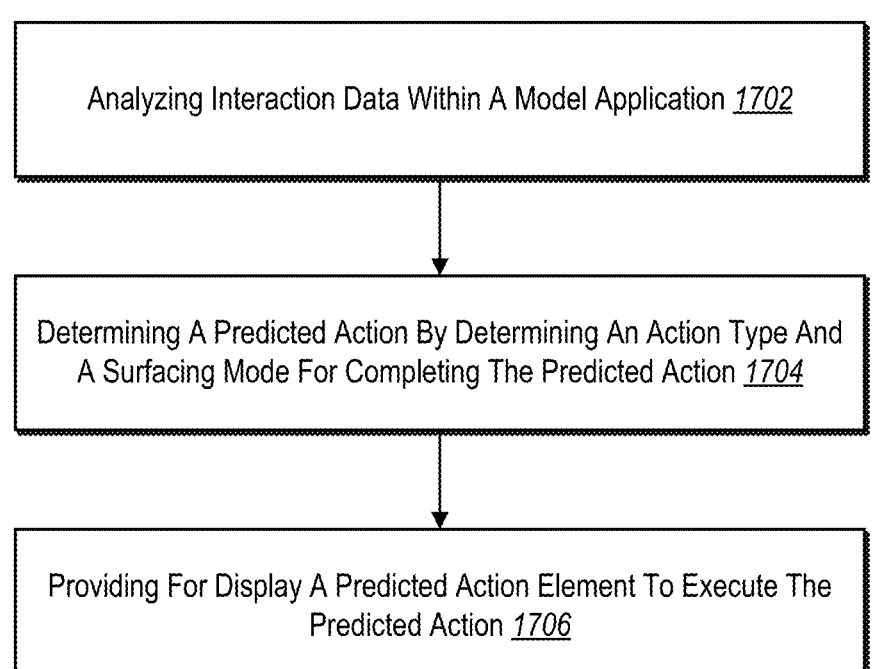
Analyzing Interaction Data Within A Model Application *1702*
Determining A Predicted Action By Determining An Action Type And A Surfacing Mode For Completing The Predicted Action *1704*
Providing For Display A Predicted Action Element To Execute The Predicted Action *1706*
*Fig. 17*

2000

GENERATING A MODEL APPLICATION COMPRISING DISCRETE MODEL FUNCTIONS

CROSS-REFERENCE TO RELATED APPLICATIONS

This application claims priority to and the benefit of U.S. Provisional Patent Application No. 63/714,094, filed on Oct. 30, 2024, which is incorporated herein by reference in its entirety.

BACKGROUND

Recent years have seen significant developments in the diversification of computer applications and using large language models to perform various and/or specialized tasks. Indeed, the increased popularity of large language models and diversification of computer applications in the ever-evolving context of the internet has led to AI performing various tasks, such as generating, summarizing, translating, and classifying digital content across isolated and distinct computer applications and systems. For example, some existing systems utilize large language models as part of the computer application to perform tasks ranging from summarizing books to generating images. Based on these capabilities, some existing systems integrate large language models into programming architecture, data analysis pipelines, or other data processing systems to perform various tasks. For example, some existing systems utilize large language models to generate responses to queries. Despite these advances, some existing systems exhibit several problems in relation to accuracy, flexibility, and efficiency.

As mentioned, many existing systems that utilize computer applications with large language models are inaccurate. In particular, some existing systems often generate inaccurate content based on their overgeneralized knowledge base used to train large language models. For example, many existing systems depend on an unbiased and complete database that includes vast amounts of data across a huge variety of topics and fields. Conventional systems generate inaccurate and irrelevant responses if the database is incomplete, biased, or lacks quality. Moreover, existing systems utilize large language models that are trained over enormous databases of common general data to achieve broad coverage of output generation across a wide array of contexts. Unfortunately, a consequence of such wide-ranging and generalized training is that the resulting large language models often hallucinate, generating erroneous, irrelevant, or incorrect responses (or other outputs) that the models treat as true. Without ways to remediate the inaccurate outputs generated by existing large language models, many conventional systems produce unreliable outputs, which negatively affect downstream analysis and/or use of such outputs.

As indicated above, some existing systems utilizing computer applications to perform tasks are inflexible. In particular, some existing systems utilize architecture that rigidly requires users to perform a limited number of specific tasks. For example, if a user wants to perform a variety of tasks, the user will have to navigate through and utilize multiple unrelated computer applications to perform various tasks that employ or rely on related data.

In addition to their inaccurate analysis, existing systems suffer from inefficiency. More specifically, since some existing systems can perform tasks inaccurately because they cannot access relevant sources, such existing systems unnecessarily utilize computing resources by going back and forth with a client device to accurately perform a task. Indeed, existing systems spend extra computing resources trying to figure out what information is relevant to a user account when performing a task. Thus, such existing systems do not have contextual knowledge of certain user accounts and cannot generate tailored or relevant outputs (e.g., tasks) for the user account.

These, along with additional problems and issues, exist with regard to conventional large language model systems.

SUMMARY

Embodiments of the present disclosure provide benefits and/or solve one or more of the foregoing or other problems in the art with systems, non-transitory computer readable media, and methods for generating customized applications for generating digital content and/or performing other tasks. In some embodiments, the disclosed systems generate a model application comprising model functions that define data processing for a customized instance of a large language model. In particular, the disclosed systems can determine one or more discrete model functions that are executable by artificial intelligence models (e.g., large language models) and combinable with each other to form combined model functions. In one or more embodiments, the disclosed systems can classify a discrete model function into a function category. For example, the disclosed system can classify the discrete model function into a sense category, a reason category, or an act category. In some cases, the disclosed system can combine the discrete model function with one or more additional model functions. In response to combining the discrete model function with one or more additional model functions, the disclosed systems can generate the model application that defines how a customized instance of the large language model processes data.

The disclosed systems also provide systems, non-transitory computer readable media, and methods for providing a model interaction interface for selecting and utilizing a model application. In particular, the disclosed systems can provide for display on a client device a model interaction interface that includes selectable application elements that instantiate respective applications of a large language model. The disclosed systems can receive an indication of a selection of an application element from among the application elements within the model interaction interface and modify the model interaction interface to include one or more model function elements. In some cases, the model function elements can define a model function for a model application that corresponds to the application element. In one or more implementations, in response to receiving an indication of a selection of a model function element, the disclosed systems can determine a recommended source content item that corresponds to the model function element and further modify the model interaction interface to include a source selection window comprising a source content element that corresponds to the recommended source content item.

BRIEF DESCRIPTION OF THE DRAWINGS

The detailed description provides one or more embodiments with additional specificity and detail through the use of the accompanying drawings, as briefly described below.

FIG. 6 illustrates an example flowchart of a series of acts for generating a model application in accordance with one or more embodiments.

FIG. 14 illustrates an example flowchart of a series of acts for modifying and utilizing a model interaction interface in accordance with one or more embodiments.

FIG. 17 illustrates an example flowchart of a series of acts for generating predicted actions in accordance with one or more embodiments.

DETAILED DESCRIPTION

This disclosure describes one or more embodiments of a model application system that combines discrete model functions and/or additional model functions to generate a model application that dictates how data is processed for a customized instance of a large language model. In one or more embodiments, the model application system can utilize a model interaction interface to seamlessly utilize the model application to perform one or more tasks (e.g., generate documents, perform searches, custom workflow automation) tailored to an entity. For example, in one or more embodiments, the model application system 100 can utilize a model application with a customized instance of a large language model to compose documents, reports, emails, etc.

Figure 1:
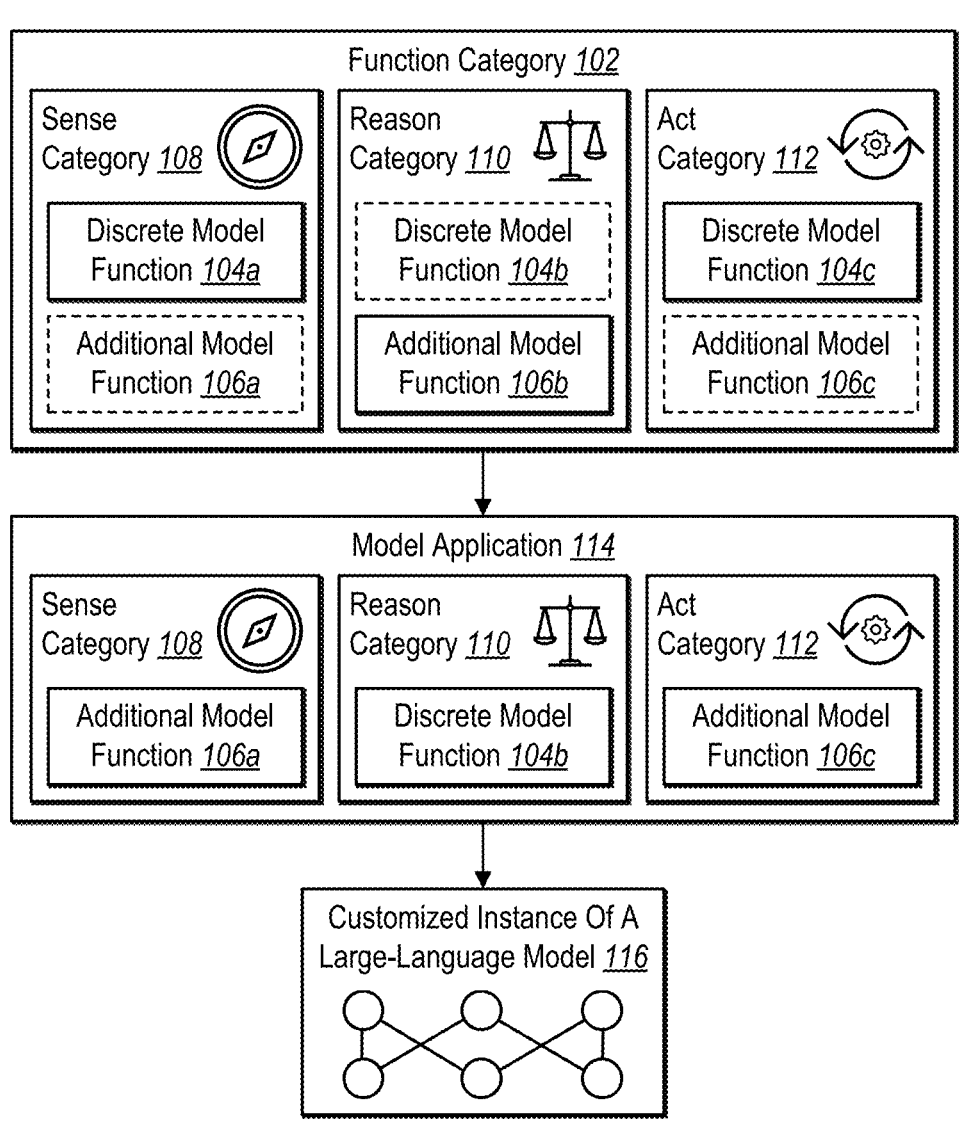
FIG. 1 illustrates an example overview of a model application system generating a model application with one or more embodiments.

FIG. 1 illustrates an example overview of a model application system generating a model application with one or more embodiments. While this disclosure separates the discussion into overarching topics according to various functions or capabilities of the model application system, the model application system can also combine functions from each (or a subset) of the topical discussions. The following paragraphs provide an overview or an introduction to each of the following concepts in order: i) generating a model application, ii) a model interaction interface for utilizing a model application, and iii) generating a predicted action for a model application. Thereafter, additional details regarding each of the main topics are provided in relation to the figures.

Generating a Model Application

As shown in FIG. 1, the model application system 100 can determine and/or select one or more discrete model functions that, when combined, can generate a model application 114, which can perform a variety of tasks, such as composing documents or other source content items with a large language model or automating certain activities. As used herein, the term "discrete model function" refers to an individual logic, operation, and/or function for performing a specific task on a given input. For example, a discrete model function can ingest data (e.g., source content items), process content within a source content item, or send emails. In one or more embodiments, different discrete functions perform different tasks and/or operations. For example, a first discrete model function can identify a marketing trend from data within one or more source content items, and a second discrete model function can generate a summary of the marketing trend. In one or more embodiments, the discrete model functions can be classified into various function categories based on performed functions, tasks, and/or operations. For example, as FIG. 1 illustrates, the function category 102 can include a sense category 108, a reason category 110, and an act category 112.

As just mentioned, the model application system 100 can classify the discrete model functions 104*a-c* and the additional model functions 106*a-c* into a function category 102. As illustrated in FIG. 1, the model application system 100 can classify the discrete model function 104*a* and/or the additional model function 106*a* into the sense category 108 based on the data sensing function performed by the discrete model function 104*a* and/or the additional model function 106*a*.

As used herein, the term "sense category" refers to a function category 102 defining how discrete model functions and/or additional model functions ingest, process, access, and/or extract data related to source content items stored within a content management system, source content items stored on third-party applications (or servers) linked to the content management system via one or more software connectors, or source content items housed on third-party servers (or applications). In one or more cases, discrete model functions within the sense category 108 can also monitor observational layer data, user interaction data, world state data, and/or metadata related to a client device associated with a user account, group of user accounts, and/or an entity. As illustrated in FIG. 1, the model application system 100 can classify the additional model function 106a into the sense category 108 because the additional model function 106a can ingest information such as metadata and the contents of a document stored within a third-party application linked to the content management system.

As further shown in FIG. 1, the model application system 100 can classify the discrete model function 104b into the reason category 110. As used herein, the term "reason category" refers to a function category 102 defining how discrete model functions and/or additional model functions utilize artificial intelligence-based analysis on ingested (or sensed) data. For example, the discrete model function 104a, classified into the reason category 110, can utilize machine-learning models to generate signals regarding, but not limited to, trends, insights, conditions, workflow automation, etc., related to data ingested and/or processed by the discrete model function 104a and/or the additional model function 106a classified into the sense category 108. To further illustrate, the discrete model function 104b, classified into the reason category 110, can utilize a neural network or decision tree to generate one or more suggestions for composing a report based on the document ingested by the additional model function 106a, classified into the sense category 108.

As shown in FIG. 1, in some embodiments, the model application system 100 can classify a discrete model function 104c and/or an additional model function 106c into the act category 112. As used herein, the term "act category" refers to a function category 102 defining how discrete model functions and/or additional model functions execute tasks and/or actions based on one or more signals from the ingested (or sensed) data as described above. For example, the additional model function 106c, classified into the act category 112, can generate summaries, perform automated tasks, streamline workflows, surface suggestions (e.g., predicted actions) or notifications on a client device, etc.

As indicated in FIG. 1, the model application system 100 can generate the model application 114 by combining the discrete model function 104a with one or more additional model functions 106a, c. As used herein, the term "model application" refers to a framework or data structure for performing one or more tasks based on data associated with one or more content items. In one or more embodiments, the model application 114 comprises discrete model functions 104a-c and/or additional model functions 106a-c classified into the sense category 108, the reason category 110, and the act category 112. Indeed, the model application system 100 can generate model applications customized to a user account, group of user accounts, and/or an entity. For example, the model application system 100 can combine the discrete model functions 104a-c and/or the one or more additional model functions 106a-c to generate model applications to perform a variety of tasks tailored to a user associated with a user account or to an organization. For example, the model application system 100 can generate the model application 114 for a customized instance of a large language model by combining the discrete model function 104b with additional model functions 106a, c.

In one or more embodiments, a model application can include a default model application comprising default discrete model functions classified into the sense category 108, the reason category 110, and the act category 112 to perform certain tasks. Additionally, the model application system 100 can receive user input, replacing default discrete model functions with discrete model functions, enabling one or more user accounts to modify and/or customize the default model application to perform one or more tasks specific to one or more user accounts.

As indicated above, the model application 114 comprises model functions (e.g., the discrete model function 104b and/or the additional model functions 106a, c from each function category 102. In particular, the model application 114 can include at least three discrete model functions and/or additional model functions dictating how the model application 114 performs tasks. More specifically, in one or more embodiments, the model application system 100 can combine discrete model functions and/or the additional discrete model functions that are classified into different function categories. Indeed, the model application system 100 can utilize various model functions to customize the model application 114 so that it can perform a variety of tasks specific to a user account, user group, and/or entity.

As just mentioned, the model application 114 can perform one or more tasks customized for a user account, group of user accounts, or an entity. As FIG. 1 shows, the model application system 100 can perform certain tasks by utilizing a customized instance of a large language model 116. For example, in one or more embodiments, the model application system 100 can perform one or more tasks related to composing source content items such as, but not limited to, documents, e-mails, summaries, reports, outlines, and/or code. In such embodiments, the model application system 100 can utilize the discrete model function 104a, the additional model function 106a, and the additional model function 106c to generate the model application 114, defining how the customized instance of the large language model 116 composes one or more source content items. As used herein, the term "customized instance of a large language model" refers to a customized session of a large language model. For example, a customized instance of the large language model 116 can perform one or more tasks (e.g., source content item generation) according to specific instructions or parameters outlined by the model application 114, and user input, such as a prompt, requesting the performance of a task. For example, the customized instance of the large language model 116 can generate a report based on certain content items ingested and analyzed by the model application system 100 according to the discrete model function 104a, the additional model function 106a, and the additional model function 106c. In one or more cases, the customized instance of the large language model 116 can perform one or more tasks reflecting the context (e.g., tone, voice, style, preferences) of the entity or user account associated with requesting the performance of the one or more tasks. While the model application system 100 performs one or more tasks with the customized instance of the large language model 116, the model application system 100 can generate one or more model applications that perform tasks without utilizing the customized instance of the large language model 116.

As illustrated by the foregoing discussion, the present disclosure utilizes a variety of terms to describe the features and benefits of the model application system 100. Additional detail is hereafter provided regarding the meaning of these terms as used in this disclosure. For example, as used herein, the term "digital content item" ("source content item" or simply "content item") refers to a digital object or a digital file that includes information interpretable by a computing device (e.g., a client device) to present information to a user. A content item can include a file or a folder such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented subportion of content from a webpage or some other content item or source. A content item can also include application-specific content that is specific to a particular computer application and is accessible via a file system or via a network connection. A content item can be editable or otherwise modifiable and can also be sharable from one user account (or client device) to another. In some cases, a content item is modifiable by multiple user accounts (or client devices) simultaneously and/or at different times.

Further, as used herein, the term "large language model" refers to a machine learning model trained to perform computer tasks to generate or identify content items in response to trigger events (e.g., user interactions, such as text queries, prompts, and/or button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate model outputs (e.g., content items, searchable data, or query responses) and/or to identify content items based on various contextual data, including graph information from a knowledge graph, world state data, observational layer data, user interaction data, metadata, and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. For example, machine learning models include various types of neural networks, decision trees, support vector machines, linear regression models, and Bayesian networks. In some embodiments, the model application system utilizes a large language machine-learning model in the form of a neural network.

Along these lines, the term "neural network" refers to a machine learning model that can be trained and/or tuned based on inputs to determine classifications, scores, rankings, or approximate unknown functions. For example, a neural network includes a model of interconnected artificial neurons (e.g., organized in layers) that communicate and learn to approximate complex functions and generate outputs (e.g., content items or rankings) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

Additionally, as used herein, the term "model interaction interface" refers to a graphical user interface that displays one or more application elements corresponding to one or more model applications or default model applications. For example, the model interaction interface can include a composition application element corresponding to a composition model application that generates summaries and/or reports. In some embodiments, the model interface can change based on one or more indications of a selection of an application element corresponding to a model application. For example, based on receiving a selection of the composition application element, the model application system 100 can update the model interaction interface to include one or more model function elements that define a model function for the model application.

Relatedly, as used herein, the term "model function" refers to a specific task performed by the model application. In one or more embodiments, a model function is based on and/or relates to the purpose of the model application. For example, a model function for a composition model application can relate to composing certain types of documents. To further illustrate a first model function for a composition model application can relate to drafting an email, while a second model function for the composition model application can relate to drafting a report.

Additionally, in one or more embodiments, a recommended source content item can refer to a source content item relevant to the model function and/or model application. More specifically, in some implementations, the recommended source content item can inform the model application while the model application system 100 performs the requested task. For instance, based on receiving an indication of a selection of a model function element related to generating a report and one or more user interactions with a source content item stored on a third-party application linked to a content management system via a software connector, the model application system 100 can recommend the source content item to a user account to use when generating the report. In particular, the model application system 100 can modify the model interaction interface to include a source selection window. As used herein, the term "source selection window" refers to a window, tab, and/or pane that includes one or more recommended source content items and/or one or more additional recommended source content items. In some embodiments, the source selection window can include a search input field and receive a search query for one or more source content items to use when performing one or more tasks via the model application.

As indicated above, the model application system 100 provides a number of advantages over conventional systems. For example, the model application system 100 provides improved flexibility, navigational efficiency, and computational efficiency over existing systems. Indeed, the model application system 100 improves model application flexibility by providing a unique framework that allows users associated with a user account, a group of user accounts, or an entity to intuitively generate customizable model applications that can perform a variety of tasks within a single system. As opposed to existing systems that rigidly perform a limited number of tasks fixed to interacting with a single application or database, the model application system 100 allows user accounts to customize and generate model applications that can perform a variety of tasks in a single space with access to a wide range of computer applications and databases storing source content items associated with the user account that are not available to prior systems. For example, the model application system 100 can generate a first model application directed towards automating tasks for a marketing group and pulls or ingests information from different sources relevant to the marketing group within an organization and a second model application directed towards identifying suspicious online activities and generating security recommendations for an IT group within the organization. Indeed, the model application system 100 provides a framework that can generate several model applications for groups of user accounts within an entity (or organization) that performs tasks relevant to the groups of user accounts.

Additionally, the model application system 100 can improve navigational efficiency over existing systems. Indeed, the model application system 100 improves navigational efficiency by utilizing a single computer application and/or single user interface to perform tasks, such as, but not limited to, generating documents, searching content items located across various external server locations and/or local databases, and workflow automation. Indeed, while some prior systems require navigating through and interacting with many different applications and interfaces to perform various tasks and search for particular content items, the model application system 100 utilizes a model interaction interface that reduces navigational inefficiency. For example, the model application system 100 does not have to process an excessive number of user interactions or inputs resulting from navigating between different applications and interfaces while performing various tasks (e.g., document generation or workflow automation) or searching for a content item because the model application system 100 can easily switch between model applications within the model interaction interface or receive a single search query and provide a search result with content items from different computer applications in a single, unified interface.

Moreover, the model application system 100 improves computation efficiency by reducing the computational cost of processing an unnecessary number of user inputs, prompts, or queries for performing various tasks. Indeed, the model application system 100 can utilize discrete model functions to intuitively generate customized model applications that can perform several tasks within a single framework (or application). For example, unlike some conventional systems, the model application system 100 does not need to use computing resources to simultaneously run several different and unrelated applications to perform various tasks specific to those applications.

As just discussed, the model application system 100 can utilize discrete model functions to generate a model application for performing various tasks. In particular, FIG. 2 illustrates a model application system 100 utilizing discrete model functions and/or one or more additional model functions classified into a sense category, a reason category, and an act category to perform one or more tasks in accordance with one or more embodiments.

Figure 2:
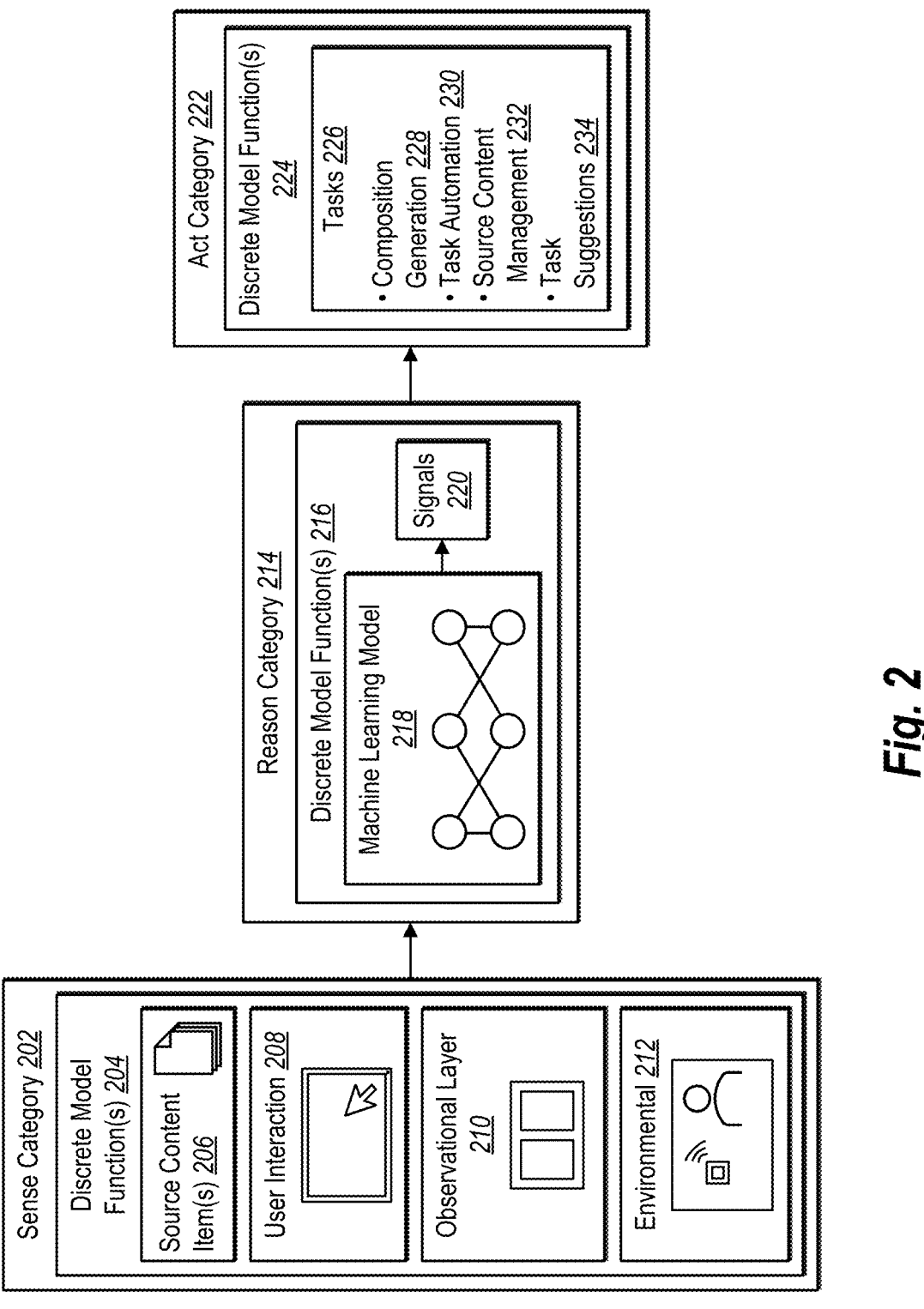
FIG. 2 illustrates a model application system utilizing discrete model functions and/or one or more additional model functions classified into a sense category, a reason category, and an act category to perform one or more tasks in accordance with one or more embodiments.

As shown in FIG. 2, the model application system 100 can classify a discrete model function(s) 204 within a sense category 202. In one or more cases, the model application system 100 can classify the discrete model function(s) 204 based on the capabilities of the discrete model function(s) 204. For example, the discrete model function(s) 204 can perform a variety of tasks related to sensing and/or ingesting a source content item(s) 206 across various data sources. For example, the model application system 100 can ingest and/or access one or more source content items within a content management system and/or third-party applications (or servers) linked to the content management system via a software connector. In certain embodiments, the model application system 100 can sense, ingest, and/or access metadata related to the source content item(s) 206 from the content management system and/or third-party applications (or servers) linked to the content management system via a software connector. In some cases, the model application system 100 can utilize the discrete model function(s) 204 to sense, ingest, and/or access source content item(s) 206 structured within a search index. In one or more implementations, a search index is as described by Devin Mancuso et al. in U.S. patent application Ser. No. 18/815,606, titled GENERATING A HYBRID SEARCH INDEX FOR UNIFIED SEARCH, filed Aug. 26, 2024.

In some cases, the model application system 100 can sense and/or ingest source content items via external searches (e.g., external web searches). In particular, the model application system 100 can access and/or extract source content item(s) 206 (or data) from third-party applications (or servers), websites that are not linked to the content management system via a software connector, and/or external search results. In some cases, the model application system 100 can utilize the discrete model function(s) 204 to extract content and/or metadata from public (or open) third-party applications or websites. For example, the model application system 100 can access, parse, index, and/or analyze the contents of the source content item(s) 206 stored on public websites (e.g., blogs, content hosts, or journals). In one or more embodiments, the model application system 100 can access data or content of the source content item(s) 206 on non-public (or confidential) third-party applications and/or websites via a web browser extension. In one or more cases, the discrete model function(s) 204 can sense and/or ingest audio transcription data.

On top of ingesting and/or sensing data, the model application system 100 can process the source content item(s) 206. For example, the model application system 100 can utilize the discrete model function(s) 204 to process plain text, structured data (e.g., comma-separated values, XLS format), audio, images, and video. For example, in some cases, the model application system 100 can convert structured data into plain text. In some cases, the model application system 100 can process and/or interpret, formatted text and/or structured data (e.g., relational data, hierarchical data, or tabular data) without converting the structured data into plain text. As mentioned, the model application system 100 can ingest and process image and video data. In some cases, processing can involve image analysis techniques such as, optical character recognition (OCR) or image classification. In one or more cases, the model application system 100 can utilize a machine learning model, convolutional neural network, and/or other deep learning techniques to process visual content.

As further shown in FIG. 2, the model application system 100 can utilize the discrete model function(s) 204 to ingest and/or track user interaction data 208, observational layer data 210, and/or environmental data 212. As used herein, the term "user interaction data" refers to information indicating interaction with the one or more content items, input fields, content management system, and/or computer applications provided for display on the graphical user interface of the client device. For example, user interaction data can indicate selections, text input, cursor movements, cursor locations, swipes, scrolling, navigation, etc. with the one or more content items, input fields, and/or computer applications within the graphical user interface of the client device. For example, user interaction data can include detecting the amount of time a user scrolls through a window within a computer application or detecting the number of times a user switches between windows of two different computer applications.

As indicated above, the model application system 100 can track one or more user interactions with third-party applications (or servers) linked to the content management system. For example, the discrete model function(s) 204 can sense access tracking for one or more source content items. In some cases, the model application system 100 can ingest and/or process source content item(s) 206 based on the user interaction data 208. For example, based on receiving or detecting one or more user interactions with a document on a third-party application, the model application system 100, via the discrete model function(s) 204, can retrieve the metadata and/or full-body content of the document. Thus, in one or more embodiments, the model application system 100 can determine the relevance of source content item(s) 206 based on user interaction data 208 associated with the source content item(s). To further illustrate, in some cases, the model application system 100 can track recent activities associated with a user account with source content item(s) 206 stored on a third-party application linked to the content management system via software connectors, and based on the recent activities (e.g., user interaction data), the model application system 100 can ingest source content item(s) or data most relevant or useful to the user account. For example, in some cases, the model application system 100 can monitor and/or detect navigational patterns within a computer application or across various computer applications. As discussed in more detail below, the model application system 100 can utilize the user interaction data (e.g., navigational patterns) to generate suggested tasks (e.g., predicted actions) relevant and useful to the user account, the group of user accounts, or the entity. In some cases, the model application system 100 can detect one or more user interactions with source content item(s) 206 prior to activating the content management system or computer application corresponding to the content management system.

As shown in FIG. 2, the model application system 100 can track observational layer data 210. As used herein, the term "observational layer data" (or "observation layer data") refers to content depicted on a client device. For instance, observational layer data can include data indicating a display of one or more content items on a client device. For example, observational layer data can indicate the position, duration, depth, and/or size of one or more content items and/or one or more portions of content items provided for display on a graphical user interface of a client device. In some cases, observational layer data can include pixel values at various pixel locations on a device display at a particular timestamp, in addition to application data for the various application windows depicting the content reflected by the pixel values. In one or more embodiments, the model application system 100 can monitor and log the observational layer data 210 to better determine one or more suggested tasks (e.g., predicted actions) to provide context-aware assistance to a user account, group of user accounts, and/or an entity.

As FIG. 2 illustrates, the model application system 100 can track and/or monitor the environmental data of the client device associated with the user account, the group of user accounts, or the entity. The term "environmental data" (or world state data) refers to client device data captured by client device sensors (across a single device or across multiple devices in an area), such as an inertial measurement unit (IMU), temperature sensors, light sensors, cameras, microphones, touch sensors, and/or GPS sensors. Environmental data (or world state data) includes client device metrics indicating operating system settings and performance and physical measurements from device sensors (e.g., internal device temperature, fan speed, and screen brightness). Environmental data (or world state data) also includes environmental metrics indicating information about the physical surroundings of a client device, such as the proximity of a user to the device and/or lighting conditions (e.g., indoors or outdoors) of a client device. In some cases, the model application system 100 can log the environmental data 212 and utilize the environmental data 212 to generate task suggestions for the user account, the group of user accounts, and/or the entity.

Additionally, in some embodiments, the model application system 100 can sense metadata associated with the source content item(s) 206 from user accounts, groups of user accounts, and/or entities, and within third-party applications connected to the content management system. For example, the model application system 100 can utilize the discrete model function(s) 204 to sense (or ingest) relationships between the roles, interactions between user accounts and/or groups of user accounts, connections between user accounts and/or groups of user accounts and item(s) 206. Further, in some cases, the model application system 100 can collect information about a third-party application developer and/or data collection methods of the third-party application. Indeed, the model application system 100 can generate a knowledge graph (or map) accounting for the relatedness and/or connectedness amongst (or between) source content item(s) 206, user accounts, and/or groups of user accounts entity-wide by utilizing nodes and edges defining relationships among user accounts, groups of user accounts, and content items stored in the content management system and/or stored on one or more third-party applications linked to the content management system via one or more software connectors. In one or more embodiments, the model application system 100 can utilize the metadata (or knowledge graph) to inform one or more customized context options 312. Thus, the model application system 100 can consider relationships, roles, seniority, etc., while performing one or more tasks for a user account, group of user accounts, the audience, and/or the entity.

As just discussed, the model application system 100 can monitor, track, and/or log the user interaction data 208, the observational layer data 210, and/or the environmental data 212 for the user account, the group of user accounts, a target audience and/or the entity. In some cases, the model application system 100 can monitor the user interaction data 208, the observational layer data 210, and/or the environmental data 212 via browser extensions, desktop computer application extensions that integrate the content management system and the model application system 100 with the desktop computer application (e.g., third party desktop applications), and/or mobile application extensions that extend the functions of the model application system 100 to one or more mobile applications. For example, the model application system 100 can monitor one or more user interactions within a mobile application of the user account.

In some embodiments, the model application system 100 can receive user input directing data ingestion. For example, the model application system 100 can receive user input directing the model application system 100 to ingest messages from a messaging computer application for the last two days.

As further shown in FIG. 2, the model application system 100 can utilize discrete model function(s) 216 classified into a reason category 214 to generate one or more signals 220 reflecting aspects of the ingested and/or processed data and indicating insights about the data and what tasks the model application can and/or should perform. For example, as shown in FIG. 2, the model application system 100 can analyze or further process the source content item(s) 206, the user interaction data 208, the observational layer data 210, and/or the environmental data 212 with a machine-learning model 218 to generate one or more signals 220 reflecting insights, recognizing patterns, providing context-based recommendations, detecting anomalies, determining the intent of a user account, managing task coordination, managing multi-step orchestration, generating and/or satisfying conditional triggers, enforcing policies, identifying compliance requirements, summarizing content, detecting real-time collaboration, and/or directing multi-turn conversations.

As just mentioned, the model application system 100 can generate the one or more signals 220 reflecting insights about incoming and/or ingested data from across one or more computer applications (e.g., third-party applications). As shown in FIG. 2, the model application system 100 can utilize the discrete model function(s) 216 to analyze trends, highlight themes, or analyze patterns from the ingested data. For example, in some cases, the discrete model function(s) 216 can utilize a machine learning model to ingest source content items regarding security protocols utilized by the entity to identify security risks faced by an entity. In one or more cases, the model application system 100 can receive user input defining how the discrete model function(s) 216 of the model application analyze information and/or content of source content item(s) 206.

Additionally, in one or more embodiments, the model application system 100 can receive user input defining how a workflow utilizes the discrete model function(s) 216 and/or the machine-learning model 218 to extract information and optimize decision-making for a user account and/or aid in multi-step workflow orchestration. For example, in some cases, multi-step workflow orchestration can involve multiple steps across various computer applications (e.g., third-party applications) and the model application system 100 can receive user input defining how the system ingests data across the various computer applications. In particular, the model application system 100 can receive user input defining the workflow, such as ingest all customer messages through the messaging app from the last two days, identify customer feedback, categorize the feedback into critical feedback, neutral feedback, or positive feedback, and triage the feedback into specific Jira projects. Indeed, the model application system 100 can utilize and/or combine various discrete model function(s) 216 to analyze ingested and/or sensed data and aid in performing one or more tasks for the model application.

As illustrated by FIG. 2, the model application system 100 can utilize a machine-learning model 218 to analyze and/or generate insights based on the source content item(s) 206, the user interaction data 208, the observational layer data

210, the environmental data 212, and/or the metadata. In one or more embodiments, the model application system 100 can utilize a customized instance of a large language model to generate the one or more signals 220. For example, in some implementations, an application model directed toward text-based content generation can utilize the customized instance of the large language model to analyze minutes (e.g., audio recordings) from one or more meetings. Moreover, the model application system 100 can utilize the customized instance of the large language model to generate summaries of the meetings and extract key actions or tasks that need completion based on analyzing the minutes from the one or more meetings. To further illustrate, in some cases, the model application system 100 can determine how to assign tasks that need completion to one or more user accounts based on the metadata (or knowledge graph) reflecting the roles of the one or more user accounts and/or the relationships (or connectedness) between the one or more user accounts.

As further shown in FIG. 2, the model application system 100 can perform one or more tasks based on the one or more signals 220 generated by the discrete model function(s) 216 classified into the reason category 214. In particular, the model application system 100 can utilize discrete model function(s) 224 classified in the act category 222 to perform and/or complete one or more tasks 226 via computer applications within the content management system and/or on third-party applications linked to the content management system via software connectors. For example, based on the one or more signals 220, the model application system 100 can utilize the discrete model function(s) 224 to perform one or more tasks 226 such as, but not limited to, composition generation 228 (e.g., documents, reports, e-mails), task automation 230, source content management 232, and/or task suggestions 234. For example, based on one or more signals 220 indicating a change in a trend or identifying a specific pattern, a model application utilizing a customized instance of a large language model can perform composition generation 228 by generating a report outlining the changing trend or identified pattern.

In some cases, the task automation 230 can include performing tasks with minimal or zero human intervention, such as submitting forms on computer applications within the content management system and/or on third-party applications linked to the content management system via software connectors. In some cases, the task automation 230 can include managing source content items, generating real-time notifications and/or alerts, automated remediation of issues or non-compliance with industry regulations. In some cases, the discrete model function(s) 224 performing automated tasks can integrate with autonomous agents within the model application to independently automate complex tasks without intervention from the user account. For example, a security agent can monitor document access across platforms, detect suspicious activity, and automatically lock down access to source content items and/or a computer application and/or notify a security management team if the suspicious activity indicates a security risk (or threat). In one or more embodiments, the discrete model function(s) 224 can utilize autonomous agents to monitor data streams, the source content item(s) 206, user interaction data 208, the observational layer data 210, and/or the environmental data 212 in real time.

Additionally, in some cases, source content management 232 can include organizing source content items based on the usage patterns. In some cases, source content management 232 can include managing local files and/or cloud documents between platforms and computer applications to organize, tag, and/or analyze source content item(s) 206 specific to the user account, group of user accounts, and/or the entity. In one or more cases, the source content management 232 can comprise updating the source content item(s) 206 to include the most relevant, recent, and/or accurate information within the source content items.

Moreover, in some cases, task suggestions 234 can include determining and/or performing one or more suggested tasks that streamlines workflows, improves the performance, effectiveness, and/or relevance of the one or more tasks 226 for the user account, group of user accounts, and/or the entity. For example, the task suggestions 234 can include relying on a set of source content items while generating a report, including a step within a workflow, or responding to an email. As discussed in more detail below, the model application system 100 can generate various task suggestions 234 (e.g., suggested tasks or predicted actions) to improve the focus of the user account, group of user accounts, and/or the entity.

As indicated in FIG. 2, the model application system 100 can receive user input combining various discrete model function(s) 204, 216, 224 to generate model applications for performing specific tasks. Indeed, the model application system 100 can combine the discrete model functions to form model applications that monitor access permissions to source content items and remediate issues, track and ensure compliance to internal policies, detect unusual behavior that could lead to security risks, prevent unauthorized sharing of sensitive data, automate approval of administrative heavy tasks (e.g., workflow approval processes), generate summaries about documents, facilitate collaborative document generation and review, generate customized proposals for clients, organize documents, generate notifications about changes to projects, perform task assignments, analyze financial reports, analyze interactions with clients, track customer engagement, monitor the status of a project, intelligently identify security risks and make security recommendations, check compliance of certain documents (e.g., contracts), organize visual assets, analyze and summarize visual media, analyze market trends, monitor employee activity, share documents securely, remediate security risks, onboard new employees. Thus, the model application system 100 and unique sense, reason, and act framework allows user accounts, group of users, and/or entities to perform many tasks with model applications tailored to the needs, preferences, and/or context of the user accounts, group of users, and/or entities.

Figure 3A:
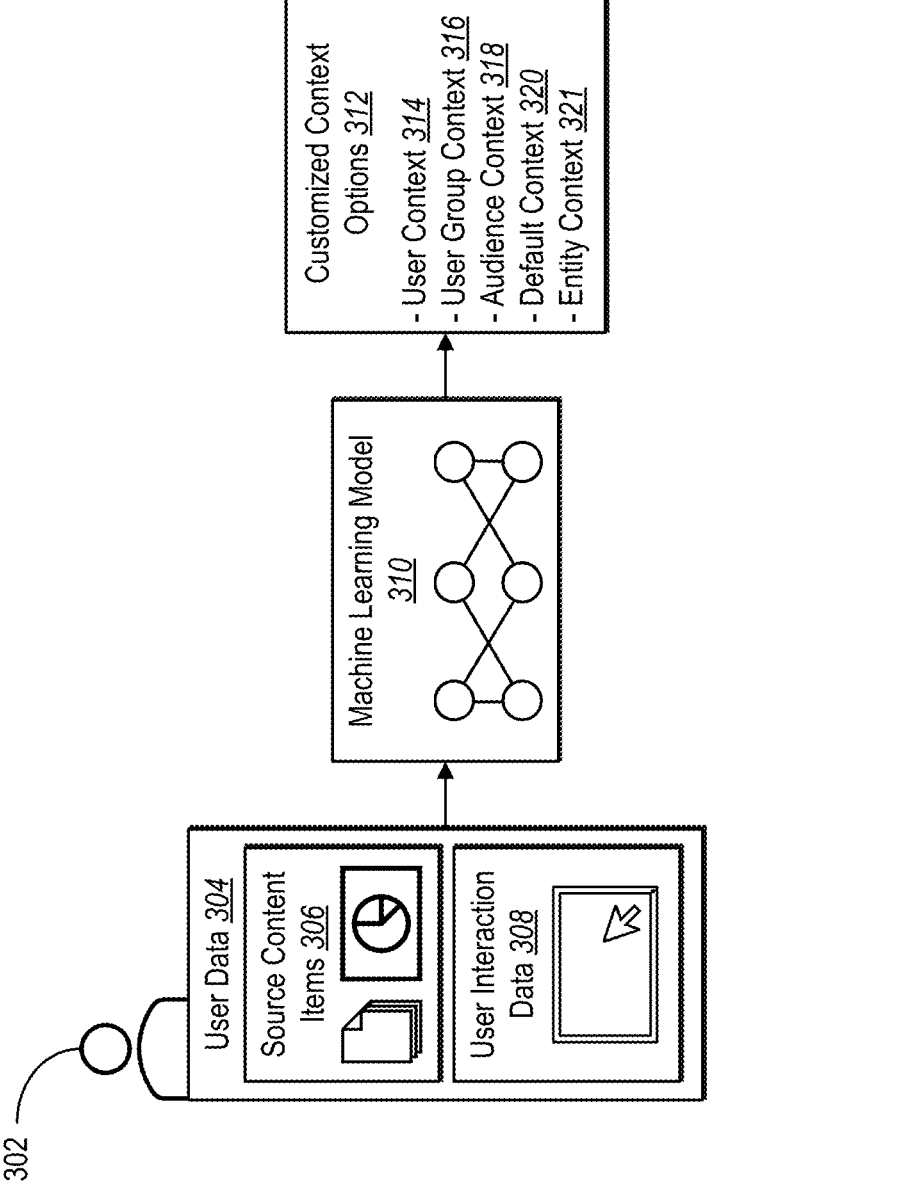
FIGS. 3A-3B illustrate a model application system generating and utilizing customized context options to perform one or more tasks in accordance with one or more embodiments.
Figure 3B:
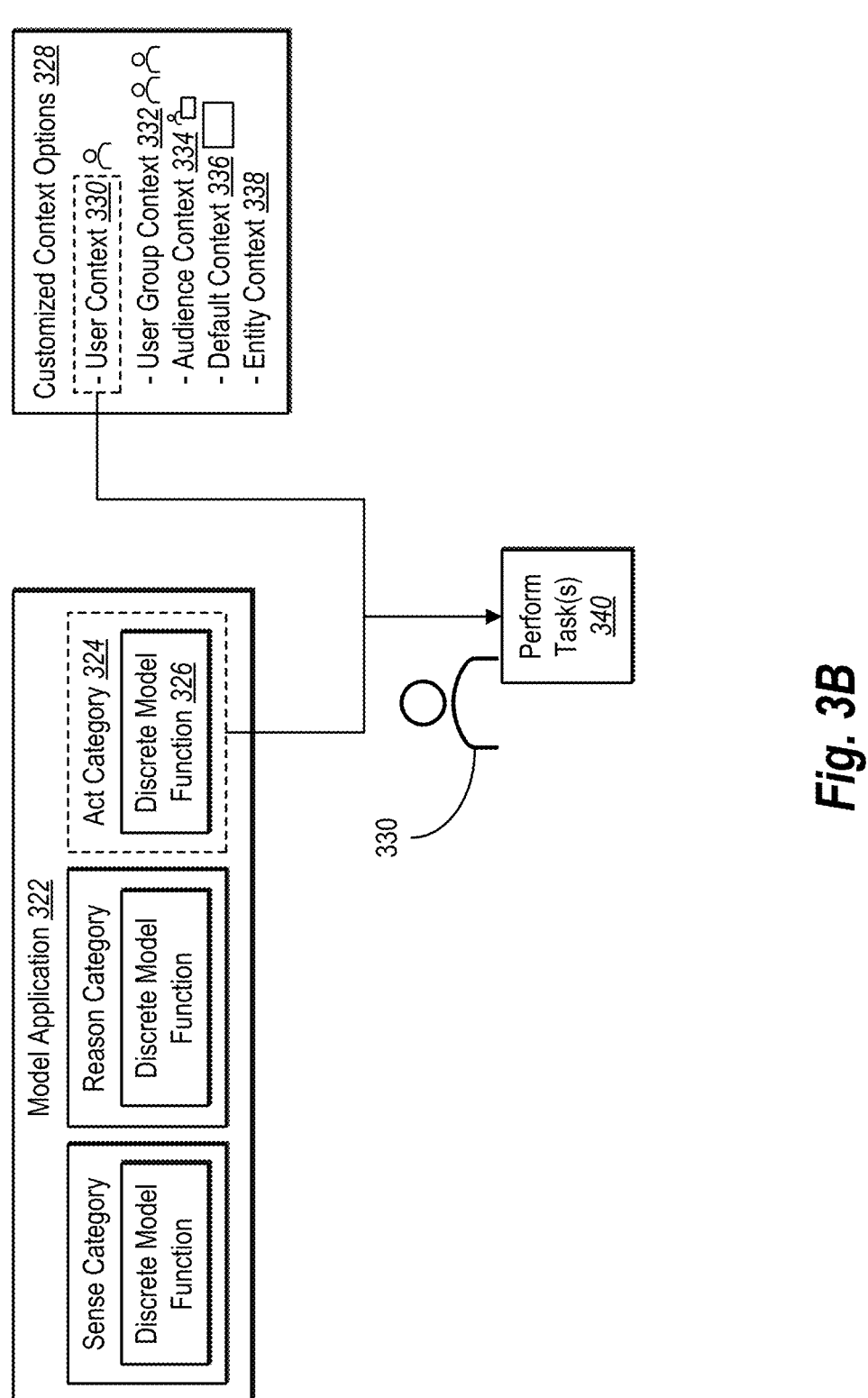

As just discussed, the model application system 100 can utilize a sense, reason, and act framework to sense data, reason with machine learning models to provide insights or generate task automations based on the sensed (or ingested) data, and act to execute various tasks based on the insights and/or task automations. In one or more embodiments, the model application system 100 can perform one or more tasks customized to the context of a user account, group of user accounts, and/or entity associated with the one or more tasks. FIGS. 3A-3B illustrate a model application system 100 generating and utilizing customized context options to perform one or more tasks in accordance with one or more embodiments. In particular, FIG. 3A illustrates the model application system 100 generating customized context options based on user data in accordance with one or more embodiments.

As shown in FIG. 3A, the model application system 100 can receive user data 304 associated with a user account 302. In one or more embodiments, the user data 304 can include one or more source content items 306 associated with the user account 302 and user interaction data 308 associated with the user account 302. For example, the model application system 100 can receive one or more user interactions with one or more source content items 306, computer applications (e.g., third-party applications), and/or websites. In one or more cases, user data 304 can include observational layer data, environmental (or world state) data, and/or metadata associated with the user data 304, a group of user accounts, an audience, and/or an entity. For example, in some cases, the metadata can reflect characteristics of the user account (e.g., role, title, department) and show relationships between the user account 302 and other user accounts, groups of user accounts, audiences (e.g., target audiences), and/or the entity.

As shown in FIG. 3A, the model application system 100 can analyze the user data 304 with a machine learning model 310 to generate one or more customized context options 312. In some implementations, the one or more customized context options 312 can reflect a tone, style, characteristics, role, title, department, preferences, conditions, format, aspect, and/or voice specific to the user account 302, a user group (e.g., group of users), an entity, or an audience. In some embodiments, the one or more customized context options 312 can include a default context 320 that represents a preset or standard tone, style, format, etc.

As just mentioned, the one or more customized context options 312 can correspond to the user account 302, the user group, the entity, or the audience. In particular, a user context 314 can reflect the tone and/or style employed by a user associated with the user account 302 while performing a task, such as generating a composition (e.g., document, report, e-mail). For instance, in one or more embodiments, the model application system 100 can utilize the machine learning model 310 to detect and/or identify common tones, characteristics, formatting, and/or styles of source content items 306 associated with (or generated by) the user account 302 while drafting a composition. Additionally, in some embodiments, the user context 314 can reflect a preferred method, order, and/or delegation of resources for performing one or more tasks. For example, the model application system 100 can utilize the machine learning model 310 to determine which source content items 306 and/or third-party applications the user account prefers to rely on while performing a task. Additionally, in one or more implementations, the user context 314 can indicate the position, relationships, and/or connectedness of the user account 302 regarding one or more user accounts, groups of user accounts, audiences, and/or the entity. For example, the model application system 100 can utilize the machine learning model 310 to analyze a knowledge graph and/or metadata associated with the user account 302 to determine which user accounts manage and/or oversee the user account 302. In some cases, the model application system 100 can utilize the metadata to perform one or more tasks that affect one or more user accounts, groups of user accounts, and/or audiences. In one or more embodiments, the model application system 100 can track and utilize metadata specific to groups of users, audiences, and/or an entity while performing one or more tasks. For example, in one or more embodiments, the model application can be a scheduling model application. In some cases, the scheduling model application can collect, via a discrete model function, the scheduling data (e.g., calendars, appointments, meetings, and/or paid time off) for user accounts within an entity. Based on receiving one or more user inputs from a user account to reschedule a meeting with one or more additional user accounts, the scheduling model application can determine which of the one or more additional user accounts are affected by the rescheduling and reschedule the meeting.

As further indicated in FIG. 3A, the model application system 100 can utilize the analysis performed by the machine learning model 310 on the user data 304 to generate the user context 314 associated with the user account 302. For example, based on analyzing one or more e-mails generated by the user account 302 with the machine learning model 310, the model application system 100 can generate the user context 314, reflecting the writing style and word choice of the user associated with the user account.

Additionally, in one or more embodiments, the model application system 100 can analyze, via the machine learning model 310, previous tasks (e.g., workflows, content management, and/or collaborations) performed and/or managed by the user account 302 and determine a preferred order of operations or steps for completing a workflow. In some cases, the model application system 100 can determine which steps, aspects, and/or features of a task are important to the user account 302 and generate a user context 314 that focuses on and/or highlights those important steps, aspects, and/or features. For example, the model application system 100 can analyze previous security workflows generated by the user account 302 related to complying with regulatory requirements, industry standards, and/or internal policies for protecting sensitive information. In some cases, the model application system 100 can determine the user context 314 based on analyzing the previous security workflows with the machine learning model 310. In some cases, the model application system 100 can determine that the user context 314 for the user account 302 for security workflows should focus heavily on certain steps, such as content access to certain source content items stored on a particular third-party application. In some cases, the user context 314 can correspond to a model application. For example, a user can correspond to multiple user contexts based on the model application. To further illustrate, the user account can have a first user context for a first model application and a second user context for a second model application that differs from the first model application. Indeed, the model application system 100 can analyze user data across various model applications and generate corresponding user contexts.

As just mentioned, the model application system 100 can generate the user context 314 for the user account 302. In one or more cases, the model application system 100 can generate a user group context 316 for a group of users (or user group). As discussed above, the model application system 100 can analyze, via the machine learning model 310, user data (or user group data) associated with the group of users and extract characteristics, features, styles, themes, topics, preferences, assignments, and/or tones associated with one or more source content items 306 associated and/or generated by the group of users. For example, in some cases, the model application system 100 can generate a first user group context for a financial group that reflects the writing style and formatting associated with generating financial reports and a second user group context for a legal group that reflects the tone and preferences utilized by the legal group while generating an investigative report. Indeed, the user group context 316 can effectively address the needs, habits, and/or preferences of a group of users accessing the model application.

Additionally, in some cases, the model application system 100 can generate an entity context 321 reflecting the tone, characteristics, goals, formatting, preferences, status, field, goals, size, resources, culture, and/or market etc., related to an entity. For instance, the model application system 100 can generate a first entity context for an entity involved in social media marketing and a second entity context for a pharmaceutical company. In some cases, the entity context 321 can include and/or reflect regulation requirements based on the field of the entity. For example, the entity context 321 of a hospital would follow, integrate, and/or reflect HIPAA requirements. As described above, the model application system 100 can generate the entity context 321 based on analyzing user data 304. In some cases, the model application system 100 can generate the entity context 321 based on analyzing one or more source content items 306 that are utilized entity wide and/or user interaction data 308 for certain user accounts (e.g., C-suite, human resources, etc.) that generate and/or perform entity wide tasks. Relatedly, in some cases, the entity context 321 can include a preferred standardized format for performing certain tasks. For example, the entity context 321 for generating a product requirements document can include a specific format or template designated for generating the product requirements document. Indeed, in some cases, the entity context 321 can be tailored to specific use cases that rely on the unique search index (e.g., hybrid search index) of the entity. In some cases, the model application system 100 can receive input from user accounts associated with the entity reflecting the goals, targets, values, preferences, etc. of the company that inform the entity context 321. In some cases, the model application system 100 can update and/or modify the entity context 321 based on changes to the entity.

As further shown in FIG. 3A, the model application system 100 can generate an audience context 318 for a target audience that receives, accesses, reads, relies on, edits, reviews, and/or utilizes a historic output (or performed task) of the model application. In some cases, the target audience is a single user account or a group of user accounts. In one or more embodiments, the audience context 318 reflects, the tone, style, preferences, formatting, interests, position, characteristics, etc. of the target audience. In one or more embodiments, the model application system 100 can generate the audience context 318 based on the user data 304 of the target audience. For example, the model application system 100 can analyze the user interaction data 308 and/or feedback from the target audience with a historic output (or performed task) and determine which aspects (e.g., formatting, order of operations, information) the target audience deems important, relevant, and/or prefers. In some cases, the target context 321 can reflect the importance of data analysis based on the target audience interacting heavily with (e.g., clicking, highlighting, adding comments) the data analysis portions of one or more reports sent to the target audience. In some cases, the model application system 100 can utilize the feedback from the target audience to generate and perform one or more target audience suggestions for the target audience.

In some embodiments, the model application system 100 can utilize the one or more source content items 306 generated by the target audience with the machine learning model 310 to determine the entity context 321 by identifying information, data, style, formatting, etc. preferred, relied upon, and/or utilized by the target audience. For example, the model application system 100 can detect source content items (e.g., reports, emails, etc.) or tasks generated and/or performed by the target audience and utilize the tone, style, information, etc. in the source content items to generate the entity context 321. In some cases, the model application system 100 can update the entity context 321 to reflect as the features (e.g., position, role, group) of the target audience changes.

In some cases, the model application system 100 can identify a target audience by analyzing previous communications or source content items received by (or associated with) the target audience. Once the model application system 100 identifies the target audience, the model application system 100 can utilize the machine learning model 310 to generate the audience context 318 reflecting the tone, style, formatting, etc., preferred by and/or associated with the target audience.

As indicated in FIG. 3A, the one or more customized context options 312 can include a default context 320. In one or more embodiments, the default context 320 can include default tones, styles, formats, etc. For example, the default context 320 can include a formal, persuasive, informal, instructional, narrative, analytical tone and/or style for performing certain tasks. For example, in one or more embodiments, the model application system 100 can utilize an informal tone while generating an e-mail inviting a peer of the user account to an event and utilize a formal tone while generating an e-mail inviting a supervisor of the user account to the event. In some cases, the default context 320 can include a standard order of operations and/or workflows outlined for various tasks. For example, a standard workflow could include a standard set of steps, such as creating a task list, defining responsibilities, assigning tasks, check-in data, review, and approval.

In one or more embodiments, the model application system 100 can utilize one or more customized context options 312 to generate and/or perform a task that considers the user account, the target audience, and/or the entity. For example, the model application system 100 can generate an email for a user account and utilize the user context 314 and the audience context 318 for the target audience (e.g., recipient) of the email. In one or more embodiments, the user context 314, the user group context 316, the audience context 318, the default context 320 and/or the entity context 321 can shift and/or change to reflect the changing preferences, goals, and/or landscape of the user account 302, the user group, the target audience, and/or the entity.

Additionally, in one or more embodiments, the model application system 100 can receive user input generating the user context 314, the user group context 316, the audience context 318, and/or the entity context 321. In some cases, the model application system 100 can receive, from the client device, one or more selections of source content items, outputs, and/or performed tasks to generate the user context 314, the user group context 316, the audience context 318, and/or the entity context 321. In some cases, the model application system 100 can generate the one or more customized context options 312 based on receiving one or more user inputs modifying the default context 320. For example, the model application system 100 can receive one or more user interactions and/or user inputs instructing the model application system 100 to create the user context 314, which combines the writing style of the user account with a formal and factual writing style. Indeed, the model application system 100 can generate a variety of one or more customized context options 312 based on modifications and/or combinations to the one or more customized context options 312.

Additionally, in one or more embodiments, the model application system 100 can generate a model application context. In particular, based on the user data 304, the model application system 100 can determine the purpose and/or tasks performed by the model application. In some cases, based on the purpose (or model application context, the model application system 100 can identify one or more discrete model functions from the function categories to combine to generate the model application.

As just discussed, the model application system 100 can generate customized context options based on user data. As indicated above, in one or more cases, the model application system 100 can perform one or more tasks utilizing the customized context options. FIG. 3B illustrates the model application system 100 performing a task with a model application according to a customized context option in accordance with one or more embodiments.

As shown in FIG. 3B, the model application system 100 can utilize a model application 322 with a discrete model function 326 classified in the act category 324 to perform one or more task(s) 340. For example, the model application system 100 can receive, via the model application 322 a prompt and/or request to perform one or more task(s) 340. In particular, based on the capabilities and functions defined by the model application 322, the model application system 100, via the model application 322, can receive a request to organize one or more documents or visual content, automate one or more steps of a workflow, track customer engagement, search a hybrid search index, etc. Indeed, the model application system 100 can perform various tasks through customized model applications.

As described above, the model applications can have different capabilities and perform tasks specific to the model application 322. For example, the model application 322 with a customized instance of a large language model can utilize the discrete model function 326 to generate a summary of a project. As further shown in FIG. 3B, the model application system 100 can determine (or select) a user context 330, a user group context 332, an audience context 334, a default context 336, or an entity context 338 from the customized context options 328. In particular, the model application system 100 can receive one or more user interactions with one or more source content items and/or the model application 322 and determine whether to utilize the user context 330, the user group context 332, the audience context 334, the default context 336, and/or the entity context 338. For example, the model application system 100 can receive, via the model application 322, one or more user inputs to perform a workflow for reviewing a contract. Based on one or more workflows created by the user account, the model application system 100 can determine the order and automation of operations (e.g., user context 330) of the workflow for reviewing the contract. As just indicated, the model application system 100 can utilize the user context 330 that corresponds to the functions and/or capabilities of the model application 322.

In some embodiments, the model application system 100 can determine the user context 330 for the user account based on receiving one or more user interactions with one or more source content items generated and frequently accessed by the user account. For example, based on one or more navigational patterns through specific third-party applications linked to the content management system and one or more user inputs, via the model application 322, the model application system 100 can determine to use a more conversational tone and/or writing style while generating a summary. In some embodiments, the model application system 100 can determine and/or utilize the user context 330 based on the conditions, related to observational layer data, the environmental (or world state data), and/or the metadata and the prompt outlining the task. For example, based on the display time of source content items, the time of day, and the seniority of the user account, the model application system 100 can determine to assign certain tasks for a specific project related to the source content items to one or more user accounts.

As further shown in FIG. 3B and indicated above, the model application system 100 can perform one or more task(s) 340 according to the user context 330. In some cases, performing the one or more task(s) 340 according to the user context 330 can include performing the one or more task(s) 340 in a manner that implements, mimics, and/or integrates the style, tone, preferences, characteristics, etc. associated with the user account. For example, based on the model application 322 utilizing a customized instance of a large language model, the model application system 100 can generate compositions (e.g., documents, reports, e-mails) that implement the tone, writing style, and/or formatting of the user account. For example, the model application system 100 can receive user input (user interactions), directing the customized instance of the large language model to generate an email. In some embodiments, based on the context (e.g., recipient, topic, time of day, urgency) of the email, the model application system 100 can determine to utilize a more formal writing style and format.

As just mentioned, the model application system 100 can perform one or more task(s) 340 according to the user context 330. Indeed, in some cases, the model application system 100 can perform one or more task(s) 340 in a manner informed by a user group context 332, an audience context 334, a default context 336, and/or an entity context 338. For example, in one or more embodiments, the model application system 100 can receive one or more user interactions and/or user inputs from one or more client devices associated with a group of user accounts within the model application 322 to perform one or more task(s) 340. In some cases, the model application system 100 can perform the one or more task(s) 340 according to the user group context 332 based on the preferences, characteristics, department, relationships, roles, etc. of the user group. To illustrate, in one or more embodiments, the model application system 100 can utilize a model application with a customized instance of the large language model that enables real-time document collaboration, generation, and review for a user group (or group of users) within the financial department. In one or more embodiments, the model application system 100 can receive one or more user inputs and/or requests from the group of user accounts to include information within a slide presentation. In some cases, the model application system 100 can generate the slide presentation according to the user group context 332 by generating slides, with formatting, graphs, and/or other visual aids specific to the preferences and needs of the user group in the financial department.

As indicated above, the model application system 100 can perform one or more task(s) 340 according to the audience context 334. For example, the model application system 100 can utilize the model application 322 which employs a workflow for approving new products. In one or more embodiments, the model application 322 can generate a first report of the new product for utilizing a first audience context for the management team overseeing the project and a second report utilizing a second audience context for the president of the company. In some cases, the model application 322 can generate the report according to the first audience context by including detailed description of the workflow describing each step (e.g., proposal, research and development, quality assurance valuation, regulatory compliance checks, testing and customer feedback, review and approval, and production launch) because the management team relies on and needs to be aware of every step in the workflow. Accordingly, in some implementations, the model application 322 can generating the second report according to the second audience context by including financial information and expected market share because the president of the company focuses on the financial information and expected market share.

As further shown in FIG. 3B, the model application system 100 can perform one or more task(s) 340 according to the default context 336. For example, as indicated above, the model application 322 can include default methods, tones, styles, workflows, etc. for performing the one or more task(s) 340. For example, the model application system 100 can utilize the default context 336 for the model application 322 that generates notifications tracking the progress of a project by sending automated notifications one week prior to deadlines and/or important dates for the project to one or more user accounts involved in the project.

In some cases, the model application system 100 can perform one or more task(s) 340 according to the entity context 338. In some cases, the model application 322 can perform the one or more task(s) 340 with the entity context 338 that reflect the goals, preferences, characteristics, size, resources, preferences, culture, etc. of the entity. For example, in some cases, the model application system 100 can perform the one or more task(s) 340 related to analyzing customer feedback. In some implementations, the model application 322 can analyze the customer feedback and generate responses according to first entity context corresponding to a business that values customer service by generating responses to the customer feedback in a manner that is warm and friendly thus, reflecting the entity's focus on customer service. Alternatively, the model application system 100 can analyze the customer feedback and generate responses according to a second entity context corresponding to a business that values efficiency by generating short, straightforward responses to customer feedback.

Additionally, in some cases, the model application system 100 can receive user input from the user account indicating which of the customized context options 328 to employ while performing the one or more task(s) 340.

Figure 4:
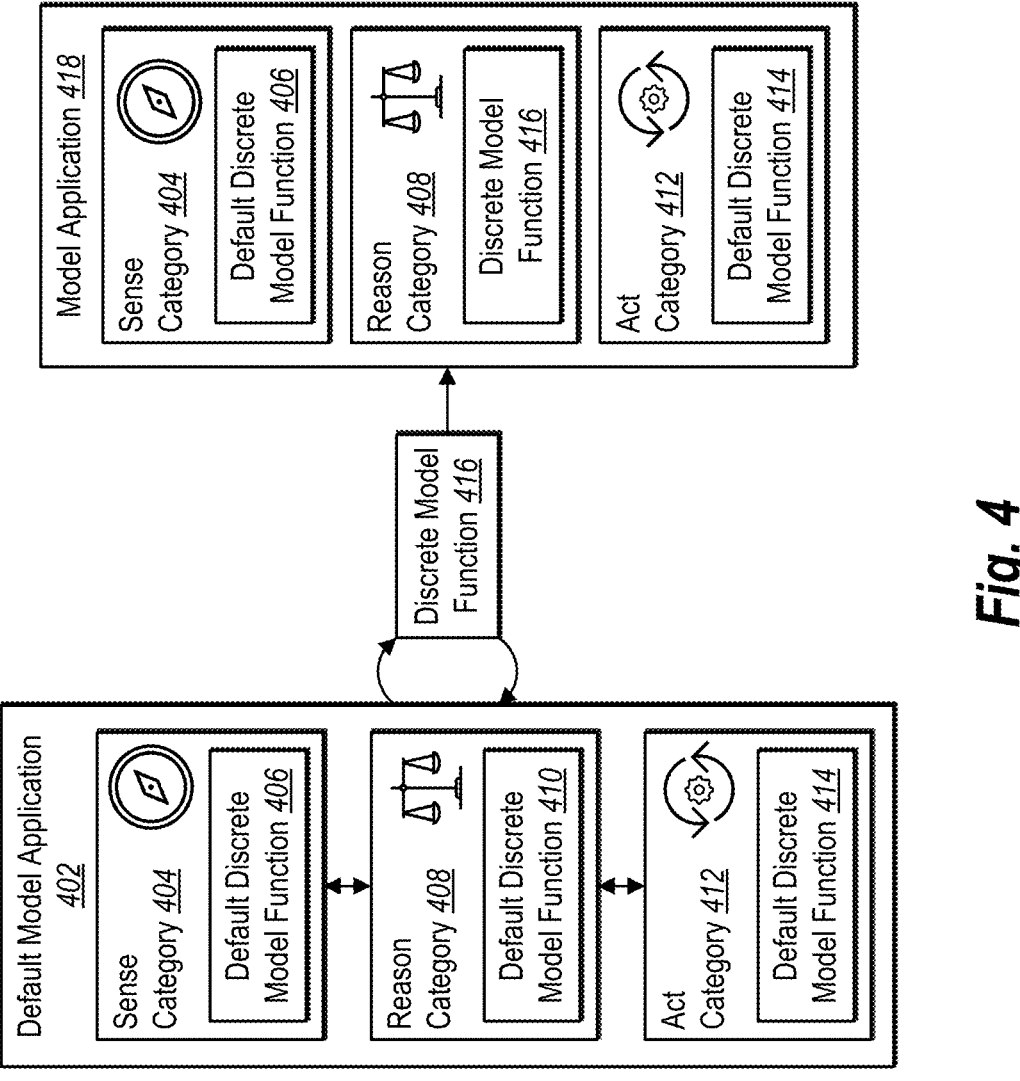
FIG. 4 illustrates a model application system generating a model application by replacing a default discrete model function with a discrete model function in accordance with one or more embodiments.

As previously indicated, the model application system 100 can generate a model application by combining discrete model functions classified into a sense category, a reason category, and an act category. In some embodiments, the model application system 100 can generate a model application by modifying one or more discrete model functions of a default model application. FIG. 4 illustrates the model application system 100 generating a model application by replacing a default discrete model function with a discrete model function in accordance with one or more embodiments.

As shown in FIG. 4, the model application system 100 can generate a default model application 402 with one or more default discrete model functions 406, 410, 414. In particular, the default model application 402 can include a default discrete model function 406 classified into the sense category 404, a default discrete model function 410 classified into the reason category 408, and a default discrete model function 414 classified into the act category 412 to perform designated and/or requested tasks. For example, the model application system 100 can generate and provide a default financial data model application that analyzes financial reports and forecasts potential trends and/or risks. In some cases, the financial data model application can utilize the default discrete model function 406 to ingest source content items with relevant information about financial markets. In some cases, the financial data model application can utilize the default discrete model function 410 to analyze and/or process the financial market information with artificial intelligence tools (e.g., machine learning models). Moreover, the financial data model application can employ the default discrete model function 414 to generate data visualizations reflecting the weaknesses and strengths of the financial markets. In some cases, the model application system 100 can utilize one or more default discrete model functions within each functional category to perform tasks with the model application.

As FIG. 4 indicates, the model application system 100 can modify and/or customize the default model application 402 by replacing one or more default discrete model functions 406, 410, 414 with a discrete model function 416, adding the discrete model function 416 to the default model application 402 and/or combining the one or more default discrete model functions 406, 410, 414 with the discrete model function 416. In some cases, the model application system 100 can modify the model application system 100 by removing the one or more default discrete model functions 406, 410, 414.

As shown in FIG. 4, the model application system 100 can generate a model application 418 by replacing the default discrete model function 410 classified into the reason category 408 with the discrete model function 416. In one or more embodiments, the functions or reasoning operations performed by the discrete model function 416 classified into the reason category 408 can customize and/or personalize the model application 418 to perform one or more tasks relevant and/or helpful to the user account utilizing the model application 418.

For example, the model application system 100 can generate and provide the default model application 402 that focuses on monitoring user activity within a business by flagging risky user behaviors, such as, external data sharing and/or unauthorized computer application use. In one or more embodiments, the default model application 402 can include the default discrete model function 406 of the sense category 404 that monitors user activity data, observational layer data, and/or environmental (or world state data) of the client device associated with the user account. Moreover, the default model application 402 can include the default discrete model function 410 of the reason category 408 that identifies conditional triggers defining risky behaviors of user accounts within an organization. Additionally, the default model application 402 can include the default discrete model function 414 of the act category 412 that generates automated alerts notifying security management teams of the risky behavior of user accounts within the organization.

As shown in FIG. 4, the model application system 100 can modify the default model application 402 by replacing the default discrete model function 410 which identifies conditional triggers defining risky behaviors of user accounts within an organization with the discrete model function 416 which utilizes artificial intelligence based reasoning (e.g., machine learning model) to generating insights of risky behavior that might be missed by the conditional triggers employed by the default discrete model function 410. Moreover, the model application 418 can generate automated alerts notifying security management teams of the risky behavior of user accounts within the organization based on the analysis of the user activity data, observational layer data, and/or environmental (or world state data) of the client device associated with the user account. Indeed, the model application system 100 can generate the model application

418 with the discrete model function 416 that effectively addresses the needs of a security management team.

As indicated above, the model application system 100 can generate the model application 418 by combining, adding, and/or assembling discrete model functions to perform one or more tasks specific to a user account, a user group, and/or an entity. In some cases, the model application system 100 can receive user input selecting the one or more discrete model functions within the sense category 404, the reason category 408, and/or the act category 412 to generate the model application 418 that will ingest content, analyze the ingested content, and perform one or more tasks that are most efficient, effective, and/or accurate for the user account, the user group, and/or the entity.

Moreover, in one or more embodiments, the model application system 100 can receive one or more user inputs from one or more user accounts, modifying the default model application 402 and building the model application 418. Indeed, the model application system 100 can receive one or more user interactions, indicating the combination of discrete model functions that ingest data differently within the sense category 404 of the model application 418. The model application system 100 provides a framework that allows user accounts to generate and/or utilize model applications that address their needs. In some cases, the model application system 100 can share the default model application 402 and/or the model application 418 with multiple user accounts and/or user groups. For example, if the model application 418 solves specific problems for teams, like compliance reporting, document management, and/or customer interaction tracking, the model application system 100 can share and/or provide access to the model application to the user account and/or user groups that would benefit from the model application 418.

Figure 5:
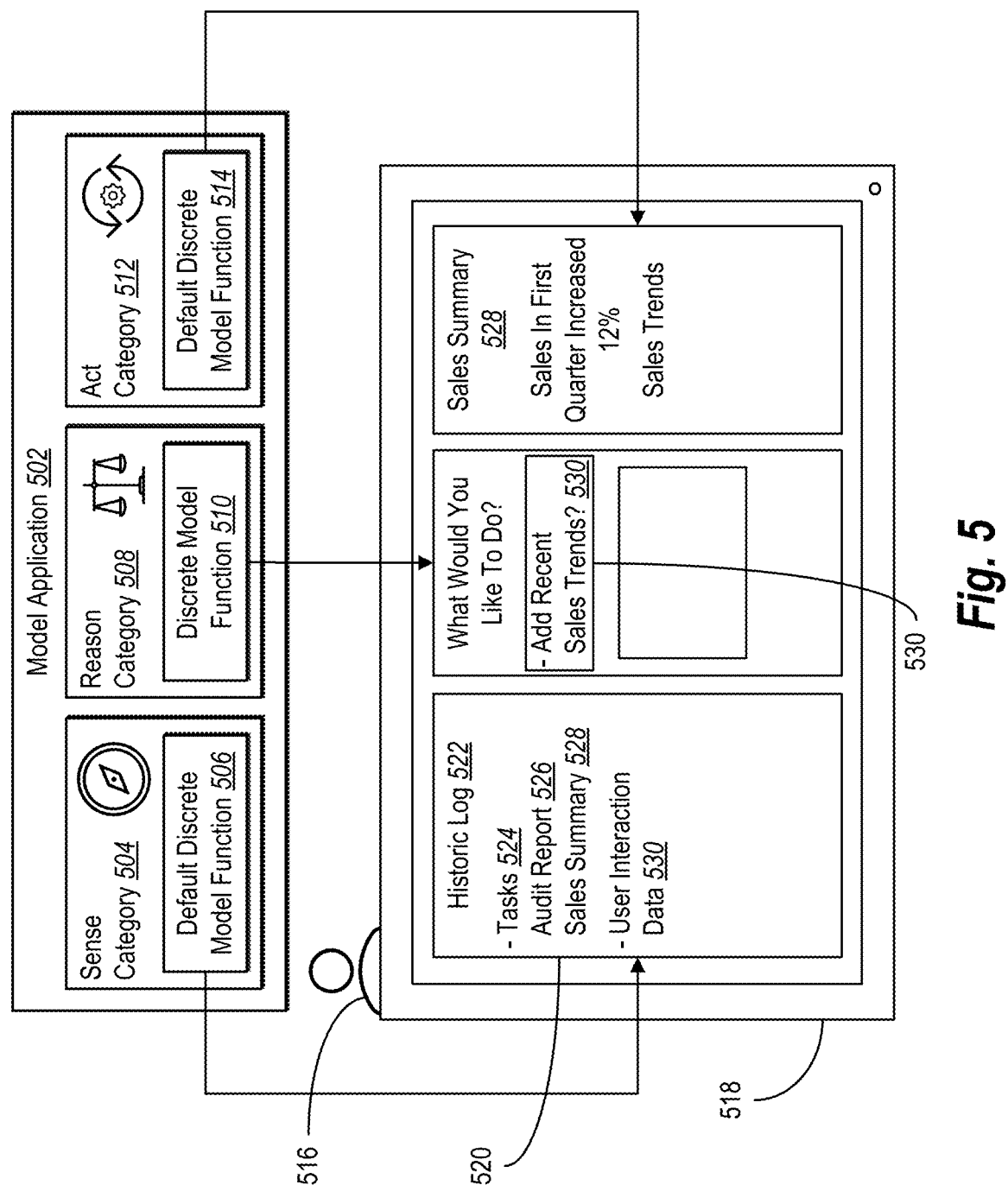
FIG. 5 illustrates a model application system generating a historic log of a model application in accordance with one or more embodiments.

As discussed above, the model application system 100 can perform one or more tasks with a model application that generates an output (or artifact), automates tasks, manages source content items, and/or generates one or more suggested (or predicted) actions. In some cases, the model application system 100 can generate a historic log of the one or more tasks performed by one or more model applications associated with a user account. FIG. 5 illustrates the model application system 100 generating a historic log of a model application in accordance with one or more embodiments.

As shown in FIG. 5 and as discussed above, a model application 502 can include a default discrete model function 506 (or discrete model function) classified into the sense category 504, a discrete model function 510 (or default discrete model function) classified into the reason category 508, and a default discrete model function 514 (or discrete model function) classified into the act category 512 to perform one or more tasks. In some cases, FIG. 5 further shows how one or more default discrete model functions and/or discrete model functions relate to the historic log and/or tasks performed by the model application in accordance with one or more embodiments.

As further shown in FIG. 5, the model application system 100 can provide for display on a client device 518 a model interaction interface 520 comprising one or more windows, panes, and/or tabs where the model application system 100 can receive one or more user inputs from a user account 516 instructing the model application 502 to perform one or more tasks. For example, the model interaction interface 520 can include an input field to receive one or more prompts, queries, and/or search requests.

As shown in FIG. 5, the model application system 100 can generate a historic log 522 that includes one or more tasks

524 (or historic outputs) performed by the model application 502 and user interaction data of the user account 516 with the model application 502. For example, as shown in FIG. 5, the historic log 522 can include an audit report 526 and a sales summary 528 generated by the model application 502 and one or more user interactions, such as a prompt requesting the generation of the audit report 526 and/or the sales summary 528. Indeed, in one or more implementations, the model application system 100 can monitor user interactions and/or historic outputs that utilize one or more third-party applications linked to the content management system via one or more connectors and/or third-party applications that are not linked to the convent management system via software connectors. For example, the historic log 522 can include user interactions on a web-browser and/or locally on a desktop. In some embodiments, the model application system 100 can monitor and log observational layer data and/or environmental (or world state data) associated with the user account while the user account utilizes, accesses, and/or interacts with one or more model applications within the content management system.

Additionally, in one or more embodiments, the historic log 522 can include file sharing, multi-turn conversations with a customized large language model, and/or workflows. For example, the historic log 522 can include conversations between user accounts on a third-party application linked to the content management system or a workflow that utilizes various third-party applications to complete various steps. In some cases, the model application system 100 can generate a historic group log that includes one or more tasks 524 (or historic outputs) performed by the model application 502 and user interaction data of the user group with the model application 502. Indeed, the historic log 522 can generate an information rich knowledge base tailored to a user account, user group, and/or entity within a consistent graphical user interface of the client device 518.

Additionally, in one or more embodiments, the model application system 100 can store the one or more tasks 524 in the historic log 522 (or historic group log) for further processing and/or generation during a subsequent session of the model application 502. For example, the model application system 100 can receive an indication of a selection of the sales summary 528 generated during an initial session of the model application 502 and surface the sales summary 528 on the model interaction interface 520 during a subsequent session for performing edits, updates, and/or suggested actions on the sales summary 528. In some cases, the model application system 100 can open and/or provide for display on the client device, a historic output (e.g., performed task) based on receiving an indication of a selection of a historic output. In some cases, the model application system 100 can refine and/or utilize the re-opened historic output as a starting point for performing new tasks, such as, workflows.

In one or more embodiments, the model application system 100 can generate, store, and/or provide for display on the client device 518 suggested actions (e.g., predicted actions) and/or insights generated by the discrete model function 510 classified in the reason category 508 in the historic log 522. For example, as shown in FIG. 5, the model application system 100 generates a suggested action 530 for enhancing the sales summary 528 by including recent sales trends in the sales summary 528. In some cases, the historic log 522 can include insights related to the suggested action 530 of including recent sales trends in the sales summary 528, such as, market share, target consumer behaviors, etc. In some cases, the historic log 522 allows the user account

516 and/or the user group to seamlessly switch between tasks generated by different model applications accessing different sources.

In one or more embodiments, the model application system 100 can generate a historic group log that includes one or more tasks and/or user interactions with the model application 502 from one or more client devices associated with a group of user accounts. Indeed, the model application system 100 can generate the group historic log to comprise information (e.g., source content items, model outputs, and/or artifacts) relevant and specific to the group of user accounts.

FIGS. 1-5, the corresponding text and the examples provide a number of different systems and methods for generating a model application. In addition to the foregoing, implementations can also be described in terms of flowcharts comprising acts/steps in a method for accomplishing a particular result. For example, FIG. 6 illustrates an example flowchart of a series of acts for generating a hybrid search index in accordance with one or more embodiments.

As illustrated in FIG. 6, the series of acts 600 may include an act 602 of determining discrete model functions. For example, in one or more embodiments, the act 602 can include determining discrete model functions that are executable by a large language model and combinable with one another to form combined model functions. In addition, the series of acts 600 includes an act 604 of classifying a discrete model function from the discrete model functions. For example, in one or more embodiments, the act 604 can include classifying a discrete model function from the discrete model functions into a function category comprising one or more of a sense category, a reason category, or an act category. In addition, the series of acts 600 includes an act 606 of combining the discrete model function with additional model functions. For instance, in some implementations, the act 606 can include combining the discrete model function with one or more additional model functions. As further illustrated in FIG. 6, the series of acts 600 includes an act 608 of generating a model application based on combining the discrete model function with the additional model functions. For example, act 608 can include generating, in response to combining the discrete model function with the one or more additional model functions, a model application defining data processing for a customized instance of the large language model.

Further, in one or more embodiments, the series of acts 600 includes an act of receiving, from a client device associated with a user account, one or more user interactions with one or more content items within a content management system or third-party server linked to the content management system via one or more software connectors. Additionally, the series of acts 600 includes an act of ingesting the one or more content items based on the one or more user interactions with the one or more content items.

Additionally, the series of acts 600 can includes classifying the discrete model function into the sense category. In some cases, the series of acts 600 can include receiving, utilizing the discrete model function classified into the sense category, one or more user interactions with one or more content items within a content management system or third-party server linked to the content management system via one or more software connectors. Moreover, in one or more embodiments, the series of acts 600 can include an act of ingesting, utilizing the discrete model function classified into the sense category, the one or more content items based on the one or more user interactions with the one or more content items.

Further, in one or more embodiments, the series of acts 600 includes classifying the discrete model function into the reason category. Moreover, the series of acts 600 includes generating, utilizing the discrete model function classified into the reason category, one or more signals based on one or more content items or one or more user interactions with the one or more content items. In addition, the series of acts 600 can include generating, based on the one or more signals, one or more tasks to perform within the model application.

In addition, the series of acts 600 can include classifying the discrete model function into the act category; In one or more cases, the series of acts 600 includes performing, utilizing the discrete model function classified into the act category, one or more tasks within the model application, based on one or more signals generated by the discrete model function classified into the reason category.

Moreover, in one or more embodiments, the series of acts 600 includes receiving, from a client device associated with a user account, one or more user interactions with the model application. In some cases, the series of acts 600 includes determining, based the one or more user interactions, a user context associated with the user account. Moreover, in one or more implementations, the series of acts 600 includes performing one or more tasks according to the user context associated with the user account.

In some cases, the series of acts 600 can include receiving, from a client device associated with a user account, one or more user interactions with the model application Additionally, in one or more embodiments, the series of acts 600 includes generating, for one or more user accounts, a historic log comprising the one or more user interactions, and one or more tasks performed by the model application. In some cases, the series of acts 600 includes in response to receiving a request to access the one or more tasks performed by the model application from a client device associated with the one or more user accounts, providing the one or more tasks for display on the client device.

Furthermore, in one or more embodiments, the series of acts 600 includes receiving, from a client device associated with a user account, one or more user interactions with one or more source content items or the model application. Additionally, in some cases, the series of acts 600 can include determining based on the one or more user interactions, a target audience associated with an output of the model application. Moreover, in some implementations, the series of acts 600 includes determining an audience context based on the target audience, by accessing one or more source content items or historic outputs associated with the target audience. Furthermore, in one or more cases, the series of acts 600 includes generating a targeted output specific to the target audience, based on the model application utilizing the audience context.

Moreover, in one or more embodiments, the series of acts 600 can include generating a default model application comprising default discrete model functions that are executable by a large language model, wherein the default discrete model functions correspond to at least one of a function category comprising a sense category, a reason category, or an act category. Additionally, in some cases the series of acts 600 can include determining discrete model functions that are executable by the large language model and combinable with the default discrete model functions. In some implementations, the series of acts 600 includes classifying a discrete model function from the discrete model functions into a function category comprising one or more of the sense category, the reason category, or the act category. In one or more cases, the series of acts 600 can include combining the default discrete model functions and the discrete model functions. Moreover, the series of acts 600 can include generating, in response to combining the default discrete model functions with the discrete model functions, a model application defining data processing for a customized instance of the large language model.

Furthermore, the series of acts 600 can include replacing a default discrete model function with a discrete model function that corresponds to the function category of the default discrete model function.

Additionally, the series of acts 600 includes monitoring, from a client device associated with a user account, one or more user interactions with one or more content items within a content management system or on a third-party server linked to the content management system via one or more software connectors as dictated by the discrete model function classified into the sense category. Moreover, the series of acts 600 can include determining a user context for the user account based on the one or more user interactions. In one or more embodiments, the series of acts 600 can include performing a task with the customized instance of the large language model according to the user context associated with the user account.

Further, the series of acts 600 can include detecting, from a set of client devices associated with a set of user accounts, one or more user interactions with one or more content items within a content management system or on a third-party server linked to the content management system via one or more software connectors according to a default discrete model function classified into the sense category. Moreover, the series of acts 600 includes analyzing at least the one or more content items or the one or more user interactions with the one or more content items according to a discrete model function classified in the reason category.

Moreover, in some cases, the series of acts 600 includes processing one or more content items within a content management system or on a third-party server linked to the content management system via one or more software connectors according to a default discrete model function or a discrete model function classified into the sense category. Additionally, the series of acts 600 includes generating, one or more signals associated with a group of user accounts according to a default discrete model function or a discrete model function classified into the reason category. In one or more cases, the series of acts 600 includes performing, one or more tasks based on the one or more signals associated with the group of user accounts according to at least a default discrete model function or a discrete model function classified into the act category.

Additionally, in one or more implementations, the series of acts 600 can include determining, based on receiving one or more user interactions from one or more client devices associated with a group of user accounts with the model application, a user group context associated with the group of user accounts. Further, the series of acts 600 can include performing, via at least a default discrete model function or a discrete model function classified into the act category one or more tasks according to the user group context associated with the group of user accounts.

Furthermore, the series of acts 600 can include performing one or more tasks based on receiving one or more user interactions with the model application from one or more client devices associated with a group of user accounts. In some embodiments, the series of acts 600 can include generating, for the group of user accounts, a historic group log comprising the one or more tasks performed by the model application. Additionally, in one or more implementations, the series of acts 600 can include in response to receiving a request to access a task from the one or more tasks stored in the historic group log, providing the task for display on a client device associated with the group of user accounts.

Moreover, in some cases, the series of acts 600 can include determining discrete model functions that are executable by a large language model and combinable with one another to form combined model functions. Additionally, in one or more embodiments, the series of acts 600 includes classifying the discrete model functions into one or more function categories comprising one or more of a sense category, a reason category, or an act category. Further, the series of acts 600 can include combining a discrete model function from the discrete model functions with one or more additional discrete model functions classified into a different function category. In some cases, the series of acts 600 includes generating, in response to combining the discrete model function with the one or more additional discrete model functions classified into the different function category, a model application defining data processing for a customized instance of the large language model.

Furthermore, in one or more embodiments, the series of acts 600 includes determining that the model application comprises a first discrete model function classified into the sense category, a second discrete model function classified into the reason category, and a third discrete model function classified into the act category.

Additionally, in some cases, the series of acts 600 can include receiving, from a client device associated with a user account, one or more user interactions with one or more content items within a content management system or third-party server linked to the content management system via one or more software connectors. Moreover, in some implementations, the series of acts 600 includes determining a model application context based on the one or more user interactions. Further, in some cases, the series of acts 600 includes selecting, based on the model application context, a first discrete model function classified into the sense category, a second discrete model function classified into the reason category, and a third discrete model function classified into the act category.

In one or more embodiments, the series of acts 600 can include receiving, from a client device associated with a user account, one or more user interactions with the model application. Additionally, in some cases, the series of acts 600 includes determining at least a tone, style, or voice associated with the user account based on the one or more user interactions. In some cases, the series of acts 600 includes performing a task with the model application according to at least the tone, style, or voice associated with the user account.

Moreover, in one or more implementations, the series of acts 600 includes detecting, one or more user interactions with one or more content items within a content management system or third-party server linked to the content management system via one or more software connectors according to a first discrete model function classified into the sense category. Furthermore, in some cases, the series of acts 600 can include generating one or more signals to automate one or more tasks associated with the one or more content items based on the one or more user interactions according to a second discrete model function classified into the reason category. Moreover, in one or more implementations, the series of acts 600 includes performing a task based on the one or more signals associated with the one or more content items, according to a third discrete model function classified into the act category.

Additionally, in some embodiments, the series of acts 600 can include performing one or more tasks based on receiving from a client device associated with a user account one or more user interactions with the model application. Further, in one or more implementations, the series of acts 600 includes generating, for the user account, a historic log comprising the one or more tasks performed by the model application. In addition, in some cases, the series of acts 600 includes in response to receiving from the client device associated with the user account, a request to access a task from the one or more tasks stored in the historic log, providing the task for display on the client device associated with the user account.

Utilizing a Model Interaction Interface for a Model Application

Figure 7:
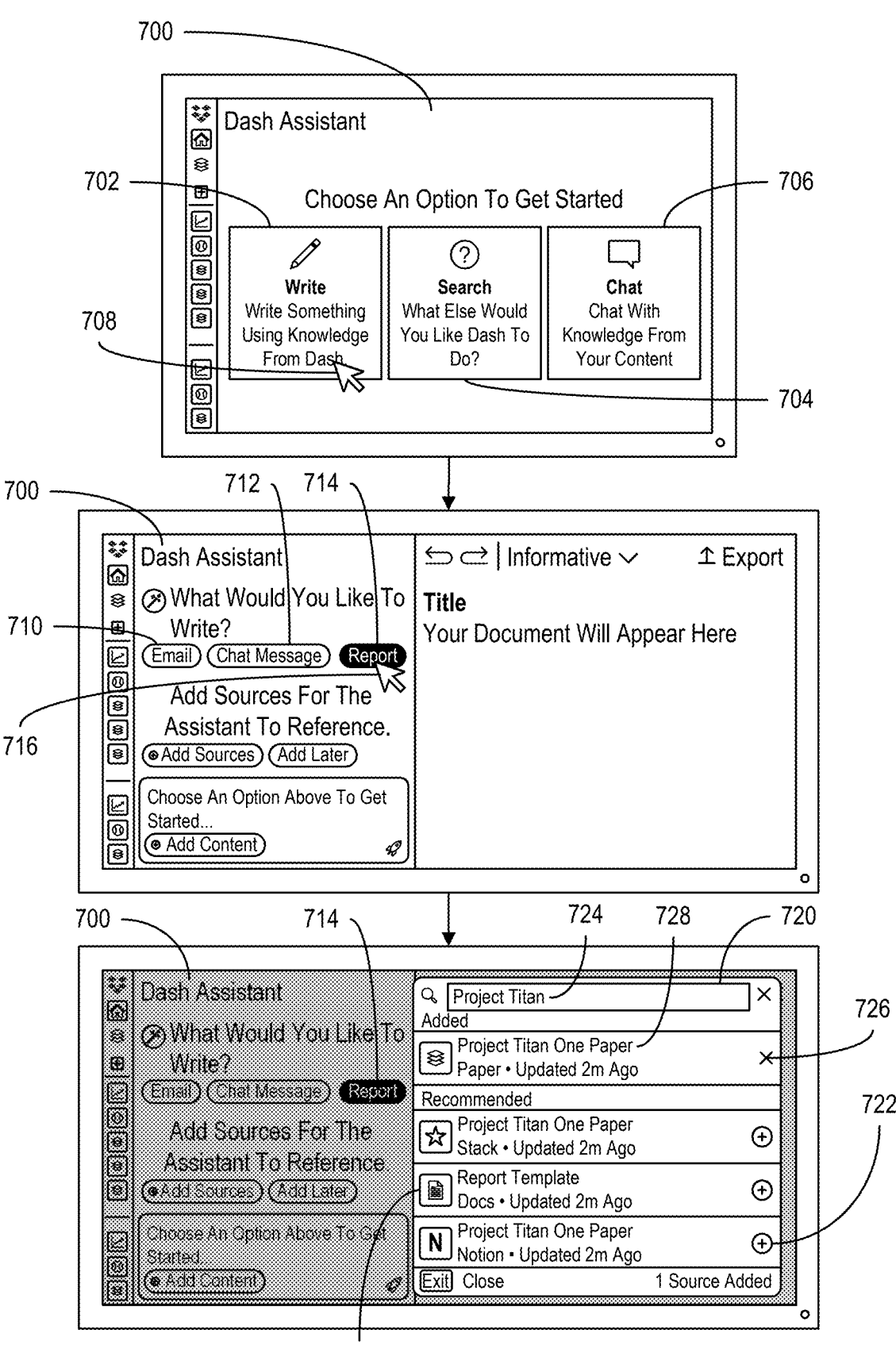
FIG. 7 illustrates an example overview of a model application system modifying a model interaction interface to include recommended source content items in accordance with one or more embodiments.

As mentioned above, in certain embodiments, the model application system 100 can utilize discrete model functions and/or additional model functions to generate a model application that can perform a variety of tasks. For example, the model application system 100 can generate a model application defining data processing for a customized instance of a large language model as described above in relation to FIGS. 1-6. In one or more embodiments, the model application system 100 can utilize a unique model interaction interface to generate model applications and utilize the model applications. FIG. 7 illustrates an example overview of a model application system 100 modifying a model interaction interface to include recommended source content items in accordance with one or more embodiments.

As illustrated in FIG. 7, the model application system 100 can provide for display a model interaction interface 700 that includes application elements 702, 704, and 706 that, when selected, instantiate (or create new instances of) the corresponding model application. For example, as indicated in FIG. 7, the application element 702 can correspond to a composition model application that utilizes a large language model to generate content (e.g., content items). As further shown in FIG. 7, the application element 704 can correspond to a search model application that searches content items within a content management system and content items on a third-party server linked to the content management system via software connectors. To illustrate further, application element 706 can correspond to a multi-turn conversation model application that can handle multiple exchanges to achieve a task.

In some cases, the model interaction interface 700 can include application elements corresponding to model applications directed towards a user account, a group of user accounts, or an entity. For example, the model application system 100 can include application elements of model applications and/or default model applications that a user account utilizes the most or are relevant to the user account based on world state data, environmental data, and/or user interaction data. Indeed, the model application system 100 can customize the model interaction interface 700 for one or more user accounts. For example, in some cases, the model application system 100 can generate a first set of model applications for a first user group and a second set of model applications for a second user group. In particular, the model application system 100 can generate model applications that are relevant and tailored to the first user group and the second user group. Accordingly, in some cases, the model application system 100 can generate a first group model interaction interface for the first that includes a first set of application elements corresponding to the first set of model applications and a second group model interaction interface for the second user group that includes the second set of application elements corresponding to the second set of model applications. In some cases, the model application system 100 can provide for display on a client device associated with the first user group the first group model interaction interface while providing for display on an additional client device associated with the second user group the second group model interaction interface.

As further shown in FIG. 7, the model application system 100 can receive an indication of a selection 708 of the application element 702 and, in response, modify the model interaction interface 700 to include one or more model function elements 710, 712, 714 that correspond to a particular task. For example, a selection of the model function element 710 can instruct the model application to draft an email, a selection of the model function element 712 can inform the model application to generate a chat message, and a selection of the model function element 714 can inform the model application to generate a report.

As indicated in FIG. 7, the one or more model function elements 710, 712, 714 can define a model function for the model application. In particular, the one or more model function elements 710, 712, 714 can correspond to the functions or tasks performed by the application model. For example, one or more model function elements associated with a composition model application can differ from one or more model functions associated with a search model application.

As further shown in FIG. 7, the model application system 100 can receive an indication of a selection 716 of the model function element 714 and determine a recommended source content item 718 that corresponds to the model function element. For example, based on receiving the indication of the selection 716 of the model function element 714 for generating a report, the model application system 100 can determine the recommended source content item 718 of a report template previously employed by the user account. In one or more cases, the model application system 100 can determine multiple recommended source content items corresponding to the model function element based on user interaction data, world state data, and/or environmental data associated with the user account, the group of user accounts, or the entity.

Additionally, as indicated in FIG. 7, the model application system 100 can modify the model interaction interface 700 to include a source selection window 720 comprising a source content element 722 corresponding to the recommended source content item 718. In one or more cases, the model application system 100 can receive an indication of a selection of the source content element 722, and the model application can pull from the recommended source content item 718 while performing the given task. For example, as indicated in FIG. 7, the model application system 100 can generate a report that utilizes the template specific to the recommended source content item 718 (e.g., report template).

As shown in FIG. 7, in one or more embodiments, the source selection window 720 can include a source content search bar 724, where the model application system 100 can receive user input indicating one or more source content items that should inform the model application while completing a task. For example, the model application system 100 can receive user input searching for a document related to "Project Titan" and provide for display one or more source content items related to "Project Titan."

As further shown in FIG. 7, in some cases, the source selection window 720 can include a source content removal element 726 corresponding to a source content item 728 and/or recommended source content item. In some cases, based on receiving an indication of a selection of the source content removal element 726, the model application system 100 can remove the source content item 728 (or recommended source content item) from the source selection window 720. Thus, the model application system 100 can receive user input dictating what information (e.g., source content items) the model application should utilize while performing a task. For example, as shown in FIG. 7, the model application system 100 can generate a report about "Project Titan" that utilizes a specific template outlined by the recommended source content item 718 (e.g., report template) and one or more recommended source content items and/or source content items related to "Project Titan."

Figure 8A:
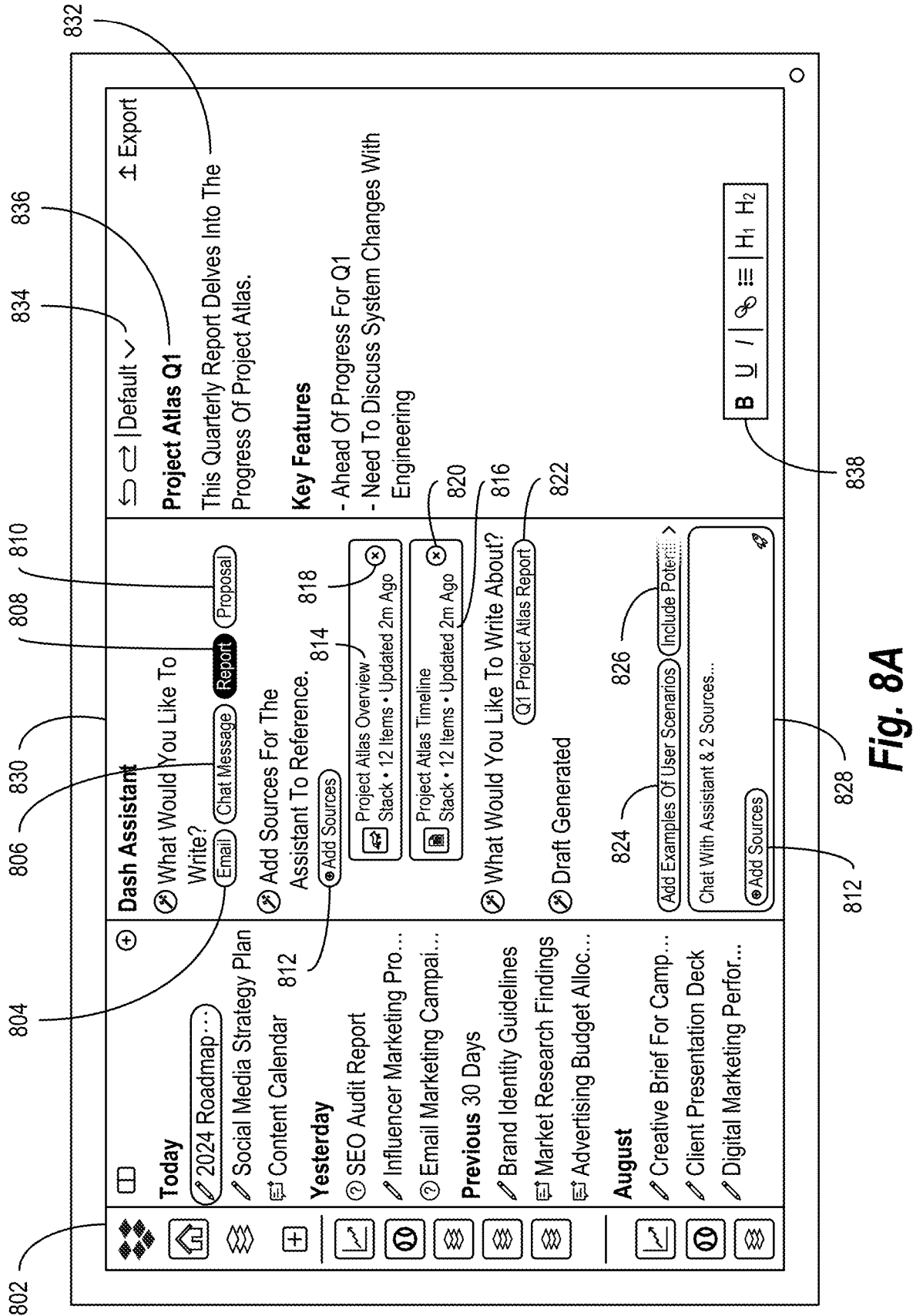
FIGS. 8A-8B illustrate a model application system performing a task within a model application in accordance with one or more embodiments.
Figure 8B:
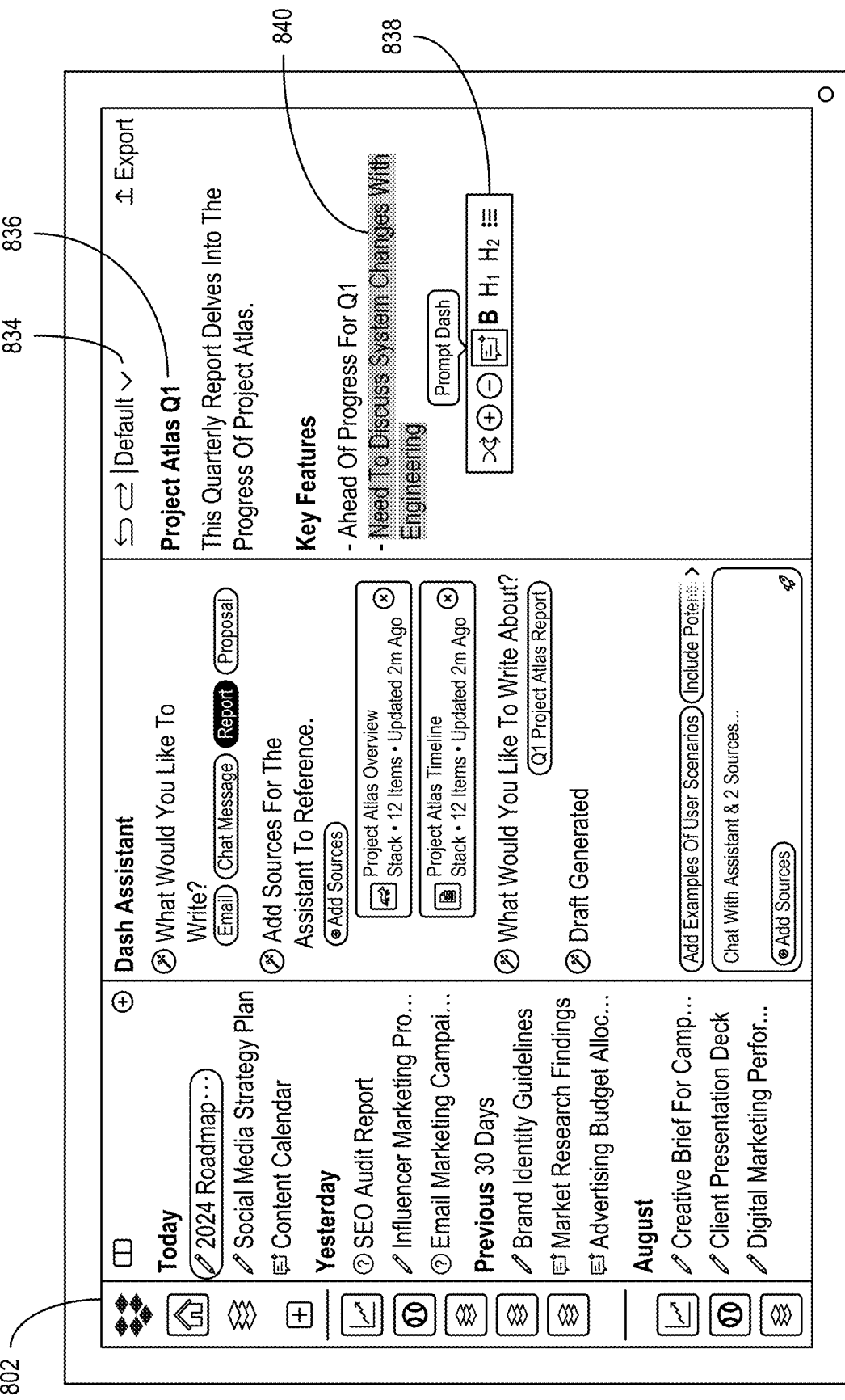

Turning now to FIGS. 8A-8B, the model application system 100 can provide for display on a graphical user interface of a client device the one or more elements, windows, tabs, panes, and/or input fields for performing one or more tasks with a model application. FIGS. 8A-8B illustrate the model application system 100 performing a task within a model application by utilizing a model interaction interface in accordance with one or more embodiments.

As shown in FIG. 8A, the model application system 100 can provide for display a model interaction interface 802. As indicated above, the model interaction interface 802 enables the model application system 100 to receive one or more indications of selections of one or more elements and/or one or more user inputs for performing one or more tasks within a prompt window 830. For example, as discussed above, the model interaction interface 802 can include one or more model function elements 804, 806, 808, 810 that are selectable to define a model function for the model interaction interface 802. For example, the model function element 808 defines a model function for generating a report within the model interaction interface 802. The model function element 804 defines a model function for generating a report within the model interaction interface 802, the model function element 806 defines a model function for generating a chat message, and the model function element 810 defines a model function for generating a proposal. In one or more embodiments, the one or more model function elements 804, 806, 808, 810 can be based on the model application. For instance, the model function elements for a composition model application can differ from the model function elements for a search model application. Additionally, in some cases, the one or more model function elements 804, 806, 808, 810 can be tailored to one or more tasks performed by the user account, user group, and/or entity. For example, the model application system 100 can include a model function element for generating a slide presentation if the user account consistently generates slide presentations. To further illustrate, in one or more cases, the one or more model function elements 804, 806, 808, 810 can reflect the tasks performed by the user group. For example, the prompt window 830 of a model application for a user group of medical professionals can include a charting or health summary element that generates and/or summarizes the health conditions of the patients of the user group of medical professionals. In some cases, the model application system 100 can receive user input defining which model function elements to include within the model interaction interface 802.

As further shown in FIG. 8A, the model interaction interface 802 can include recommended source content items (or source content items) and/or a set of recommended source content items that the model application relies on (or utilizes) to perform a task. For example, as shown in FIG. 8A, the model application system 100, can utilize the content from the recommended source content items Project Atlas Overview 814 and Project Atlas Timeline 816 to generate a report about Project Atlas. In some embodiments, the model application system 100 can provide for display the one or more recommended source content items based on the user interaction data, observational layer data, and/or environmental (or world state data) associated with the user account as described above. For example, based on receiving one or more user interactions with a data table, navigational patterns of the user account, and or the indication of a selection with the model function element 808 for generating a report, the model application system 100 can determine that the data table is relevant to generating the report.

As shown in FIG. 8A, the model application system 100 can receive one or more user inputs adjusting and/or changing the recommended source content items. For example, the prompt window 830 can include an additional recommended source content item element 812 (or additional source content element) for adding one or more additional recommended source content items. For example, based on receiving an indication of a selection of the additional recommended source content item element 812, the model application system 100 can provide for display the source selection window with one or more additional recommended source content items that are relevant to the task performed by the model application. In response to receiving a selection of the one or more additional recommended source content items, the model application system 100 can perform the task and/or update a performed task that relies on the one or more additional recommended source content items. In some cases, the model application system 100 can receive user input indicating whether to rely more heavily on one additional recommended source content item over another. In one or more implementations, the model application system 100 can provide for display and/or link the user account to the recommended source content items and/or the additional recommended source content items based on receiving an indication of a selection of the recommended source content items and/or the additional recommended source content items.

As just discussed, in some cases, the model application system 100 can add one or more additional recommended source content items. In some cases, the model application system 100 can remove one or more recommended source content items and/or one or more additional recommended source content items. As indicated in FIG. 8A, the recommended source content items, Project Atlas Overview 814 and Project Atlas Timeline 816, can correspond to the source content item removal elements 818, 820 (or set of source content removal elements). In some cases, based on receiving an indication of a selection of the source content item removal element 818, 820, the model application system 100 can remove the corresponding recommended source content items and/or the one or more additional recommended source content items from consideration while the model application system 100 performs a given task (e.g., generates the report about Project Atlas). Indeed, the model application system 100 can add, remove, and/or replace recommended source content items and/or additional recommended source content items so that the output (e.g., composition or artifact) generated by the model application includes relevant, recent, and accurate information.

As further shown in FIG. 8A, the model interaction interface 802, can receive a prompt 822 from a client device associated with a user account instructing the model application to perform a task via an input field 828. For example, as FIG. 8A shows, the model application system 100 received a prompt 822 instructing the model application to generate a Q1 Project Atlas Report. In some cases, the model application system 100 can receive feedback and/or additional user input (or additional prompts) requesting modifications and/or adjustments to the output. In some cases, the model application system 100 can log the feedback, modifications, and/or adjustments to the output in the historic log and implement the feedback when performing similar tasks for the user account (or user group) in the future. As FIG. 8A further illustrates, in one or more cases, the input field 828 can include an additional recommended source content item element 812 for adding or including an additional recommended source content item for the model application to utilize while performing the task.

As shown in FIG. 8A, in response to receiving the prompt 822, the model application system 100 can modify the model interaction interface 802 to include an additional window, pane, or tab for providing for display the performed task on the client device. For example, the model application system 100 can modify the model interaction interface 802 to include a composition window 832 (or task window), where the model application system 100 provides for display the report for Project Atlas Q1 (e.g., the performed task 836). In some cases, the model application system 100 can receive one or more user inputs within the composition window 832 (or task window). In particular, the model application system 100 can generate a draft task within the composition window 832 based on receiving one or more user inputs within the composition window 832 (or task window). In some cases, the model application system 100 can augment or update the draft task with content from the recommended source content items. For example, in one or more implementations, the model application system 100 can receive one or more user inputs about deadlines for Project Atlas Q1. In some cases, afterward, the model application system 100 can receive a prompt requesting to generate a report that includes the information about the deadlines. Indeed, the model application system 100 can receive user input via the input field 828 or the composition window 832 modifying, adjusting, and/or formatting the output of the model application. As discussed in more detail below, the model interaction interface 802 can include one or more default tone elements 834 that can dictate the tone of the task (or output) performed or generated by the model application.

As further shown in FIG. 8A, the model interaction interface 802 can include a control bar 838 for quickly modifying a performed task (or output), performing one or more additional actions with the performed task (or output), and/or switching between model applications. For example, the control bar 838 can include one or more elements for performing additional actions with the report for Project Atlas Q1. For example, an element of the control bar 838 could share the report for Project Atlas Q1 with one or more additional user accounts. In one or more embodiments, the control bar 838 can include an element for switching between model applications.

Moreover, in one or more embodiments, the model application system 100 can provide for display within the model interaction interface 802, one or more task suggestion elements 824, 826 corresponding to one or more task suggestions (e.g., suggested tasks or predicted actions). As indicated above, the model application system 100 can determine one or more task suggestions based on user data and/or source content items associated with a user account. For example, in some cases, based on the prompt 822, the Project Atlas Overview 814 and Project Atlas Timeline 816 (e.g., recommended source content items), and the selection of the model function element 808 for generating a report, the model application system 100 can generate task suggestions for including important deadlines related to Project Atlas and/or benefits related to Project Atlas. In one or more embodiments, the model application system 100 can generate the reasoning for the suggested tasks. For example, the model application system 100 can indicate that including the important deadlines and benefits related to Project Atlas will improve the likelihood of completing Project Atlas on time.

In some cases, the model application system 100 can utilize the user data, such as user interaction data, observational layer data, environmental (or world state data), and/or metadata, and one or more source content items related to the user account to generate predictive analytics and/or identify patterns across large datasets from various data sources (e.g., third-party applications) to provide one or more suggested tasks. For example, based on user interaction data and historical data, such as historical outputs and/or performed tasks, the model application system 100 can generate suggested tasks, such as updating security settings or adjusting workflows. In some cases, the model application system 100 can utilize a machine learning model (or artificial intelligence techniques) to forecast potential risks, project delays, and/or bottlenecks and recommend steps within the model application to mitigate the risks, project delays, and/or bottlenecks.

In some cases, the model application system 100 can generate suggested tasks that correspond to the functions of the model application. For example, in one or more embodiments, the model application system 100 can generate one or more suggested tasks directed to a search model application and one or more suggested tasks directed to a composition model application. To further illustrate, the model application system 100 can monitor a current workflow or query. In some cases, based on the workflow and/or query, the model application system 100 can generate a set (or stack) of source content items (or recommended source content items) relevant to the workflow or query. In some cases, based on the user interaction data, observational layer data, and/or environmental data (or world state data) associated with the user account, the model application system 100 can identify and recommend source content items, computer applications, and/or links to add to the set of source content items. In some cases, the model application system 100 can continuously and efficiently refine and curate the set of source content items while the user account utilizes the model application and provide suggested tasks (or updates) to the set of source content items to ensure that the corpus of knowledge for the user account, user group, and/or entity is accessible and relevant. Indeed, the model application system 100 can generate one or more suggested tasks targeted to the needs of the user account, user group, and/or entity.

In some cases, the model application system 100 can generate one or more suggested tasks for an audience. In particular, the model application system 100 can determine one or more audience suggestions (or target audience suggestions) based on one or more source content items associated with the target audience and/or feedback related to a task. For example, the model application system 100 can analyze preferences of the target audience for given tasks and generate suggestions the meet the preferences of the target audiences. In some cases, the model application system 100 can generate one or more target audience suggestion elements corresponding to the one or more target audience suggestions and, in response to a selection of a target audience suggestion element, implementing the target audience suggestion.

In some cases, the model application system 100 can generate one or more suggested tasks with an overarching goal for the user account, the group of user accounts, and/or the entity. For example, the model application system 100 can recognize and/or receive one or more overall goals for the user account related to accomplishing a task or completing a project. In some cases, the one or more suggested tasks can consider and/or aid in accomplishing the overall goal. For example, the model application system 100 can determine that the goal of the user account relates to completing all of the stages for producing a marketing campaign for a new product. In some cases, the one or more suggested tasks can further each stage for completing the marketing campaign.

As indicated in FIG. 8A, the model application system 100 can provide for display within the model interaction interface 802 one or more task suggestion elements 824, 826 that correspond to the one or more task suggestions. In some cases, the one or more task suggestion elements 824, 826 can correspond to types of suggestions. For example, one or more task suggestions can include a composition suggestion for a composition model applications. Accordingly, in some cases, the composition suggestion can correspond to a composition suggestion element. In some cases, in response to receiving an indication of a selection of the one or more task suggestion elements 824, 826 (e.g., composition suggestion element, target audience suggestion element, etc.), the model application system 100 can update a performed task 836 to include the task suggestion. For example, based on receiving an indication of a selection of the task suggestion element 824 for including important deadlines related to Project Atlas, the model application system 100 can update the report for Project Atlas Q1 to include the important deadlines. To further illustrate, in some cases, the model application system 100 can generate one or more task suggestions for a workflow related to a project, such as assigning a task to a specific user account and setting reminders (e.g., notification) about important deadlines of the project based on user interaction data, observational layer data, environmental (or world state data), and/or metadata within the content management system and/or third-party applications linked to the content management system. In some cases, the model application system 100 can provide for display the suggested tasks (e.g., task assignments to the specific user accounts and reminders about important deadlines) and receive an indication of a selection (or approval) of the suggested tasks. Based on receiving the indication of the selection of the suggested tasks, the model application system 100 can integrate the suggested tasks into the.

As just discussed, the model interaction interface 802 can include various features for generating and modifying a performed task, such as generating (or composing) a report. FIG. 8B illustrates the model application system 100 modifying a selected portion of a performed task in accordance with one or more embodiments.

As shown in FIG. 8B, the model application system 100 can detect an indication of a selection (or highlight) of a portion 840 of the performed task. In particular, the model application system 100 can detect an indication of a selection of text within the report of Project Atlas Q1. As FIG. 8B illustrates, the model application system 100 can utilize a control bar 838 to modify the portion 840 of the performed task (e.g., report of Project Atlas Q1).

As shown in FIG. 8B, in some cases, the control bar 838 can include a prompt element where the user account can provide additional input modifying the performed task. In particular, the model application system 100 can receive an indication of a selection of the prompt element within the control bar 838. In response to receiving the indication of a selection of the prompt element, the model application system 100 can open an additional input field within the prompt window 830 where the model application can receive additional user input indicating to lengthen, shorten, reword, add detail, replace, or otherwise modify the portion 840 of the output (or performed task) as indicated by the user account. For example, the model application system 100 can receive additional input directing the model application to modify the portion 840 of the report of Project Atlas Q1 by outlining which system changes need to be discussed with engineering. In some cases, modifying the portion 840 of text of the report of the Project Atlas Q1 can include translating, rewording, and/or adding an image to the portion 840 of text included in the report of the Project Atlas Q1. Moreover, in one or more implementations, the model application system 100 can generate suggested tasks for the portion 840 of the performed task. For example, the model application system 100 can generate and provide for display a suggested task of including benefits of implementing the system changes.

Figure 9A:
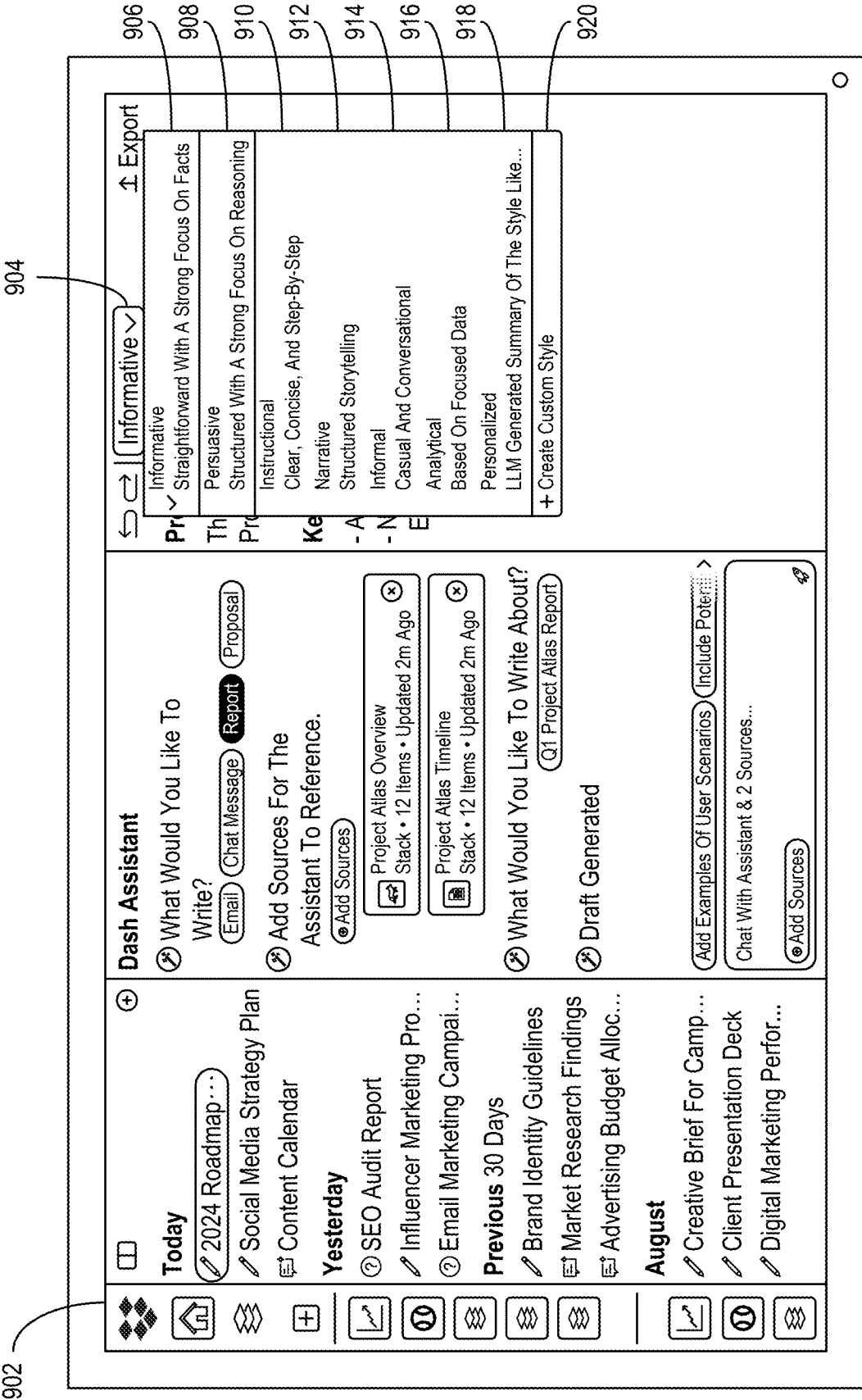
FIGS. 9A-9B illustrate a model application system utilizing one or more default tones and generating and utilizing one or more personalized tones, user group tones, or audience tones while performing a task within a model application in accordance with one or more embodiments.
Figure 9B:
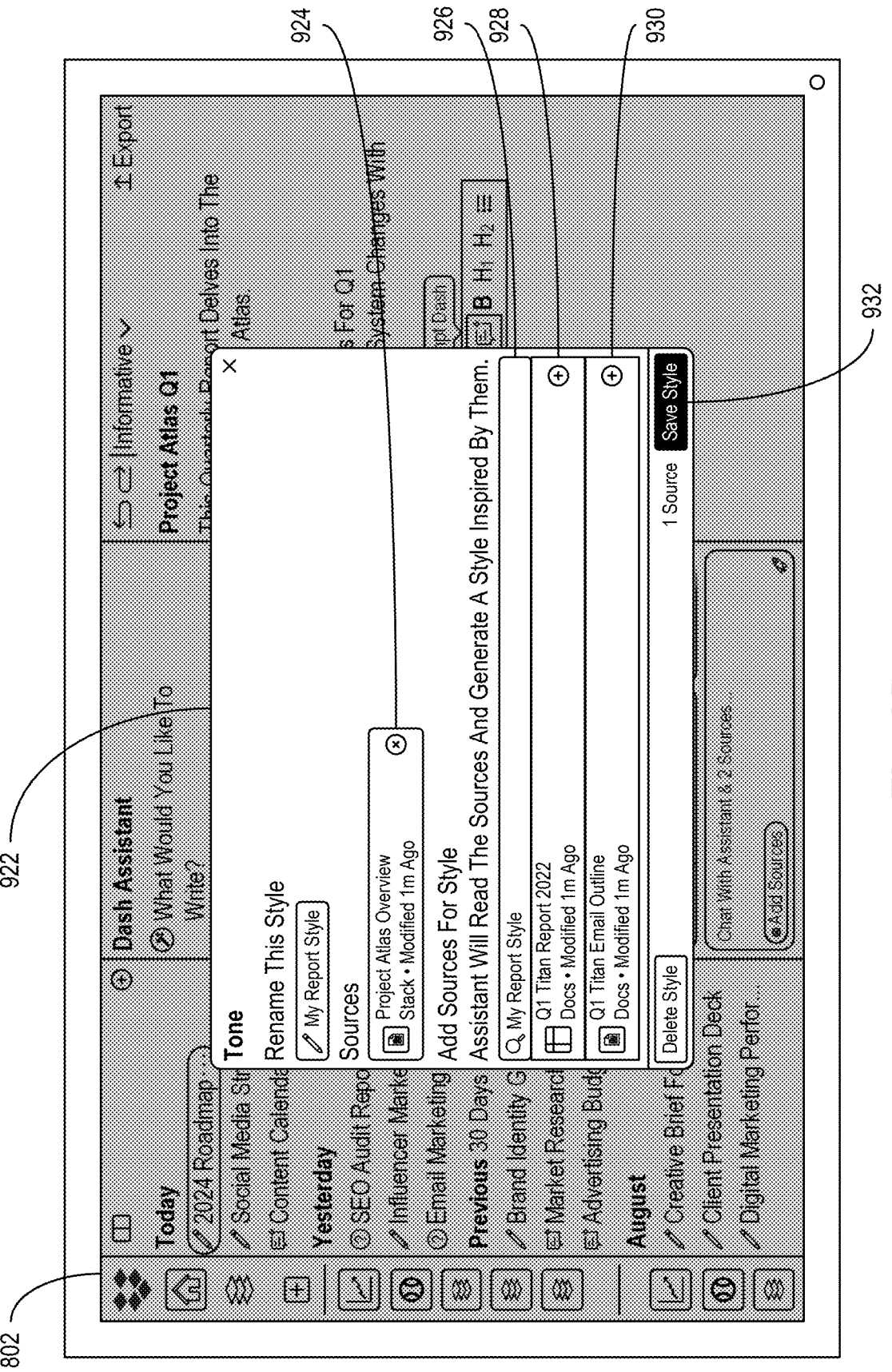

As just discussed, the model application system 100 can utilize the model interaction interface to provide for display one or more tones for performing one or more tasks with the model application. FIGS. 9A-B illustrate the model application system 100 utilizing one or more default tones and generating and utilizing one or more personalized tones, user group tones, or audience tones while performing a task within a model application in accordance with one or more embodiments. In particular, FIG. 9A illustrates the model application system 100 providing for display the one or more default tones and one or more personalized tones within the model function interface in accordance with one or more embodiments As shown in FIG. 9A, a model interaction interface 902 and/or the task window can include a dropdown element 904 that provides for display the one or more selectable default tone elements that correspond to one or more default tones and/or one or more personalized tone elements corresponding to one or more personalized tones for a user account, group of user accounts, a target audience, and/or an entity. For example, as FIG. 9A illustrates, the dropdown element 904 can include default tone elements such as, but not limited to, an informative tone element 906 corresponding to a straightforward tone that focuses on facts, a persuasive tone element 908 corresponding to a structured tone that focuses on reasoning, an instructional tone element 910 corresponding to a clear format that outlines information in a step-by-step format, a narrative tone element 912 corresponding to a storytelling tone, an informal tone element 914 corresponding to a casual and/or conversational tone, an analytical tone element 916 corresponding to a data-driven tone, and/or a personalized tone element 918 corresponding to a tone specific to the user account, the group of user accounts, the target audience, and/or the entity. Relatedly, in one or more cases, the model application system 100 can generate default tones for one or more user accounts based on the role and/or position of the user account. For example, the model application system 100 can perform one or more tasks for user accounts associated with department heads based on the default tone corresponding to the default heads.

As indicated above, the model application system 100 can perform one or more tasks (or draft tasks) according to the default tones or the personalized tones. For example, as shown in FIG. 9A, the model application system 100 can utilize a model application to generate a report for Project Atlas Q1. As indicated in FIG. 9A, the model application system 100 can receive an indication of a selection of the informative tone element 906, and in response, the model application system 100 can generate the report for Project Atlas Q1 with an informative tone that clearly communicates information or data.

In some cases, the model application system 100 can generate a modified default tone by combining a default tone with a personalized tone (or user tone). For example, the model application system 100 can generate a modified default tone based on augmenting, combining, and/or adjusting the default tone with the style, tone, formatting, etc. of a user account, group of user accounts, and/or entity in one or more source content items, performed tasks, or outputs generated by the model application. For example, the model application system 100 can generate a modified default tone that combines the default informative tone with the writing style of the user account. Additionally, in one or more embodiments, the model application system 100 can perform one or more tasks utilizing the modified default tone. For instance, the model application system 100 can utilize the model application to generate an annual employee review for an employee with a modified default tone that combines the default informative tone with the writing style of the user account generating the annual employee review.

As further shown in FIG. 9A, the model application system 100 can change the tone of one or more performed tasks by receiving an indication of a selection of a different tone element. For example, based on receiving an indication of the analytical tone element 916, the model application system 100 can update the tone of the report for Project Atlas Q1 from the informative tone to an analytical tone that highlights relationships and/or patterns between data or information included in the report for Project Atlas Q1. In one or more cases, the model application system 100 can receive an indication of a selection of the personalized tone element 918 and perform a task according to the personalized tone associated with the personalized tone element 918. For example, the model application system 100 can generate a personalized tone for a user account that reflects writing style, formatting, writing patterns, etc., specific to a user account and utilize the personalized tone while performing a task, such as generating the report for Project Atlas Q1 with a writing style that mimics the writing style of the user account. In some cases, the dropdown element 904 can include a personalized tone generation element 920 for generating a personalized tone.

In some embodiments, based on the prompt and/or contents of the performed task, the model application system 100 can suggest a tone to utilize while performing the task. For example, based on receiving user input instructing the model application to generate proposal for a product, the model application system 100 can suggest utilizing a persuasive tone that focuses on the benefits of the product.

As described above, in one or more embodiments, the model application system 100 can detect an indication of a selection of a portion of a performed task (or output) of the model application. In some cases, the model application system 100 can modify or apply a selected tone to the portion of the performed task (or output). For example, the model application system 100 can generate, via the model application, a proposal for a new product with a persuasive tone. In one or more embodiments, the model application system 100 can receive an indication of a selection of the portion of the new product about market share and potential profitability of the new product. Additionally, the model application system 100 can apply the analytical tone to the portion of the report regarding market share and potential profitability to show how market conditions can lead to the potential profitability of the new product. Indeed, in some cases, the performed task (or output) can utilize any combination of tones that effectively communicate relevant information.

As just mentioned, the model application system 100 can generate and utilize a personalized tone. FIG. 9B illustrates the model application system 100 generating a personalized tone in accordance with one or more embodiments. As just mentioned, the dropdown element 904 can include a personalized tone generation element 920 for generating a personalized tone. In one or more cases, in response to receiving an indication of a selection of the personalized tone generation element 920, the model application system 100 can update the model interaction interface 902 to include a personalized tone window 922. In one or more embodiments, the personalized tone window 922 can include one or more source content items 924, 928, 930 that the model application system 100 can utilize to generate a personalized tone. For example, the model application system 100 can analyze via a machine learning model the one or more source content items 924, 928, 930 associated with and/or generated by the user account and generate a personalized tone that reflects the writing style, writing habits, verbiage, focus, or formatting preferences of the user account. In some cases, the model application system 100 can utilize recommended source content items as stylistic sources. Additionally, the model application system 100 can generate the personalized tone based on the style utilized by unrelated source content items. In one or more cases, the model application system 100 can utilize user interaction data, observational layer data, environmental data (or world state data), and/or metadata to generate the personalized tone.

In sone or more embodiments, the personalized tone window 922 can include a search input field 926 for receiving user input searching for a source content item to utilize to generate the personalized tone. As indicated above, the one or more additional model functions can generate a personalized tone for a group of user accounts, a target audience, and/or an entity. Moreover, as illustrated in FIG. 9B, the personalized tone window 922 can include a save tone element 932 for saving the personalized tone. For example, as described above, a group of user accounts (or user group) can access and utilize a model application to perform one or more tasks, such as drafting a document, report, or proposal. In one or more embodiments, the model application system 100 can generate the personalized tone based on the style, department, and/or formatting preferred and/or utilized by the group of user accounts. For instance, the model application system 100 can analyze, via a machine learning model, one or more source content items and/or performed tasks (or outputs) corresponding to the group of users. In some cases, the model application system 100 can generate a user group personalized tone by extracting and applying the writing style, focus, and/or formatting found in the one or more source content items and/or performed tasks (or outputs) corresponding to the group of user accounts.

In one or more embodiments, the model application system 100 can generate a personalized tone (or audience tone) for a target audience. In some cases, the personalized tone for the target audience can include a writing style, tone, focus, and/or format preferred by the target audience. For instance, one or more embodiments, the model application system 100 can detect and/or identify one or more source content items and/or outputs (e.g., historical outputs) accessed and or received by the target audience. To illustrate, the model application system 100 can identify one or more investigation reports sent to a department head within an organization for review. In some cases, the model application system 100 can identify feedback, such as but not limited to, comments, questions, clarifications, edits (e.g., redlines), formatting modifications related to the target audience (e.g., department head) in relation to the one or more investigation reports and/or one or more source content items (e.g., standard operating procedures) associated with the one or more investigation reports. In one or more cases, the model application system 100 can analyze the feedback, via a machine learning model, and generate a personalized tone that utilizes a style, formatting, and includes information relevant to the target audience. Thus, in some implementations when the user account generates an investigation report to send to the department head for review, the model application system 100 can generate the investigation report with the personalized tone tailored to the target audience.

Additionally, in some cases, the model application system 100 can generate a personalized tone for an entity. In particular, the model application system 100 can analyze one or more source content items that reflect the writing style, tone, focus, formatting, etc. of an entity, such as a business, organization, and/or department. In some cases, the model application system 100 can analyze, via the machine learning model, one or more source content items, one or more tasks, or output (e.g., historic outputs) related to the entity as a whole and determine a tone (e.g., inspirational, uplifting, direct), writing style, format, etc. that reflects the characteristics, goals, and/or attributes of the entity. For example, in one or more cases, based on generating a social media post about a product, the model application system 100 can generate and utilize a social media brand tone for the social media post. Indeed, in one or more cases, the model application system 100 can associated default tones with one or more tasks.

As discussed above, the model application system 100 can perform one or more tasks, such as document generation according to default tone or a personalized tone. In some cases, the model application system 100 can perform a task utilizing a combination of tones. For example, the model application system 100 can generate a report that utilizes a personalized tone for a user account with a personalized tone for the target audience. Additionally, the model application system 100 can perform the one or more tasks within the model application with the selected tone (e.g., default tone, modified default tone, and/or personalized tone) across different sessions of performing the one or more tasks. Indeed, as described above, the model application system 100 can start performing a task using a personalized tone for the user account during an initial session. In some cases, when the user account accesses the task in a subsequent session, the model application system 100 can utilize the personalized tone from the initial session. Indeed, the tone of performing one or more tasks is not session specific but can persist across one or more sessions. Thus, the model application system 100 can perform a variety of tasks that are tailored to the user account performing the task and the target audience consuming, accessing, or reviewing the task.

Figure 10A:
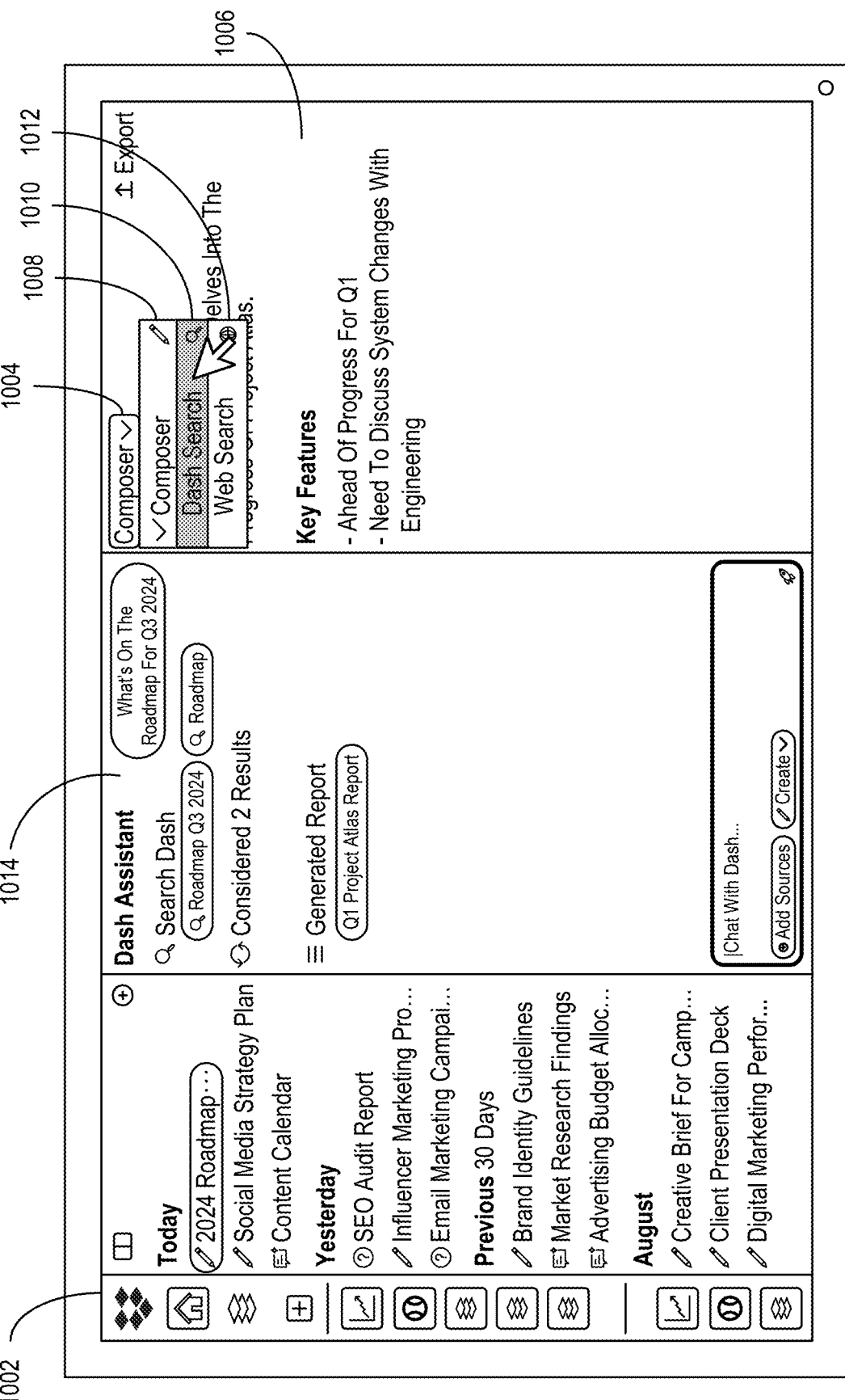
FIGS. 10A-10B illustrate a model application system switching between model applications in accordance with one or more embodiments.
Figure 10B:
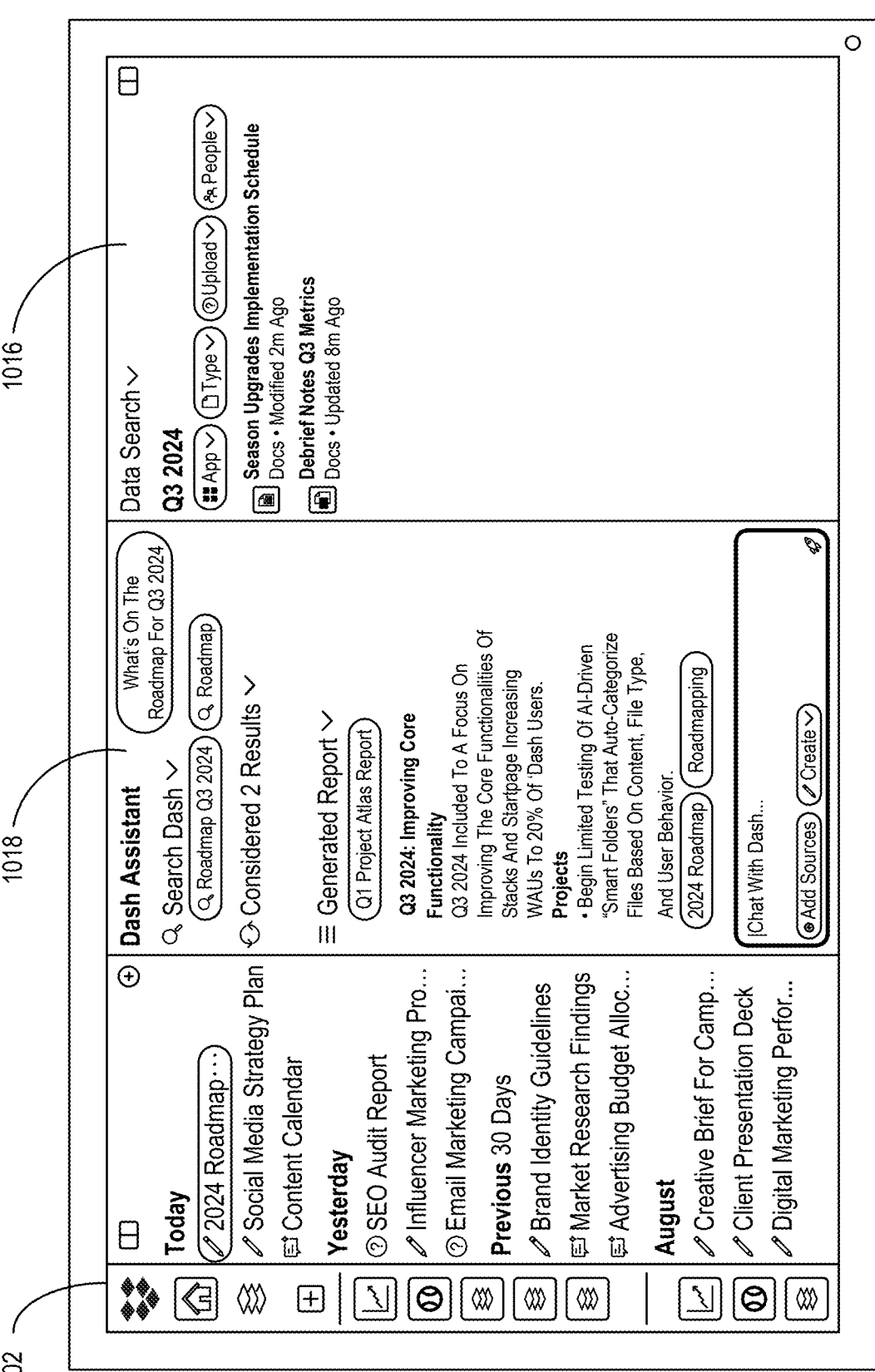

As mentioned above, the model interaction interface can include one or more elements for seamlessly navigating between model applications within a unified graphical user interface. FIGS. 10A-10B illustrate the model application system 100 switching between model applications in accordance with one or more embodiments. In one or more embodiments, the model application system 100 can receive an indication of a selection of a composition model application within a model interaction interface 1002. As indicated above, the model application system 100 can generate documents, reports, summaries, source content items, etc., utilizing the composition model application. For example, as shown in FIG. 10A, the model application system 100 can utilize the composition model application to generate a quarterly progress report of Project Atlas within a composition window 1006.

As further shown in FIG. 10A, the composition window 1006 can include an additional dropdown element 1004 comprising one or more additional application elements corresponding to one or more additional model applications that differ from each other. In particular, the additional dropdown element 1004 can include a composition model application element 1008, a unified search model application element 1010 corresponding to a unified search model application, or a web-search model application element 1012 corresponding to a web-search model application. In one or more embodiments, the model application system 100 can receive an indication of a selection of the unified search model application element 1010 or the web-search model application element 1012 and modify the model interaction interface 1002 by switching the composition window 1006 to a different window that corresponds to a unified search model application or a web-search application. In some cases, the model application system 100 can generate a task suggestion to switch to one or more different model applications. For example, based on user interaction data with model application and/or one more source content items (or recommended source content items) and/or outputs of the model application for a user account, the model application system 100 can suggest to the user account to switch to a multi-turn conversation model application to learn some additional information about the performed task. In some cases, along with the suggestion to switch to the different model application, the model application system 100 can include one or more suggested tasks to perform in the other model application. For example, the model application system 100 can generate a task suggestion of switching to the unified search model application and searching the benefits of security compliance within the entity.

In one or more embodiments, the model application system 100 can receive one or more search queries within the user input field of the unified search model application to search one or more source content items stored within the content management system and/or within third-party applications linked to the source content management system via software connectors. As mentioned above, the model application system 100 can generate sets of source content items related to certain topics, themes, projects, departments, groups of user accounts, and/or user accounts. In some cases, the model application system 100 can receive a search query just for the set of source content items. Thus, in one or more embodiments, the model application system 100 can utilize a unified search model application to perform targeted search queries on relevant information.

As just mentioned, the model application system 100 can switch between model applications. FIG. 10B illustrates the model application system 100 switching between model applications within the model interaction interface based on receiving an indication of a selection of an additional application element in accordance with one or more embodiments. As shown in FIG. 10B, the model application system switched from the composition model application shown in FIG. 10A to a unified search model application. In particular, the model application system 100 can update the model interaction interface 1002 by changing the composition window 1006 described in FIG. 10A to a search result window 1016 (or search result interface) within the model interaction interface 1002. As further shown in FIG. 10B, the model application system 100 can update the prompt window 1014 associated with the composition model application to a search query window 1018.

In one or more embodiments, the model application system 100 can perform one or more tasks associated with the unified search model application within the model interaction interface 1002. For example, as shown in FIG. 10B, the model application system 100 can perform, via the unified search model application, a unified search of source content items within the content management system and third-party applications linked to the content management system via software connectors. In some cases, the model application system 100 can perform one or more tasks in an additional model application based on the one or more performed tasks and/or outputs in the model application. For example, the model application system 100 can perform one or more tasks within a search model application by answering one or more search queries received from the client device of the user account. In some embodiments, the model application system 100 compose a report and/or summary within a composition model application based on the multi-turn conversation generated within the search model application.

Figure 11:
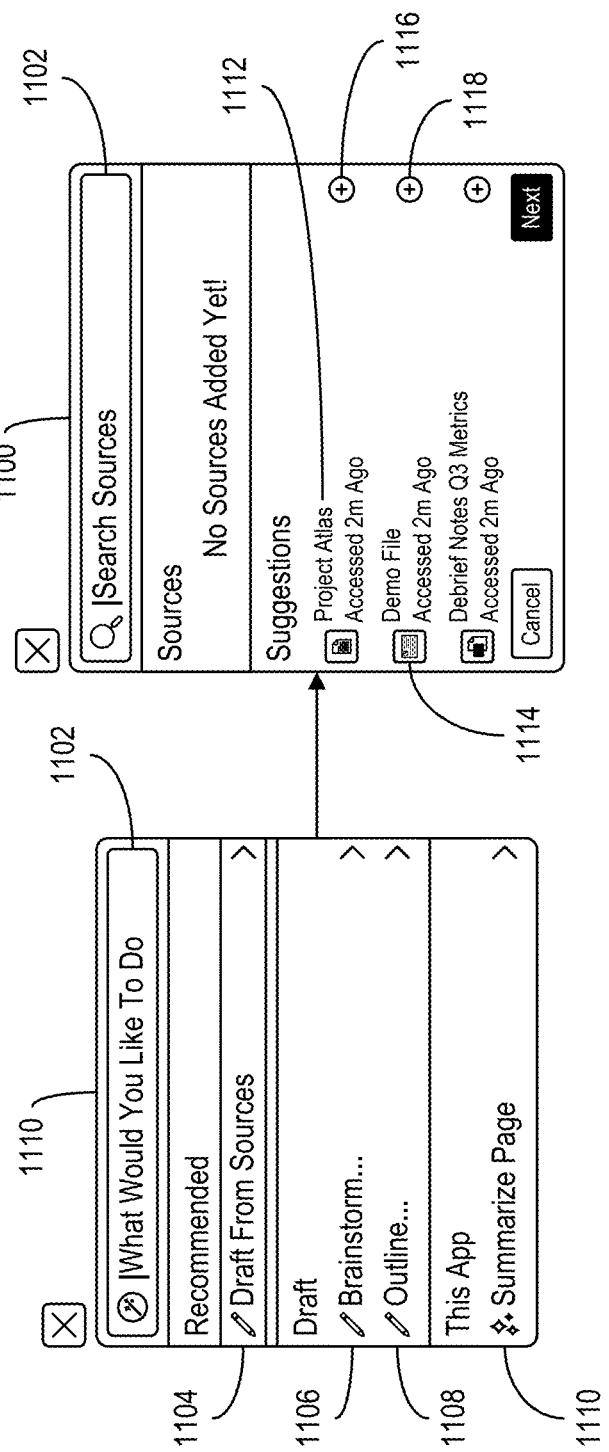
FIG. 11 illustrates an exemplary graphical user interface for performing and/or providing for display one or more suggested tasks in accordance with one or more embodiments.

As discussed above, the model application system 100 can utilize a model interaction interface to perform one or more tasks within a unified graphical user interface. FIG. 11 illustrates exemplary graphical user interfaces for performing one or more tasks and/or providing suggested tasks in accordance with one or more embodiments.

As shown in FIG. 11, the model application system 100 can change the form of the model interaction interface to include a model application dropdown menu 1100 that corresponds to a model application. In one or more embodiments, the model application dropdown menu 1100 can include an input field for performing a task with the model application.

As further shown in FIG. 11, the model application dropdown menu 1100 can include a suggested task (or action) for the model application to perform and/or a prompt input field 1102 for receiving a prompt outlining a task for the model application to complete. For example, based on the model application utilizing a customized instance of a large language model, the model application system 100 can generate the suggested task 1104, recommending drafting a document from one or more source content items. In some cases, the model application system 100 can include additional suggested tasks for the model application, such as generating an outline 1108 or brainstorming ideas 1106 with the customized instance of the large language model within the model application dropdown menu 1100. In some cases, the model application system 100 can provide for display within the model application dropdown menu 1100 the suggested task 1110 of summarizing a source content item (or recommended source content item).

As FIG. 11 further illustrates, the model application system 100 can receive an indication of a selection of a suggested task element corresponding to the suggested task 1104. Based on the indication of the selection of the suggested task element, the model application system 100 can update the model application dropdown menu 1100 to include one or more source content items 1112, 1114 (or recommended source content items) with one or more source content elements 1116, 1118 corresponding to the one or more source content items 1112, 1114. As discussed above, the model application system 100 can perform a task, such as generating a document with the customized instance of the large language model utilizing the selected source content items. As shown by FIG. 11, the model application system 100 can modify the formatting, size, and/or layout of the model interaction interface to comprise the model application dropdown menu 1100 to perform one or more suggested tasks with the model application. As indicated in FIG. 11 and described above, the model application system 100 can utilize various graphical user interfaces to enable seamless cross-platform navigation. For example, the model application system 100 can integrate across various platforms such as web browsers, third-party applications, desktop platforms, and/or mobile platforms to provide access to insights, one or more performed tasks, workflows, source content items, etc., ensuring a cohesive and consistent utilization of the model application system 100 across client devices.

Figure 12A:
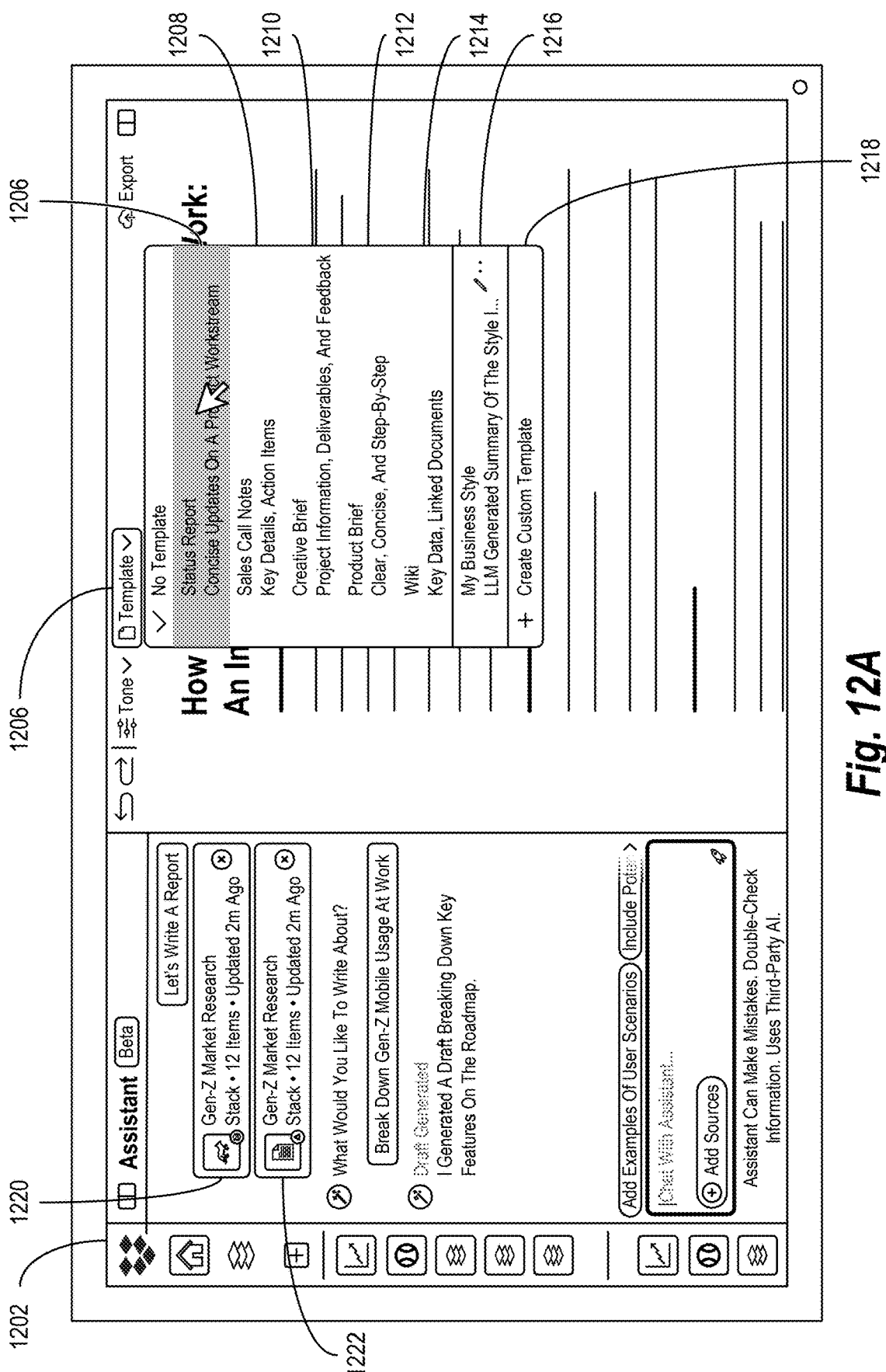
FIGS. 12A-12B illustrate a model application system utilizing one or more default templates while performing a task within a model application in accordance with one or more embodiments.
Figure 12B:
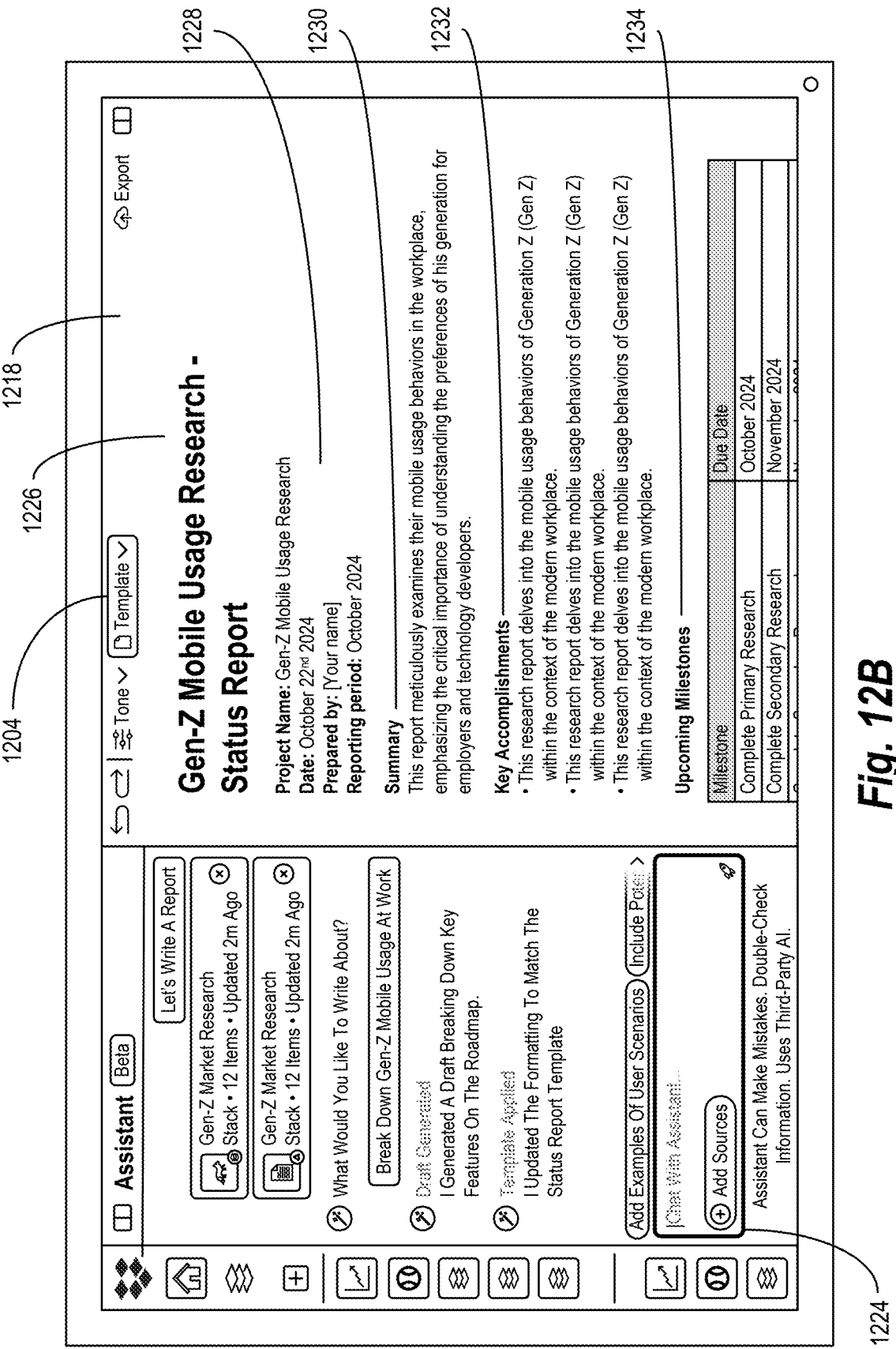

As mentioned above, in one or more embodiments, the model application system 100 can utilize a specific template for performing a task (e.g., drafting a report, email, brief). FIGS. 12A-12B illustrate a model application system utilizing one or more default templates while performing a task within a model application in accordance with one or more embodiments. In particular, FIG. 12A illustrates a model interaction interface 1202 with a template dropdown element 1204 comprising one or more elements for one or more default templates and/or one or more customized templates for performing one or more tasks within the model interaction interface 1202.

As shown in FIG. 12A, the model application system 100 can provide for display within the model interaction interface 1202 a template dropdown element 1204 comprising default template elements that correspond to default templates, such as a status report template element 1206 corresponding to a format that highlights updates for a project or workstream. In one or more embodiments, the default templates can include a notes template element 1208 that corresponds to a template for formatting notes for certain tasks and focuses on key details or action items found within the notes. In some embodiments, the notes template element 1208 can correspond to formatting notes for certain tasks and/or topics. For example, the notes template element 1208 can correspond to notes taken during a sales call or during a meeting.

As illustrated in FIG. 12A, the template dropdown element 1204 can include a creative brief element 1210 corresponding to a template that focuses on information, deliverables, and feedback for a project. For example, the creative brief element 1210 can include the strategy, target audience, logos, etc., for a video marketing campaign. In one or more embodiments, the template dropdown element 1204 can include a product brief element 1212 corresponding to a product brief template that provides a clear, concise, and/or step-by-step format highlighting the goals, features, and/or attributes of a product and describes the requirements to generate a new product, maintain an existing product, and/or improve an existing product. As FIG. 12A shows that the model application system 100 can include a wiki element 1214, which corresponds to a wiki template that organizes key data (or information) and includes linked documents.

In one or more implementations, the default templates within the template dropdown element 1204 can correspond to the user account, the group of user accounts, and/or the entity. For example, the default templates and corresponding default template elements for a first entity (or organization) can include a campaign brief template, client brief template, and creative brief template. Moreover, in some cases, the default templates and corresponding default template elements for a second entity (or organization) can include a strategy brief template, marketing brief template, UI design brief template, and project brief template. Indeed, the default templates included in the template dropdown element 1204 can be specific to the entity, group of user accounts, and/or user account. For example, the model application system 100 can identify the most commonly used default templates and/or customized templates for a group of user accounts (or a user account or tenant) and include those in the template dropdown element 1204 in a ranked order based on usage.

As further shown in FIG. 12A, the template dropdown element 1204 can include a customized template element corresponding to a customized template. For example, FIG. 12A illustrates, the my proposal brief element 1216 corresponding to a customized proposal brief template for a user account. In one or more embodiments, the customized proposal brief template can format, arrange, and/or organize information, images, graphs, charts, and/or themes according to the preferences of the user account. For example, the customized proposal brief template can place information or graphics important to the user account at the top of the brief (e.g., document). As discussed in more detail below in FIGS. 13A-13C, the model application system 100 can generate a customized (or personalized) template based on the formatting of one or more documents.

Moving to FIG. 12B, the model application system 100 can perform one or more tasks according to a default template or a customized template in accordance with one or more embodiments. For instance, as discussed above, the model application system 100 can receive via the input field 1224 a request (or instructions) to perform a task. In particular, as discussed above and as shown in FIG. 12B, the model application system 100 can receive one or more user inputs (or a request) to generate a report that breaks down Gen-z mobile usage at work based on two source content items 1220, 1222 (e.g., Gen-z Market Research and User interviews). As shown in FIG. 12B, the model application system 100 can further receive an indication of a selection of the status report template element corresponding to the status report template within the template dropdown element 1204. As FIG. 12B illustrates, the model application system 100 can generate a status report 1226 about gen-z mobile usage research based on the information in the Gen-z Market Research and User interviews (e.g., source content items 1220, 1222) according to the formatting of the default status report template.

As just mentioned, the model application system 100 can generate the status report 1226 according to the status report template by including a header section 1228 for the status report, a summary section 1230 summarizing the purpose of the status report 1226, a key accomplishments section 1232 highlighting achievements associated with the research project, and an upcoming milestones section 1234 outlining important dates (e.g., due dates and/or deadlines). Indeed, the model application system 100 can organize information that follows the order, layout, and/or formatting of the status report template.

In one or more embodiments, the model application system 100 can change and/or update the template of a performed task based on receiving an indication of a selection of a default template element or a customized template element from the template dropdown element 1204. Indeed, based on receiving an indication of a selection of a wiki template element, the model application system 100 can change the formatting of the status report 1226 to follow the formatting of the wiki template by including links to the Gen-z Market Research and User interviews (e.g., source content items 1220, 1222), changing the order of presenting certain information, and/or highlighting different information. Additionally, in one or more embodiments, the model application system 100 can receive one or more user interactions within a composition window 1218, modifying, updating, and/or editing the format of the status report 1226 (e.g., composition, performed task, artifact). In some cases, the model application system 100 can suggest a default template or a customized template based on the selected model function element (e.g., report, proposal, and/or email) and/or the prompt. For example, based on receiving a selection of a model function element corresponding to a proposal and a prompt requesting generating a proposal for a marketing campaign, the model application system 100 can recommend utilizing a campaign brief template to generate the proposal.

Figure 13A:
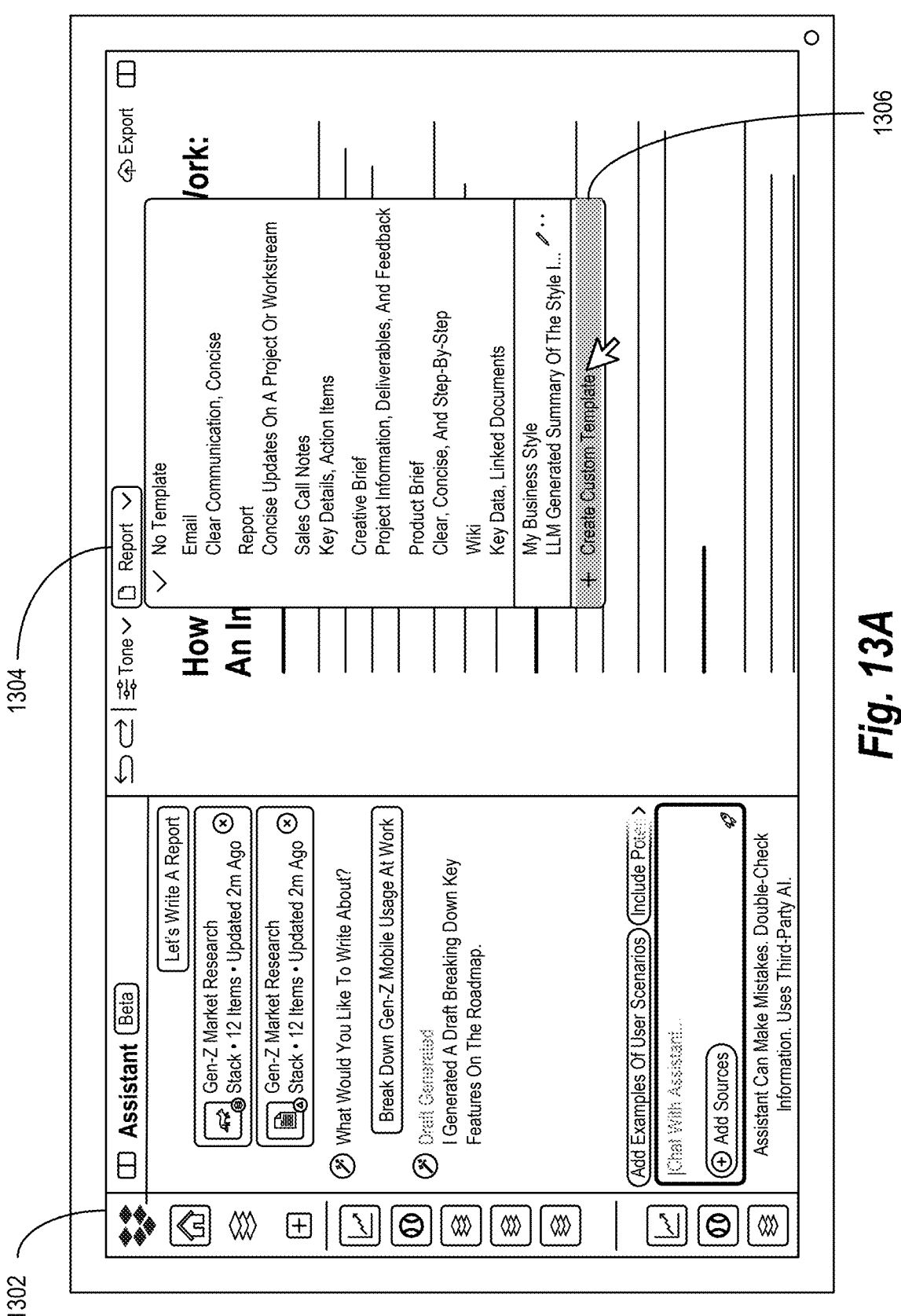
FIGS. 13A-13C illustrate a model application system generating and previewing a personalized template within a model application in accordance with one or more embodiments.
Figure 13B:
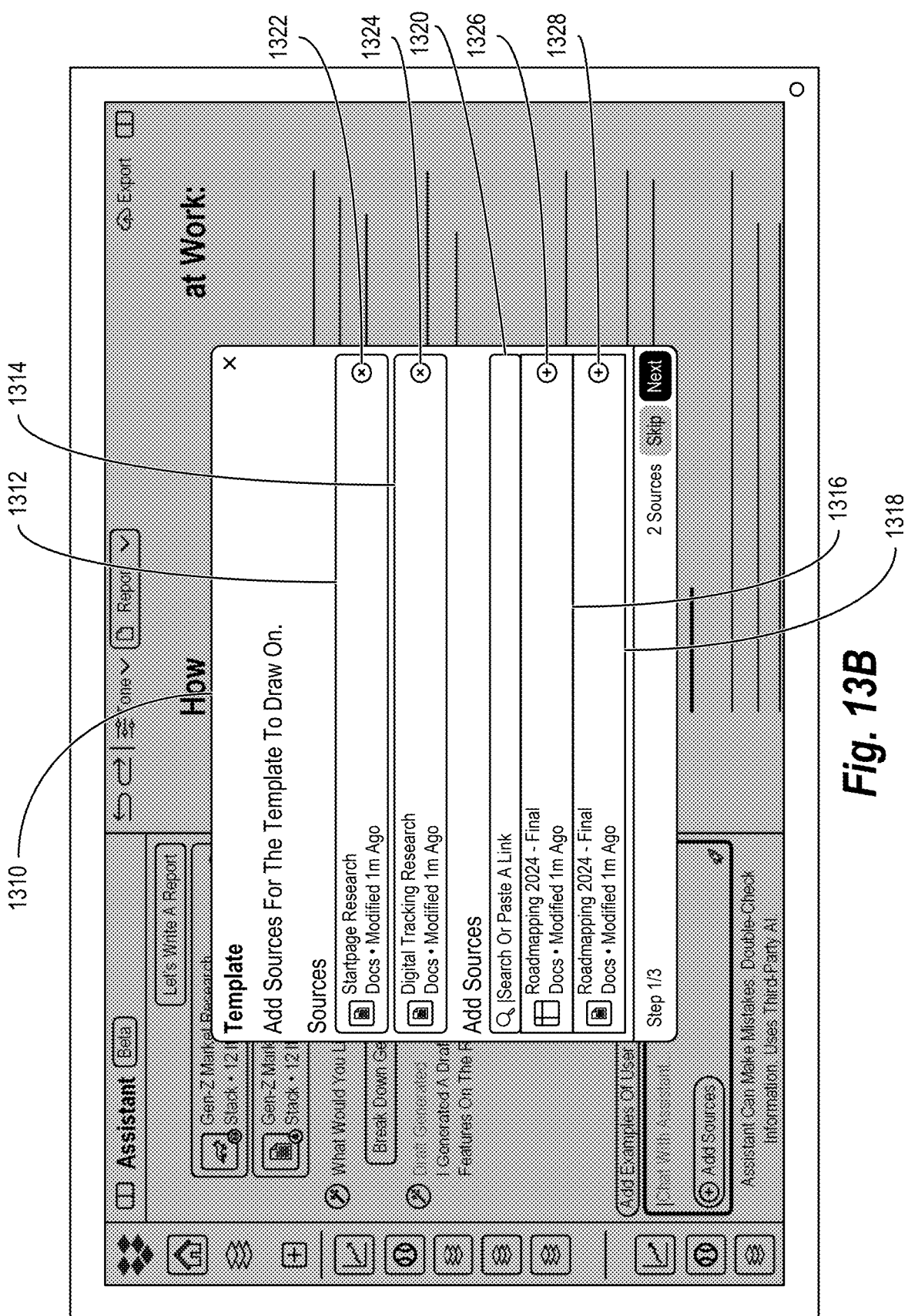
Figure 13C:
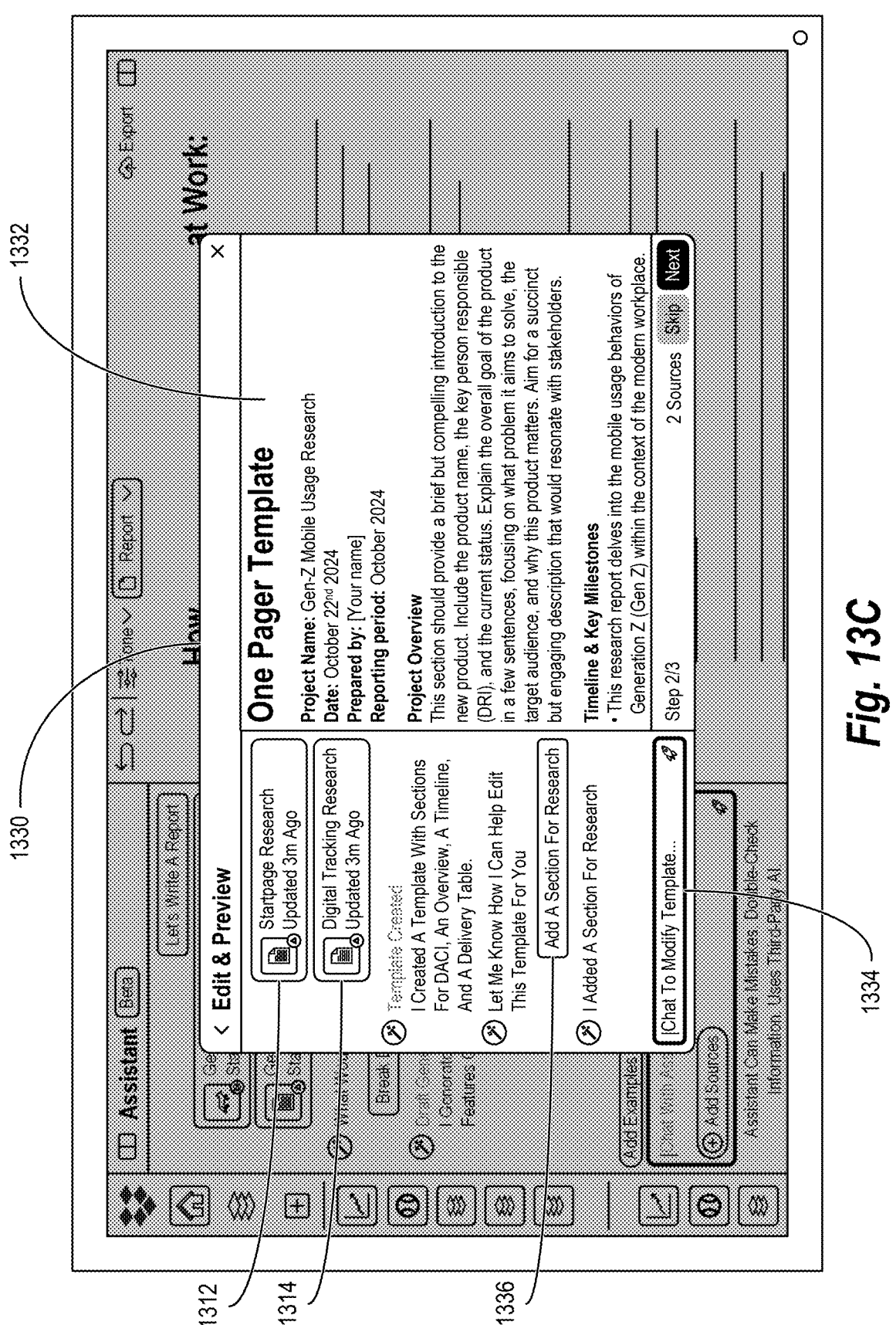

As indicated above, the model application system 100 can generate customized templates for a user account, a group of user accounts, and/or an entity. FIGS. 13A-13C illustrate a model application system generating and previewing a personalized template within a model application in accordance with one or more embodiments. For instance, as shown in FIG. 13A, the model application system 100 can provide for display within a model interaction interface 1302 a template dropdown element 1304 that includes a create custom template element 1306. As shown in FIG. 13A, the model application system 100 can receive an indication of a selection of the create custom template element 1306.

As indicated in FIG. 13B, in response to receiving the indication of the selection of the create custom template element 1306, the model application system 100 can provide for display a template source window 1310 with one or more source content items 1312, 1314, 1316, 1318. In particular, the model application system 100 can generate the customized template based on the formatting, organization, layout, font, margins, styles, etc., of the one or more source content items 1312, 1314, 1316, 1318. For example, as shown in FIG. 13B, the model application system 100 can generate the customized template based on the layout, formatting, etc., of the source content item 1312 (e.g., Startpage Research document) and the source content item 1314 (e.g., Digital Tracking Research document). Indeed, the model application system 100 does not rely on the contents included in the one or more source content items 1312, 1314 but pulls solely from the formatting (or layout) included in the source content item 1312 (e.g., Startpage Research document) and the source content item 1314 (e.g., Digital Tracking Research document).

As further shown in FIG. 13B, the template source window 1310 can include a source content item input field 1320 where the model application system 100 can receive one or more user inputs searching for a particular source content item. In some cases, the model application system

100 can recommend one or more source content items to use as a reference for generating a personalized (or customized) template based on the selected source content items. For example, based on receiving an indication of a selection of the one or more source content items 1312, the model application system 100 could recommend utilizing the formatting of the source content item 1316 while generating the personalized template.

As further shown in FIG. 13B, the model application system 100 can remove one or more source content items via source content item removal elements 1322, 1324 as described above in reference to FIG. 8A. For example, based on receiving a selection of the source content item removal element 1322 corresponding to the source content item 1312, the model application system 100 can remove the source content item 1312 and generate the personalized template based on the formatting of the source content item 1314. Relatedly, as shown in FIG. 13B, the model application system 100 can add the one or more source content items 1316, 1318 based on receiving an indication of a selection of the corresponding source content elements 1326, 1328. Indeed, the model application system 100 can utilize the formatting, structure (e.g., headings, footings, titles), etc., of the one or more source content items 1312, 1314, 1316, 1318 to generate a personalized template for a user account, group of user accounts, and/or an entity. Additionally, in one or more embodiments, the model application system 100 can share the personalized template with one or more user accounts and/or one or more groups of user accounts across the entity.

In some cases, the model application system 100 can provide a personalized template preview before generating a composition (e.g., performing a task). Thus, the model application system 100 does not have to utilize memory or computing resources to generate a composition with a personalized template that does not meet the needs, preferences, and/or esthetic of the user account, group of user accounts, and/or entity. FIG. 13C illustrates the model application system 100 providing for display on a client device a personalized template preview of the personalized template in accordance with one or more embodiments.

As shown in FIG. 13C, the model application system 100 can provide for display on the client device a preview template window 1330 comprising a personalized template preview 1332 of the personalized template. As FIG. 13C illustrates, the model application system 100 can generate the personalized template preview 1332 based on the formatting, structure, style, etc., of the source content items 1312, 1314 without saving the personalized template. Indeed, as shown in FIG. 13C, the model application system 100 can receive additional user input to change, modify, and/or update the personalized template within the personalized template preview 1332. For example, as shown in FIG. 13C, the model application system 100 can receive user input via the input field 1334 with a prompt 1336 requesting to add a section for research to the personalized template shown in the personalized template preview 1332. In one or more embodiments, the model application system 100 can receive user input modifying the personalized template within the personalized template preview 1332. In one or more embodiments, the model application system 100 can receive an indication of a selection of a save template element and save the personalized template.

Moreover, in some implementations, the model application system 100 can share the personalized template preview 1332 with one or more additional user accounts and/or groups of user accounts. In one or more implementations, the model application system 100 can receive additional user input modifying the personalized template corresponding to the personalized template preview 1332 before saving and/or generating the personalized template. Thus, the model application system 100 can save computing resources and memory by not saving multiple versions of the personalized template. Relatedly, the model application system 100 can share the personalized template with one or more user accounts, one or more groups of user accounts, and/or entity-wide. For example, based on the high usage of the personalized template by a subset of user accounts with a certain role, the model application system 100 can share the personalized template with other user accounts with similar roles.

FIGS. 7-13C, the corresponding text, and the examples provide a number of different systems and methods for utilizing a model interaction interface to generate and utilize model applications. In addition to the foregoing, implementations can also be described in terms of flowcharts comprising acts steps in a method for accomplishing a particular result. For example, FIG. 14 illustrates an example series of acts for modifying and utilizing a model interaction interface in accordance with one or more embodiments.

As illustrated in FIG. 14, the series of acts 1400 may include an act 1402 of providing for display a model interaction interface with one or more application elements. For example, in one or more embodiments, the act 1402 can include receiving, providing, for display on a client device, a model interaction interface comprising application elements selectable to instantiate respective applications of a large language model. In addition, the series of acts 1400 includes an at 1404 of modifying the model interaction interface to include one or more model function elements corresponding to one or more model functions based on receiving an indication of a selection of an application element. For instance, in one or more implementations, the series of acts 1400 includes in response to receiving an indication of a selection of an application element from among the application elements in the model interaction interface, modifying the model interaction interface to include one or more model function elements selectable to define a model function for a model application corresponding to the application element. Furthermore, in some cases, the series of acts 1400 includes an act 1406 of determining a recommended source content item corresponding to the model function element based on an indication of a selection of a model function element. For example, in some cases, the act 1406 can include based on an indication of a selection of a model function element from among the one or more model function elements, determining a recommended source content item corresponding to the model function element. As further shown in FIG. 14, the series of acts 1400 can include an act 1408 of modifying the model interaction interface to include a source selection window comprising the source content element corresponding to the recommended source content item. For instance, in some implementations, the act 1408 can include modifying the model interaction interface to include a source selection window comprising a source content element corresponding to the recommended source content item.

Further, in one or more embodiments, the series of acts 1400 includes determining, based on the recommended source content item, an additional recommended source content item. Additionally, the series of acts 1400 can include further modifying the model interaction interface to include the source selection window further comprising an additional source content element corresponding to the additional recommended source content item.

Furthermore, in some implementations, the series of acts 1400 includes receiving an indication of a selection of the source content element corresponding to the recommended source content item and a prompt via an input field. In one or more embodiments, the series of acts 1400 includes modifying the model interaction interface to include a task window. Additionally, in some cases, the series of acts 1400 can include performing a task associated with the prompt within the task window based on the model function for the model application and the recommended source content item.

Moreover, in one or more embodiments, the series of acts 1400 includes receiving an indication of a selection of the source content element corresponding to the recommended source content item. Additionally, the series of acts 1400 can include modifying the model interaction interface to include a task window. In some cases, the series of acts 1400 can include generating a draft task within the task window based on receiving one or more user inputs within the task window. In one or more embodiments, the series of acts 1400 further includes augmenting the draft task with content from the recommended source content item.

Furthermore, in one or more implementations, the series of acts 1400 includes receiving an indication of a selection of the source content element corresponding to the recommended source content item. Additionally, in some cases, the series of acts 1400 includes modifying the model interaction interface to include a task window, wherein the task window comprises one or more selectable default tone elements. In one or more implementations, the series of acts 1400 can include receiving an indication of a selection of a default tone element from the one or more selectable default tone elements. Furthermore, the series of acts 1400 can include generating a draft task according to the selected default tone element.

In some cases, the series of acts 1400 can include generating a personalized tone for a user account based on one or more source content items associated with a user account. Moreover, the series of acts 1400 can include receiving an indication of a selection of a personalized tone element corresponding to the personalized tone. In some embodiments, the series of acts 1400 can include performing a task according to the personalized tone based on receiving the indication of the selection of the personalized tone element.

In one or more cases, the series of acts 1400 can include providing, for display on a client device, a model interaction interface comprising application elements selectable to instantiate respective applications of a large language model. Additionally, the series of acts 1400 can include in response to receiving an indication of a selection of an application element corresponding to a composition model application from among the application elements in the model interaction interface, modifying the model interaction interface to include one or more model function elements selectable to define a model function for the composition model application corresponding to the application element. Moreover, in one or more implementations, the series of acts 1400 can include based on an indication of a selection of a model function element from among the one or more model function elements (i) determining one or more recommended source content items corresponding to the model function element, and (ii) modifying the model interaction interface to include a source selection window comprising one or more source content elements corresponding to the one or more recommended source content items.

In one or more cases, the series of acts 1400 can include providing for display within the model interaction interface, an input field. Additionally, the series of acts 1400 can include in response to receiving, from the client device, a prompt via the input field, modifying the model interaction interface to include a composition window. In some implementations, the series of acts 1400 can include providing, for display on the client device within the composition window, an additional application element corresponding to an additional model application that differs from the composition model application. Furthermore, in some embodiments, the series of acts 1400 can include in response to receiving an indication of a selection of the additional application element, switching the composition window from the composition model application to a different window corresponding to the additional model application.

In some cases, the series of acts 1400 can include generating, based on one or more source content items associated with an entity, an entity context. Additionally, the series of acts 1400 can include generating a draft composition in response to receiving a prompt from one or more user accounts associated with the entity. In some cases, the series of acts 1400 includes generating the draft composition according to the entity context associated with the entity.

In one or more embodiments, the series of acts 1400 includes determining one or more audience suggestions for a target audience based on one or more source content items associated with the target audience. In some cases, the series of acts 1400 can include generating one or more target audience suggestions in response to receiving a prompt to generate a draft composition for the target audience. Additionally, in one or more implementations, the series of acts 1400 can include providing for display on the client device one or more target audience suggestion elements corresponding to the one or more target audience suggestions.

Further, in some cases, the series of acts 1400 can include determining a composition suggestion for a portion of a draft composition based on the one or more recommended source content items. Moreover, in one or more embodiments, the series of acts 1400 includes providing for display on the client device a composition suggestion element corresponding to the composition suggestion. In one or more implementations, the series of acts 1400 can include receiving an indication of a selection of the composition suggestion element corresponding to the composition suggestion. In some cases, the series of acts 1400 includes updating the portion of the draft composition by implementing the composition suggestion.

Additionally, in one or more embodiments, the series of acts 1400 includes determining, based on the one or more recommended source content items, one or more additional recommended source content items. Furthermore, in some cases, the series of acts 1400 includes further modifying the model interaction interface to include the source selection window further comprising one or more additional source content elements corresponding to the one or more additional recommended source content items. In one or more cases, the series of acts 1400 can include in response to receiving one or more user interactions with a prompt input field, generating a draft composition based on the one or more additional recommended source content items.

Furthermore, in some implementations, the series of acts 1400 can include providing, for display on a client device, a model interaction interface comprising application elements selectable to instantiate respective applications of a large language model. In one or more cases, the series of acts 1400 can include in response to receiving an indication of a selection of an application element from among the application elements in the model interaction interface, modifying the model interaction interface to include one or more model function elements selectable to define a model function for a model application corresponding to the application element.

Moreover, in one or more implementations, the series of acts 1400 can include based on an indication of a selection of a model function element from among the one or more model function elements (i) determining a set of recommended source content items corresponding to the model function element, and (ii) modifying the model interaction interface to include a source selection window comprising a set of source content elements corresponding to the set of recommended source content items.

Further, in one or more implementations, the series of acts 1400 can include providing for display an input field within the model interaction interface in response to receiving an indication of a selection of a source content element. Additionally, the series of acts 1400 can include receiving, from the client device, a prompt via the input field. Moreover, in some cases, the series of acts 1400 includes performing a task based on the prompt and the set of recommended source content items.

Additionally, in one or more embodiments, the series of acts 1400 includes providing for display on the client device a set of source content removal elements corresponding to the set of recommended source content items. Moreover, in some cases, the series of acts 1400 can include removing a recommended source content item from the set of recommended source content items based on receiving an indication of a selection of a source content removal element corresponding to the recommended source content item.

In one or more embodiments, the series of acts 1400 can include generating a default tone for the model function for the model application. In some cases, the series of acts 1400 can include determining a user tone corresponding to a user account for the model function based on one or more source content items associated with the user account. Moreover, in one or more implementations, the series of acts 1400 can include generating a modified default tone by combining the default tone and the user tone. Furthermore, the series of acts 1400 can include performing a task according to the modified default tone.

In some cases, the series of acts 1400 can include identifying feedback from a target audience for a task. Additionally, in one or more implementations, the series of acts 1400 includes generating one or more target audience suggestions for the task based on feedback from the target audience. In one or more embodiments, the series of acts 1400 can include providing for display on the client device, the one or more target audience suggestions within the model interaction interface.

Furthermore, in some embodiments, the series of acts 1400 can include determining an audience tone for a target audience based on one or more source content items associated with the target audience. In one or more implementations, the series of acts 1400 includes in response to receiving a prompt to perform a task for the target audience, performing the task according to the audience tone.

Additionally, the series of acts 1400 can include generating a first set of model applications associated with a first user group and a second set of model applications associated with a second user group. Moreover, in one or more implementations, the series of acts 1400 can include providing, for display on the client device associated with the first user group, a first group model interaction interface comprising a first set of application elements selectable to instantiate respective applications of the large language model from the first set of model applications. Additionally, in some embodiments, the series of acts 1400 includes providing for display on an additional client device associated with the second user group, a second group model interaction interface comprising a second set of application elements selectable to instantiate respective applications of the large language model from the second set of model applications.

Generating Suggested Actions

Figure 15:
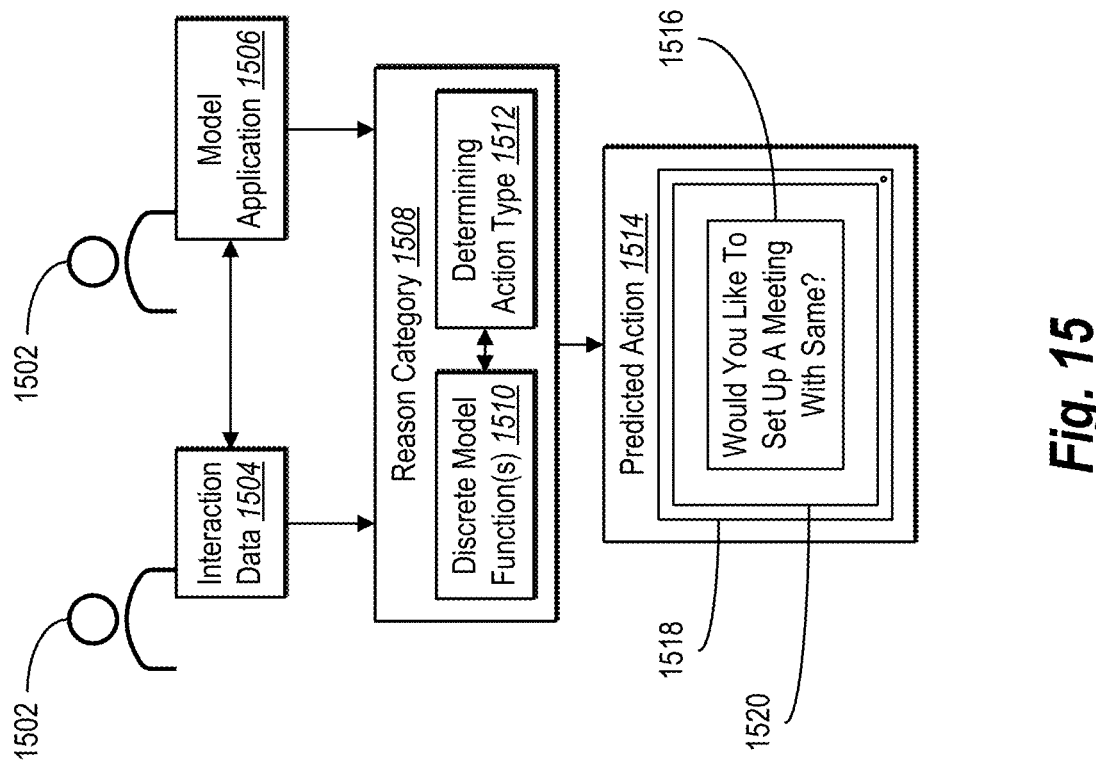
FIG. 15 illustrates an overview of a model application system generating suggested actions based on interaction data within a model application in accordance with one or more embodiments.

As indicated above, the model application system 100 can utilize a model interaction interface to perform one or more tasks with one or more model applications comprising discrete model functions that are part of a sense category, reason category, or act category. In one or more embodiments, the model application system 100 can utilize the discrete model functions and model application to generate suggested actions (or predicted actions or suggested tasks) to perform with the model application. FIG. 15 illustrates an overview of a model application system generating suggested (or predicted) actions based on user interaction data within a model application in accordance with one or more embodiments.

As shown in FIG. 15, the model application system 100 can receive and analyze interaction data 1504 for a user account 1502 that is utilizing and/or interacting with a model application 1506. In particular, the model application system 100 can analyze interaction data 1504 (or user interaction data) for an application session (or instance) of the model application 1506. For example, the model application system 100 can analyze one or more user interactions or inputs, such as, but not limited to, chats, search queries, or prompts with the model application 1506. In one or more embodiments, the model application system 100 can utilize the interaction data 1504 to determine a predicted action (e.g., suggested action or suggested task) for the user account 1502 to take. As described above, the predicted actions can include booking paid time off, replying to an email, text, or chat, adding a comment, creating a report, generating key insights that consider the context of the user account, group of user accounts, target audience, and/or the entity.

Additionally, in some cases, based on the target audience, the model application system 100 can determine the predicted action. For example, as described above, the model application system 100 can determine an audience context for a target audience of the one or more suggested tasks indicating information (e.g., data, images, detail) the target audience likes to include in certain documents. For example, in one or more embodiments, the model application system 100 can determine that the user account 1502 is using the model application 1506 to generate a social media marketing campaign to present to the head of marketing for a company. In one or more embodiments, the model application system 100 can determine that the head of marketing likes marketing campaigns to include the environmental impact of the marketing campaign on certain cities. In one or more cases, the model application system 100 can generate and provide for display the predicted action of including the environmental impact within the social media marketing campaign. In some cases, the model application system 100 can include the reasoning behind the predicted action.

As further shown in FIG. 15, the model application system 100 can determine a predicted action by determining an action type 1512, indicating a level of determinism for the predicted action based on the interaction data 1504. For example, in one or more embodiments, the model application system 100 can determine if an action type for the predicted action is deterministic or probabilistic. For instance, the model application system 100 can determine from the interaction data 1504 the action type 1512 based on a level of determinism from the interaction data 1504. For example, in response to receiving a search query for a specific email satisfying a set of conditions (or preconditions), the model application system 100 can determine that the action type for the prediction action is a deterministic action type because the search query indicates a high level of determinism for the predicted action. In some cases, the model application system 100 can utilize discrete model function(s) 1510 classified in a reason category 1508 to determine the predicted action 1514.

In one or more embodiments, once the model application system 100 determines the action type 1512, the model application system 100 can determine, from the interaction data 1504, a surface mode indicating where to complete the predicted action. For instance, the model application system 100 can determine whether to surface (or perform) the predicted action within a content management system or on a third-party application external to the content management system. For example, the model application system 100 can determine a predicted action 1514 of responding to an e-mail based on the user account 1502 receiving an e-mail discussing a potential meeting. In one or more cases, the model application system 100 can determine whether to perform the predicted action 1514 of responding to the email within the content management system, or more particularly within a model interaction interface 1520 based on the interaction data 1504.

As further shown in FIG. 15, the model application system 100 can provide for display on a client device 1518 on the model interaction interface 1520, a predicted action element 1516 that is selectable to execute the predicted action 1514. In one or more embodiments, based on the predicted action 1514, the model application system 100 can perform the predicted action 1514 with a large language model according to the action type and the surfacing mode. For instance, the model application system 100 can receive an indication of a selection of the predicted action element 1516 and generate a response email setting up a meeting in response to the email discussing a potential meeting within the model interaction interface 1520 and send the response email to the intended recipient.

Figure 16:
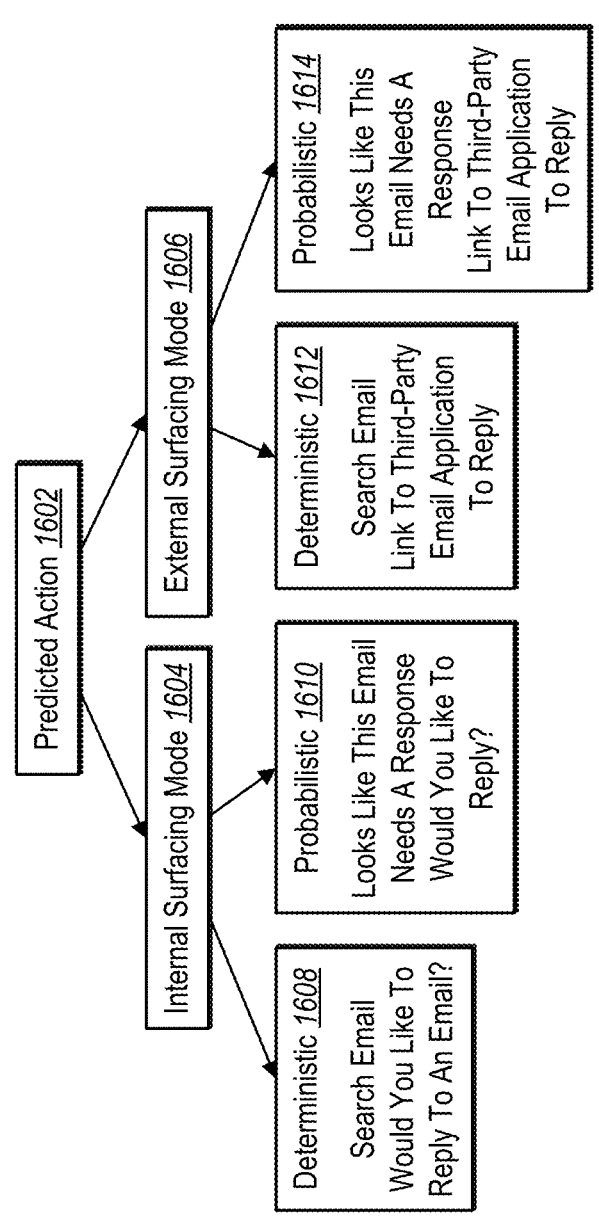
FIG. 16 illustrates a model application system determining how to surface one or more predicted actions in accordance with one or more embodiments.

As just described, the model application system 100 can determine if a predicted action is deterministic or probabilistic and the surface mode for performing the predicted action. FIG. 16 illustrates the model application system 100 determining an action type and how to surface one or more predicted actions in accordance with one or more embodiments. As shown in FIG. 16, the model application system 100 can determine a surfacing mode for a predicted action 1602. As indicated above, the predicted action 1602 can include a suggested task or a suggested action performed by the model application.

As shown in FIG. 16, the model application system 100 can determine a surfacing model that is an internal surfacing mode 1604 or an external surfacing mode 1606. In one or more cases, the internal surfacing mode 1604 can include performing the predicted action 1602 within the model interaction interface. Indeed, in one or more embodiments, the model application system 100 can perform a variety of tasks for a number of model applications across various third-party applications connected to the content management system via software connectors within a single and unified model interaction interface.

As indicated in FIG. 16, the model application system 100 can determine to utilize the external surfacing mode 1606. In one or more embodiments, the model application system 100 utilizing the external surfacing mode 1606 links a user account to the relevant page, window, or tab of the third-party application linked to the content management system via software connectors and performs the task from the third-party application. In some cases, the model application system 100 can navigate the user account to the correct location within the third-party application to perform the predicted action 1602. In some cases, the model application system 100 can log the one or more predicted actions taken utilizing the external surfacing mode 1606 and/or the one or more user interactions with the third-party application in the historic log described above.

As further shown in FIG. 16, the model application system 100 can determine the action type for the predicted action 1602. As discussed above, an action type can be deterministic 1608, 1612 or probabilistic 1610, 1614. In some cases, the deterministic 1608, 1612 action type utilizes and/or relies on fixed data, authenticated data, and/or one or more specific conditions to perform and/or surface the predicted action 1602. For example, as indicated in FIG. 16 receiving one or more user inputs searching for an email within a third-party application linked to the content management system is deterministic 1608, 1612 because the model application system 100 receives fixed data that fulfills a precondition (e.g., receiving a search query that is actionable in a frequently used and third-party application linked to the content management system via a software connector) for surfacing the predicted action of replying to the email.

As indicated in FIG. 16, the model application system 100 can determine that the action type for the predicted action 1602 is probabilistic 1610, 1614 if model application system 100 interprets data on a spectrum of confidence to perform and/or surface the predicted action 1602. For example, the based on the model application system 100 interpreting one or more chats within chat application about a potential vacation, the model application system 100 can generate the predicted action 1602 of requesting paid time off for the potential vacation. As shown in FIG. 16, the 100 can determine that the user account receiving an email within third-party application linked to the content management system is probabilistic 1610, 1614 because analyzing and/or interpreting the contents of an email fulfills a precondition (e.g., the model application system 100 provides for display one the client device of the user account a notification that requires an action from the user account) for surfacing the predicted action of replying to the email.

FIGS. 15-14, the corresponding text, and the examples provide a number of different systems and methods for generating predicted (or suggested) actions. In addition to the foregoing, implementations can also be described in terms of flowcharts comprising acts steps in a method for accomplishing a particular result. For example, FIG. 17 illustrates an example flowchart of a series of acts for generating suggested actions in accordance with one or more embodiments.

As illustrated in FIG. 17, the series of acts 1700 may include an act 1702 of analyzing interaction data within a model application. For example, in one or more embodiments, the act 1702 can include analyzing, for a user account interacting with a model application, interaction data within an application session of the model application. In addition, the series of acts 1700 includes an act 1704 of determining a predicted action by determining an action type and a surfacing mode for completing the predicted action. For instance, in one or more implementations, the act 1704 includes determining a predicted action for the model application by (i) determining, from the interaction data, an action type indicating a level of determinism for the predicted action; and (ii) determining, from the interaction data, a surfacing mode indicating where to complete the predicted action. Furthermore, in some cases, the series of acts 1700 includes an act 1406 of providing for display a predicted action element to execute the predicted action. For example, in some cases, the act 1706 can include providing, for display in a model interaction interface, a predicted action element selectable to execute the predicted action using a large language model according to the action type and the surfacing mode.

Figure 18:
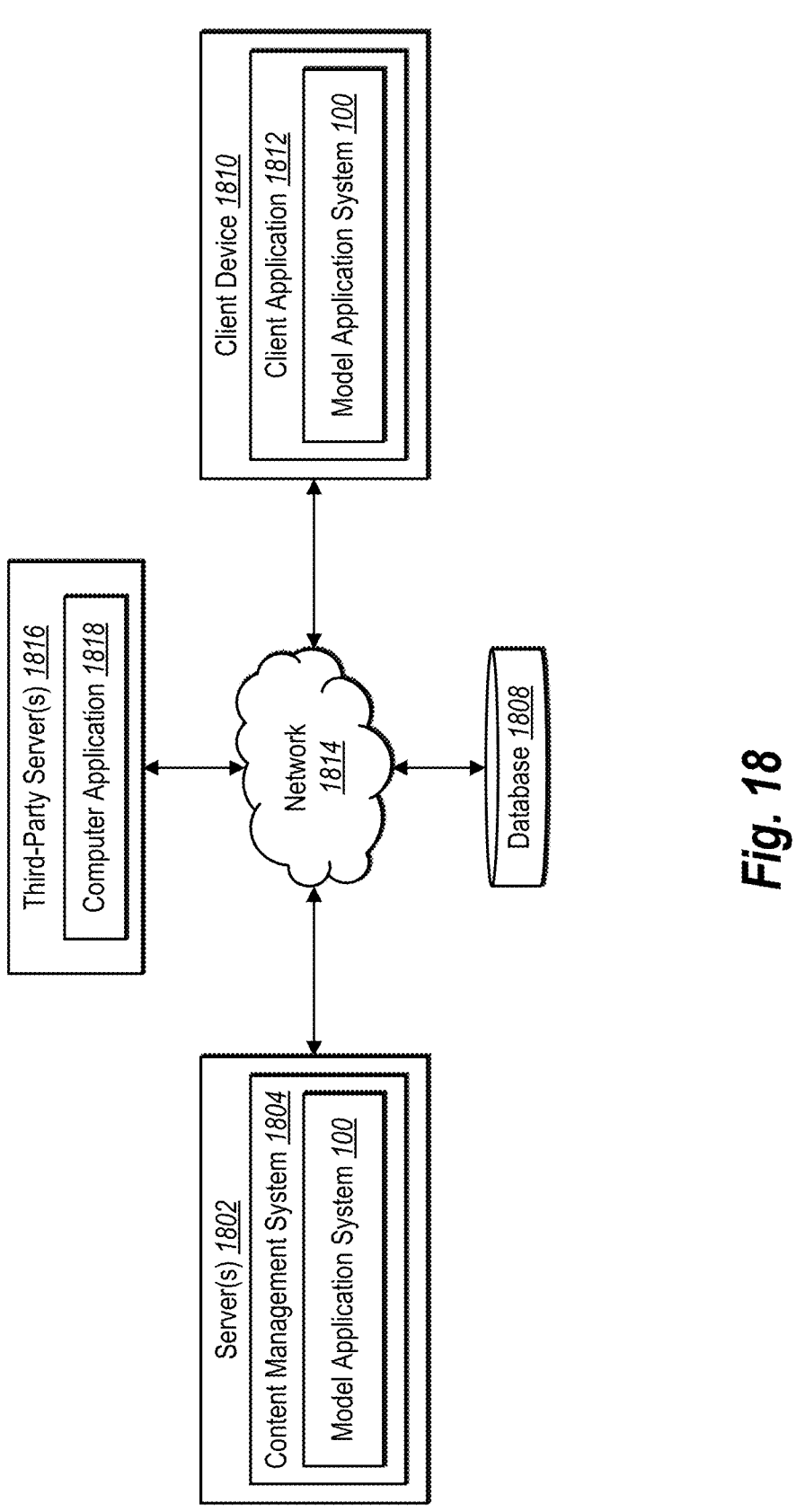
FIG. 18 illustrates a diagram of an environment in which a model application system can operate in accordance with one or more embodiments.

FIG. 18 illustrates a schematic diagram of an example system environment for implementing the model application system 100 in accordance with one or more implementations. As shown, the environment includes server(s) 1802, a client device 1810, third-party server(s) 1816, a database 1608, and a network 1814. Each of the components of the environment can communicate via the network 1814, and the network 1814 may be any suitable network over which computing devices can communicate. Example networks are discussed in more detail below in relation to FIGS. 19-18.

As mentioned above, the example environment includes a client device 1810. The client device 1810 can be one of a variety of computing devices, including a smartphone, a tablet, a smart television, a desktop computer, a laptop computer, a virtual reality device, an augmented reality device, or another computing device as described in relation to FIGS. 19-18. The client device 1810 can communicate with the server(s) 1802 via the network 1814. For example, the client device 1810 can receive user input from a user interacting with the client device 1810 (e.g., via the client application 1812) to, for instance, access, navigate, download or share a data from a computer application 1818 within the third-party server(s) 1816, to collaborate with and/or share a model application with a co-user of a different client device, search for one or more content items, perform a task, or to select a user interface element. In addition, the model application system 100 on the server(s) 1802 can receive information relating to various interactions with user interface elements based on the input received by the client device 1810 (e.g., to search for one or more content items from the computer application in the third-party server(s) 1816 and the content management system 1604 within a model application or generate a draft report within a model application).

As shown, the client device 1810 can include a client application 1812. In particular, the client application 1812 may be a web application, a native application installed on the client device 1810 (e.g., a mobile application, a desktop application, etc.), or a cloud-based application where all or part of the functionality is performed by the server(s) 1802. Based on instructions from the client application 1812, the client device 1810 can present or display information, including a model interaction interface comprising model application elements corresponding to model applications that can perform a variety of tasks.

As illustrated in FIG. 18, the example environment also includes the server(s) 1802. The server(s) 1802 may generate, track, store, process, receive, search, and transmit electronic data, such as digital content (e.g., content items), datasets, searchable data, pages of data, prompts, interface elements, world state data, observational layer data, user interaction data, interactions with interface elements, performed tasks, artifacts, metadata, and/or interactions between user accounts or client devices. For example, the server(s) 1802 may receive data from the client device 1810 in the form of prompt to generate a report about a specific project or a search query for a content item or one or more content items related to a topic from a computer application 1818 external to the content management system 1804. In addition, the server(s) 1802 can transmit data to the client device 1810 in the form of a model interaction interface that includes a window for receiving a prompt or query and a window that displays a performed task (e.g., generating a report or composition). Indeed, the server(s) 1802 can communicate with the client device 1810 to send and/or receive data via the network 1814. In some implementations, the server(s) 1802 comprise(s) a distributed server where the server(s) 1802 include(s) a number of server devices distributed across the network 1814 and located in different physical locations. The server(s) 1802 can comprise one or more content servers, application servers, communication servers, web-hosting servers, machine learning server, and other types of servers.

As shown in FIG. 18, the server(s) 1802 can also include the model application system 100 as part of a content management system 1804. The content management system 1804 can communicate with the client device 1810 to perform various functions associated with the client application 1812 (or model application) such as automating workflows, generating compositions (e.g., reports, e-mails, summaries), suggesting actions (or tasks), searching a hybrid search index. Indeed, the content management system 1804 can include a network-based smart cloud storage system to manage, store, synchronize, and maintain content items associated with user accounts within the content management system and link the content management system 1804 to computer applications external to the content management system 1804. In some embodiments, model application system 100 and/or the content management system 1604 utilize a database 1808 to store source content items and tasks completed by a model application.

FIG. 18 further illustrates a third-party server(s) 1816. In particular, the third-party server(s) 1816 can host or house a computer application 1818 that includes or that searches or generates (as part of its native application functions) one or more content items. For example, the third-party server(s) 1816 can include a server location hosting the computer application 1818 that is external to the model application system 100 and the content management system 1804. In some cases, the third-party server(s) 1816 is external to the model application system 100, but the model application system 100 can nevertheless access the computer application 1818 via one or more, connectors, plugins, APIs, or other network-based access protocols.

Although FIG. 18 depicts the model application system 100 located on the server(s) 1802, in some implementations, the model application system 100 may be implemented by (e.g., located entirely or in part on) one or more other components of the environment. For example, the model application system 100 may be implemented by the client device 1810 and/or a third-party device. For example, the client device 1810 can download all or part of the model application system 100 for implementation independent of, or together with, the server(s) 1802.

In some implementations, though not illustrated in FIG. 18, the environment may have a different arrangement of components and/or may have a different number or set of components altogether. For example, the client device 1810 may communicate directly with the model application system 100 bypassing the network 1814. As another example, the environment can include the database 1808 located external to the server(s) 1802 (e.g., in communication via the network 1814) or located on the server(s) 1802, on a third-party server(s) 1816, and/or on the client device 1810.

In one or more implementations, each of the components of the model application system 100 are in communication with one another using any suitable communication technologies. Additionally, the components of the model application system 100 can be in communication with one or more other devices including one or more client devices described above. It will be recognized that in as much the model application system 100 is shown to be separate in the above description, any of the subcomponents may be combined into fewer components, such as into a single component, or divided into more components as may serve a particular implementation.

Figure 19:
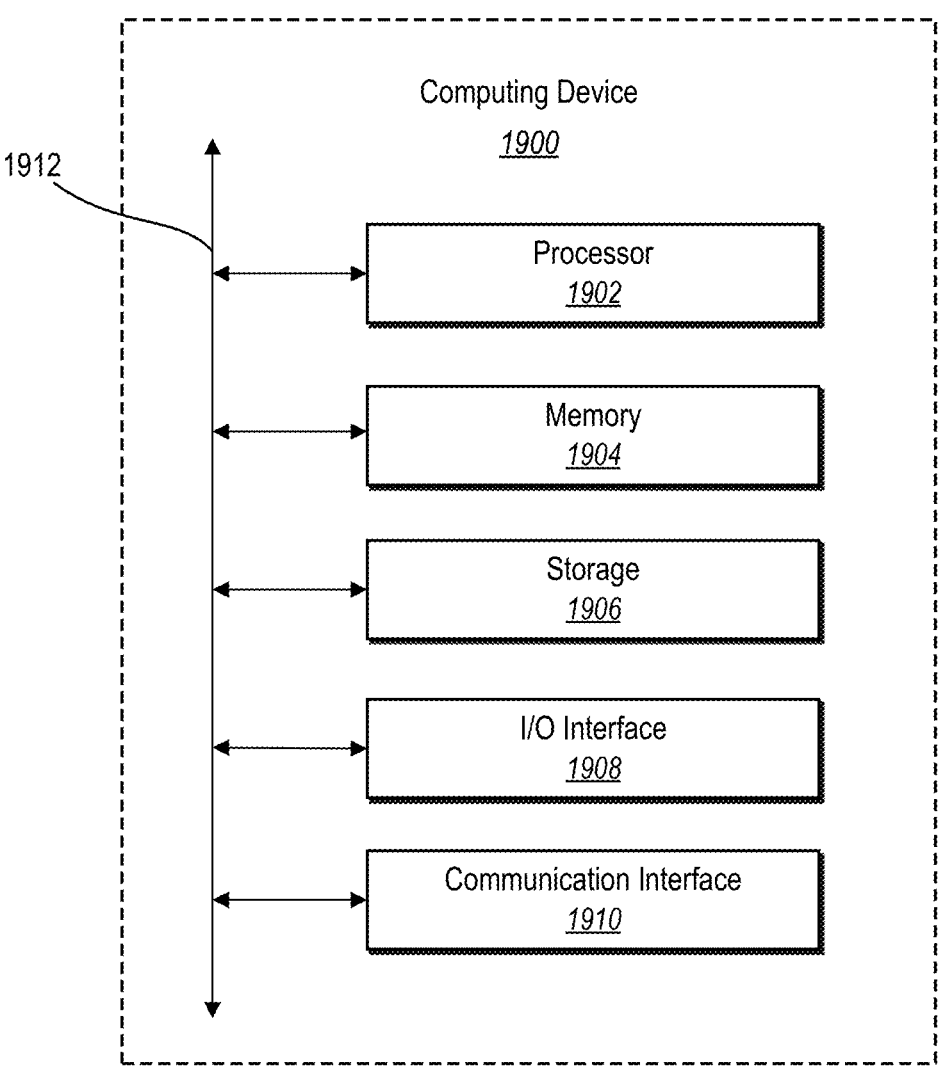
FIG. 19 illustrates a block diagram of an exemplary computing device in accordance with one or more embodiments.

FIG. 19 illustrates a block diagram of exemplary computing device 1900 that may be configured to perform one or more of the processes described above. The components of the model application system 100 can include software, hardware, or both. For example, the components of the model application system 100 can include one or more instructions stored on a computer-readable storage medium and executable by processors of one or more computing devices (e.g., the computing device 1900). When executed by the one or more processors, the computer-executable instructions of the model application system 100 can cause the computing device 1900 to perform the methods described herein. Alternatively, the components of the model application system 100 can comprise hardware, such as a special purpose processing device to perform a certain function or group of functions. Additionally, or alternatively, the components of the model application system 100 can include a combination of computer-executable instructions and hardware.

Furthermore, the components of the model application system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the model application system 100 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 19 illustrates a block diagram of exemplary computing device 1900 that may be configured to perform one or more of the processes described above. One will appreciate that third-party server(s) 1802, the client device 1810, and/or the computing device 1900 may comprise one or more computing devices such as computing device 1900. As shown by FIG. 19, computing device 1900 can comprise processor 1902, memory 1904, a storage device, a I/O interface, and communication interface 1910, which may be communicatively coupled by way of communication infrastructure 1912. While an exemplary computing device 1900 is shown in FIG. 19, the components illustrated in FIG. 19 are not intended to be limiting. Additional or alternative components may be used in other implementations. Furthermore, in certain implementations, computing device 1900 can include fewer components than those shown in FIG. 19. Components of computing device 1900 shown in FIG. 19 will now be described in additional detail.

In particular implementations, processor 1902 includes hardware for executing instructions, such as those making up a computer program. As an example, and not by way of limitation, to execute instructions, processor 1902 may retrieve (or fetch) the instructions from an internal register, an internal cache, memory 1904, or storage device 1906 and decode and execute them. In particular implementations, processor 1902 may include one or more internal caches for data, instructions, or addresses. As an example, and not by way of limitation, processor 1902 may include one or more instruction caches, one or more data caches, and one or more translation lookaside buffers (TLBs). Instructions in the instruction caches may be copies of instructions in memory 1904 or storage device 1906.

Memory 1904 may be used for storing data, metadata, and programs for execution by the processor(s). Memory 1904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1904 may be internal or distributed memory.

Storage device 1906 includes storage for storing data or instructions. As an example, and not by way of limitation, storage device 1906 can comprise a non-transitory storage medium described above. Storage device 1906 may include a hard disk drive (HDD), a floppy disk drive, flash memory, an optical disc, a magneto-optical disc, magnetic tape, or a Universal Serial Bus (USB) drive or a combination of two or more of these. Storage device 1906 may include removable or non-removable (or fixed) media, where appropriate. Storage device 1906 may be internal or external to computing device 1900. In particular implementations, storage device 1906 is non-volatile, solid-state memory. In other implementations, Storage device 1906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1908 allows a user to provide input to, receive output from, and otherwise transfer data to and receive data from computing device 1900. I/O interface 1908 may include a mouse, a keypad or a keyboard, a touch screen, a camera, an optical scanner, network interface, modem, other known I/O devices or a combination of such I/O interfaces. I/O interface 1908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1908 is configured to provide graphical data to a display for presentation to a user. The graphical data may be representative of one or more graphical interfaces and/or any other graphical content as may serve a particular implementation.

Communication interface 1910 can include hardware, software, or both. In any event, communication interface 1910 can provide one or more interfaces for communication (such as, for example, packet-based communication) between computing device 1900 and one or more other computing devices or networks. As an example and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1912 may include hardware, software, or both that couples components of computing device 1900 to each other. As an example and not by way of limitation, communication infrastructure 1912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 20:
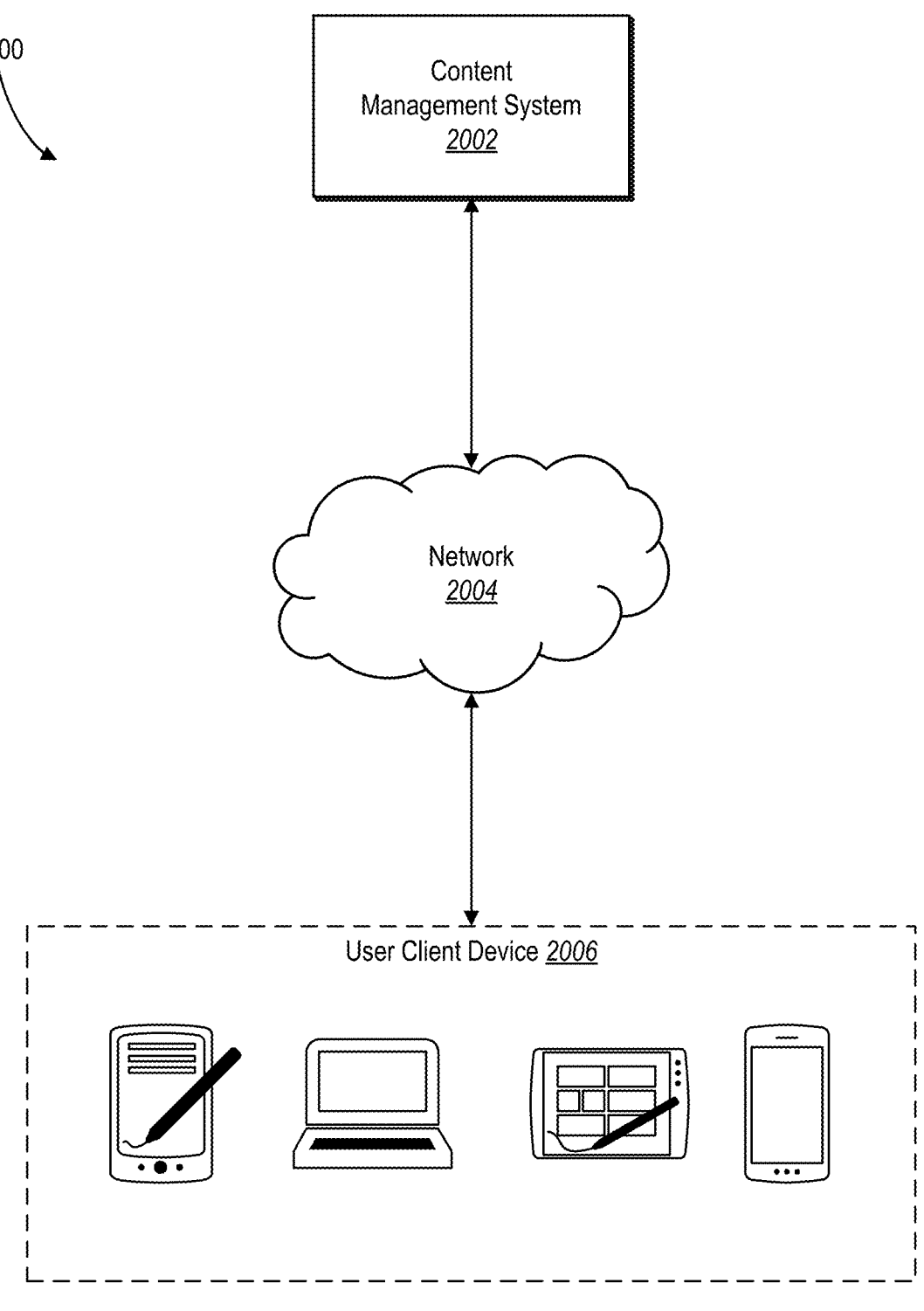
FIG. 20 illustrates an example environment of a networking system having the model application system in accordance with one or more embodiments.

FIG. 20 is a schematic diagram illustrating environment 2000 within which one or more implementations of the model application system 100 can be implemented. As discussed above with respect to FIG. 1, in some embodiments the model application system 100 can be part of a content management system 1002. In one or more embodiments, the content management system 2002 may generate, store, manage, receive, and send digital content (such as digital videos). For example, content management system 2002 may send and receive digital content to and from the user client device 2006 by way of network 2004. In particular, the content management system 2002 can store and manage a collection of digital content. The content management system 2002 can manage the sharing of digital content between computing devices associated with a plurality of users. For instance, the content management system 2002 can facilitate a user sharing a digital content with another user of content management system 2002.

In particular, the content management system 2002 can manage synchronizing digital content across multiple of the user client device 2006 associated with one or more users. For example, a user may edit digital content using user client device 2006. The content management system 2002 can cause user client device 2006 to send the edited digital content to content management system 2002. Content management system 2002 then synchronizes the edited digital content on one or more additional computing devices.

In addition to synchronizing digital content across multiple devices, one or more implementations of content management system 2002 can provide an efficient storage option for users that have large collections of digital content. For example, content management system 2002 can store a collection of digital content on content management system 2002, while the user client device 2006 only stores reduced-sized versions of the digital content. A user can navigate and browse the reduced-sized versions (e.g., a thumbnail of a digital image) of the digital content on user client device 2006. In particular, one way in which a user can experience digital content is to browse the reduced-sized versions of the digital content on user client device 2006.

Another way in which a user can experience digital content is to select a reduced-size version of digital content to request the full- or high-resolution version of digital content from content management system 2002. In particular, upon a user selecting a reduced-sized version of digital content, user client device 2006 sends a request to content management system 2002 requesting the digital content associated with the reduced-sized version of the digital content. Content management system 2002 can respond to the request by sending the digital content to user client device 2006. User client device 2006, upon receiving the digital content, can then present the digital content to the user. In this way, a user can have access to large collections of digital content while minimizing the amount of resources used on user client device 2006.

User client device 2006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 2006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 2004.

Network 2004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 2006 may access content management system 2002.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating a customized user group context for a group of defined user accounts based on one or more source content items associated with the group of defined user accounts and monitoring user interaction data of the group of defined user accounts with the one or more source content items associated with the group of defined user accounts;

determining discrete model functions that are executable by a large language model and combinable with one another to form combined model functions;

classifying a discrete model function from the discrete model functions into a function category comprising one or more of a sense category, a reason category, or an act category;

combining the discrete model function with one or more additional model functions;

generating, in response to combining the discrete model function with the one or more additional model functions, a model application defining data processing for a customized instance of the large language model;

integrating the discrete model function with one or more autonomous agents based on one or more functions performed by the discrete model function;

determining one or more capabilities of the model application based on one or more functions performed by the discrete model function;

performing one or more tasks for the group of defined user accounts with the one or more autonomous agents integrated with the model application and the customized instance of the large language model according to the customized user group context based on the customized user group context corresponding to the one or more capabilities of the model application; and based on detecting a change to the customized user group context, generating a modified model application by replacing the discrete model function with an additional discrete model function that shares the function category.

2. The computer-implemented method of claim 1, further comprising:

classifying the discrete model function into the sense category;

receiving, utilizing the discrete model function classified into the sense category, one or more user interactions with one or more content items within a content management system or third-party server linked to the content management system via one or more software connectors; and ingesting, via the discrete model function classified into the sense category, the one or more content items based on the one or more user interactions with the one or more content items.

3. The computer-implemented method of claim 1, further comprising:

classifying the discrete model function into the reason category;

generating, utilizing the discrete model function classified into the reason category, one or more signals based on one or more content items or one or more user interactions with the one or more content items; and generating, based on the one or more signals, one or more tasks to perform within the model application.

4. The computer-implemented method of claim 1, wherein the discrete model functions classified into the act category further comprises:

classifying the discrete model function into the act category; and performing, utilizing the discrete model function classified into the act category, one or more tasks within the model application, based on one or more signals generated by the discrete model function classified into the reason category.

5. The computer-implemented method of claim 1, further comprising:

receiving, from a client device associated with a user account, one or more user interactions with the model application;

determining, based the one or more user interactions, a user context associated with the user account; and performing one or more tasks according to the user context associated with the user account.

6. The computer-implemented method of claim 1, further comprising:

receiving, from a client device associated with a user account, one or more user interactions with the model application;

generating, for one or more user accounts, a historic log comprising the one or more user interactions, and one or more tasks performed by the model application; and in response to receiving a request to access the one or more tasks performed by the model application from a client device associated with the one or more user accounts, providing the one or more tasks for display on the client device.

7. The computer-implemented method of claim 1, further comprising:

receiving, from a client device associated with a user account, one or more user interactions with one or more source content items or the model application;

determining based on the one or more user interactions, a target audience associated with an output of the model application;

determining an audience context based on the target audience, by accessing one or more source content items or historic outputs associated with the target audience; and generating a targeted output specific to the target audience, based on the model application utilizing the audience context.

8. A system comprising:

at least one processor; and a non-transitory computer readable medium comprising instructions that, when executed by the at least one processor, cause the system to:

generate a customized user group context for a group of defined user accounts based on one or more source content items associated with the group of defined user accounts and monitoring user interaction data of the group of defined user accounts with the one or more source content items associated with the group of defined user accounts;

generate a default model application comprising default discrete model functions that are executable by a large language model, wherein the default discrete model functions correspond to at least one of a function category comprising a sense category, a reason category, or an act category;

determine discrete model functions that are executable by the large language model and combinable with the default discrete model functions;

classify a discrete model function from the discrete model functions into a function category comprising one or more of the sense category, the reason category, or the act category;

combine the default discrete model functions and the discrete model functions;

generate, in response to combining the default discrete model functions with the discrete model functions, a model application defining data processing for a customized instance of the large language model;

integrate the discrete model function with one or more autonomous agents based on one or more functions performed by the discrete model function;

determine one or more capabilities of the model application based on one or more functions performed by the discrete model function;

perform one or more tasks for the group of defined user accounts with the one or more autonomous agents integrated with the model application and the customized instance of the large language model according to the customized user group context based on the customized user group context corresponding to the one or more capabilities of the model application; and based on detecting a change to the customized user group context, generate a modified model application by replacing the discrete model function with an additional discrete model function that shares the function category.

9. The system of claim 8, further comprising instructions that, when executed by the at least one processor, cause the system to:

replace a default discrete model function with a discrete model function that corresponds to the function category of the default discrete model function.

10. The system of claim 8, further comprising instructions that, when executed by the at least one processor, cause the system to:

monitor, from a client device associated with a user account, one or more user interactions with one or more content items within a content management system or on a third-party server linked to the content management system via one or more software connectors as dictated by the discrete model function classified into the sense category;

determine a user context for the user account based on the one or more user interactions; and perform a task with the customized instance of the large language model according to the user context associated with the user account.

11. The system of claim 8, further comprising instructions that, when executed by the at least one processor, cause the system to:

detect, from a set of client devices associated with a set of user accounts, one or more user interactions with one or more content items within a content management system or on a third-party server linked to the content management system via one or more software connectors according to a default discrete model function classified into the sense category; and analyze at least the one or more content items or the one or more user interactions with the one or more content items according to a discrete model function classified in the reason category.

12. The system of claim 8, further comprising instructions that, when executed by the at least one processor, cause the system to:

process one or more content items within a content management system or on a third-party server linked to the content management system via one or more software connectors according to a default discrete model function or a discrete model function classified into the sense category;

generate, one or more signals associated with a group of user accounts according to a default discrete model function or a discrete model function classified into the reason category; and perform, one or more tasks based on the one or more signals associated with the group of user accounts according to at least a default discrete model function or a discrete model function classified into the act category.

13. The system of claim 8, further comprising instructions that, when executed by the at least one processor, cause the system to:

perform, via at least a default discrete model function or a discrete model function classified into the act category one or more tasks according to the customized user group context associated with the group of defined user accounts.

14. The system of claim 8, further comprising instructions that, when executed by the at least one processor, cause the system to:

perform one or more tasks based on receiving one or more user interactions with the model application from one or more client devices associated with a group of user accounts;

generate, for the group of user accounts, a historic group log comprising the one or more tasks performed by the model application; and in response to receiving a request to access a task from the one or more tasks stored in the historic group log, provide the task for display on a client device associated with the group of user accounts.

15. A non-transitory computer readable medium comprising instructions that, when executed by at least one processor, cause the at least one processor to:

generate a customized user group context for a group of defined user accounts based on one or more source content items associated with the group of defined user accounts and monitoring user interaction data of the group of defined user accounts with the one or more source content items associated with the group of defined user accounts;

determine discrete model functions that are executable by a large language model and combinable with one another to form combined model functions;

classify the discrete model functions into one or more function categories comprising one or more of a sense category, a reason category, or an act category;

combine a discrete model function from the discrete model functions with one or more additional discrete model functions classified into a different function category;

generate, in response to combining the discrete model function with the one or more additional discrete model functions classified into the different function category, a model application defining data processing for a customized instance of the large language model;

integrate the discrete model function with one or more autonomous agents based on one or more functions performed by the discrete model function;

determine one or more capabilities of the model application based on one or more functions performed by the discrete model function;

perform one or more tasks for the group of defined user accounts with the one or more autonomous agents integrated with the model application and the customized instance of the large language model according to the customized user group context based on the customized user group context corresponding to the one or more capabilities of the model application; and based on detecting a change to the customized user group context, generate a modified model application by replacing the discrete model function with an additional discrete model function that shares a function category.

16. The non-transitory computer readable medium of claim 15, further comprising instructions that, when executed by the at least one processor, cause the at least one processor to:

determine that the model application comprises a first discrete model function classified into the sense category, a second discrete model function classified into the reason category, and a third discrete model function classified into the act category.

17. The non-transitory computer readable medium of claim 15, further comprising instructions that, when executed by the at least one processor, cause the at least one processor to:

receive, from a client device associated with a user account, one or more user interactions with one or more content items within a content management system or third-party server linked to the content management system via one or more software connectors;

determine a model application context based on the one or more user interactions; and select, based on the model application context, a first discrete model function classified into the sense category, a second discrete model function classified into the reason category, and a third discrete model function classified into the act category.

18. The non-transitory computer readable medium of claim 15, further comprising instructions that, when executed by the at least one processor, cause the at least one processor to:

receive, from a client device associated with a user account, one or more user interactions with the model application;

determine at least a tone, style, or voice associated with the user account based on the one or more user interactions; and perform a task with the model application according to at least the tone, style, or voice associated with the user account.

19. The non-transitory computer readable medium of claim 15, further comprising instructions that, when executed by the at least one processor, cause the at least one processor to:

detect, one or more user interactions with one or more content items within a content management system or third-party server linked to the content management system via one or more software connectors according to a first discrete model function classified into the sense category;

generate one or more signals to automate one or more tasks associated with the one or more content items based on the one or more user interactions according to a second discrete model function classified into the reason category; and perform a task based on the one or more signals associated with the one or more content items, according to a third discrete model function classified into the act category.

20. The non-transitory computer readable medium of claim 15, further comprising instructions that, when executed by the at least one processor, cause the at least one processor to:

perform one or more tasks based on receiving from a client device associated with a user account one or more user interactions with the model application;

generate, for the user account, a historic log comprising the one or more tasks performed by the model application; and in response to receiving from the client device associated with the user account, a request to access a task from the one or more tasks stored in the historic log, provide the task for display on the client device associated with the user account.

* * * * *